(12) United States Patent
Takamoto et al.

(10) Patent No.: US 8,699,139 B2
(45) Date of Patent: Apr. 15, 2014

(54) VARIABLE-FOCAL-LENGTH PROJECTION LENS SYSTEM AND PROJECTION APPARATUS

(75) Inventors: Katsuhiro Takamoto, Sakai (JP); Kazuhiko Inoue, Sakai (JP); Sadanobu Imamura, Sakai (JP); Kohei Wataru, Nishinomiya (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 129 days.

(21) Appl. No.: 13/483,987

(22) Filed: May 30, 2012

(65) Prior Publication Data

US 2012/0307371 A1  Dec. 6, 2012

(30) Foreign Application Priority Data

May 30, 2011 (JP) .................. 2011-120823

(51) Int. Cl.
  *G02B 9/00* (2006.01)
  *G02B 15/14* (2006.01)
  *G02B 13/16* (2006.01)
(52) U.S. Cl.
  CPC ..................... *G02B 13/16* (2013.01)
  USPC .......................... 359/649; 359/676

(58) Field of Classification Search
  USPC .......................... 359/649–651, 676
  See application file for complete search history.

(56) References Cited

U.S. PATENT DOCUMENTS 6,285,509 B1 * 9/2001 Nakayama et al. .......... 359/676

FOREIGN PATENT DOCUMENTS

JP  2002-122782  4/2002

* cited by examiner

*Primary Examiner* — William Choi
(74) *Attorney, Agent, or Firm* — Cozen O'Connor

(57) ABSTRACT

A variable-focal-length lens system for projection which achieves focusing by movement of the entire system has a second to a fourth lens group as focal-length-varying lens groups and a first lens group as a distance-compensation lens group. The second to fourth lens groups individually move in the optical axis direction to vary the group-to-group distances so as to vary the focal length of the entire system. During focusing, the first lens group moves in the optical axis direction such that, as the projection distance varies from a remote distance to a close distance, curvature of field varies to the under side.

21 Claims, 51 Drawing Sheets

EX2 (P2)

EX3 (P3)

EX5 (P5)

EX6 (P6)

EX7 (N1)

EX9 (N3)

EX10 (N4)

EX11 (N5)

EX12 (N6)

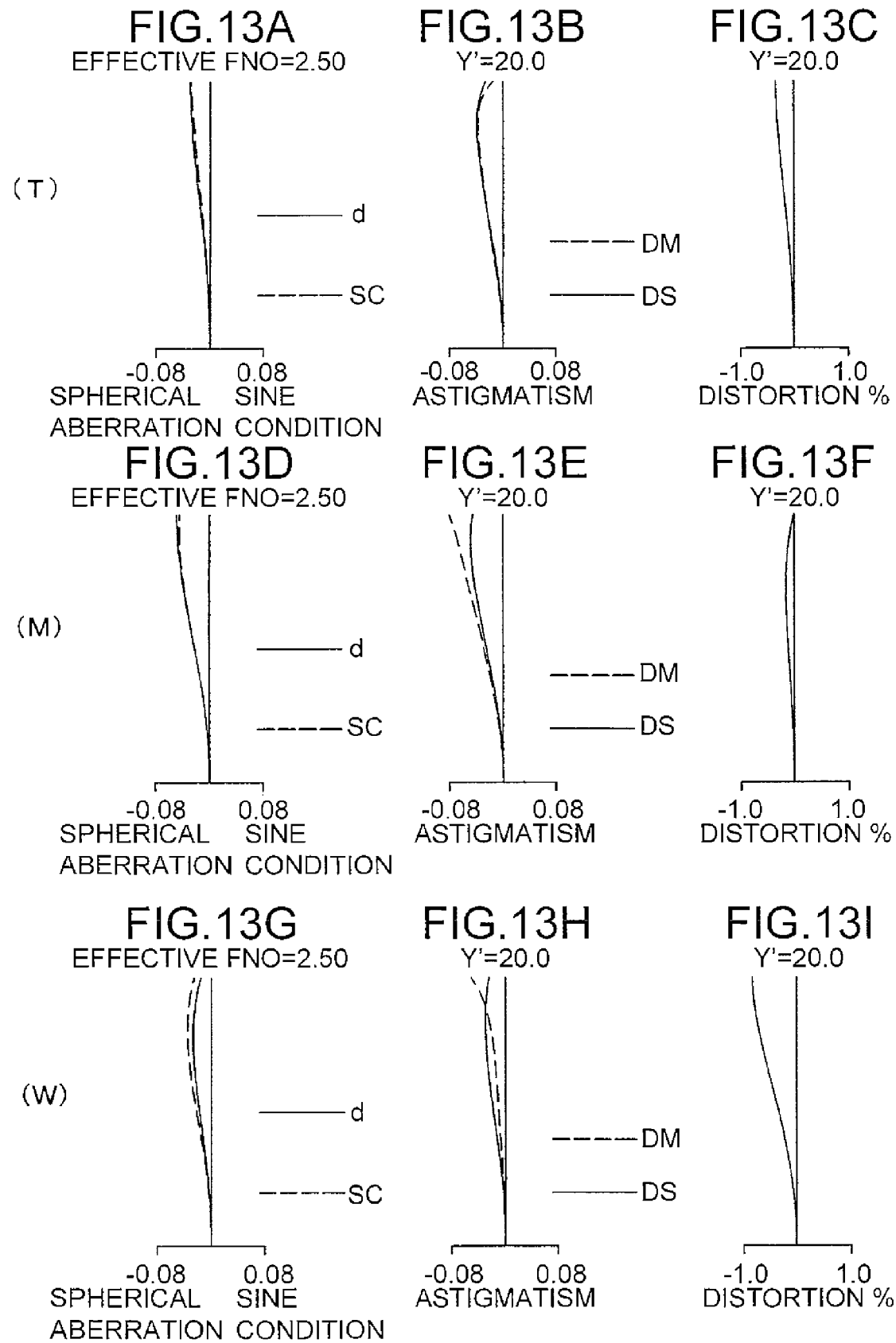

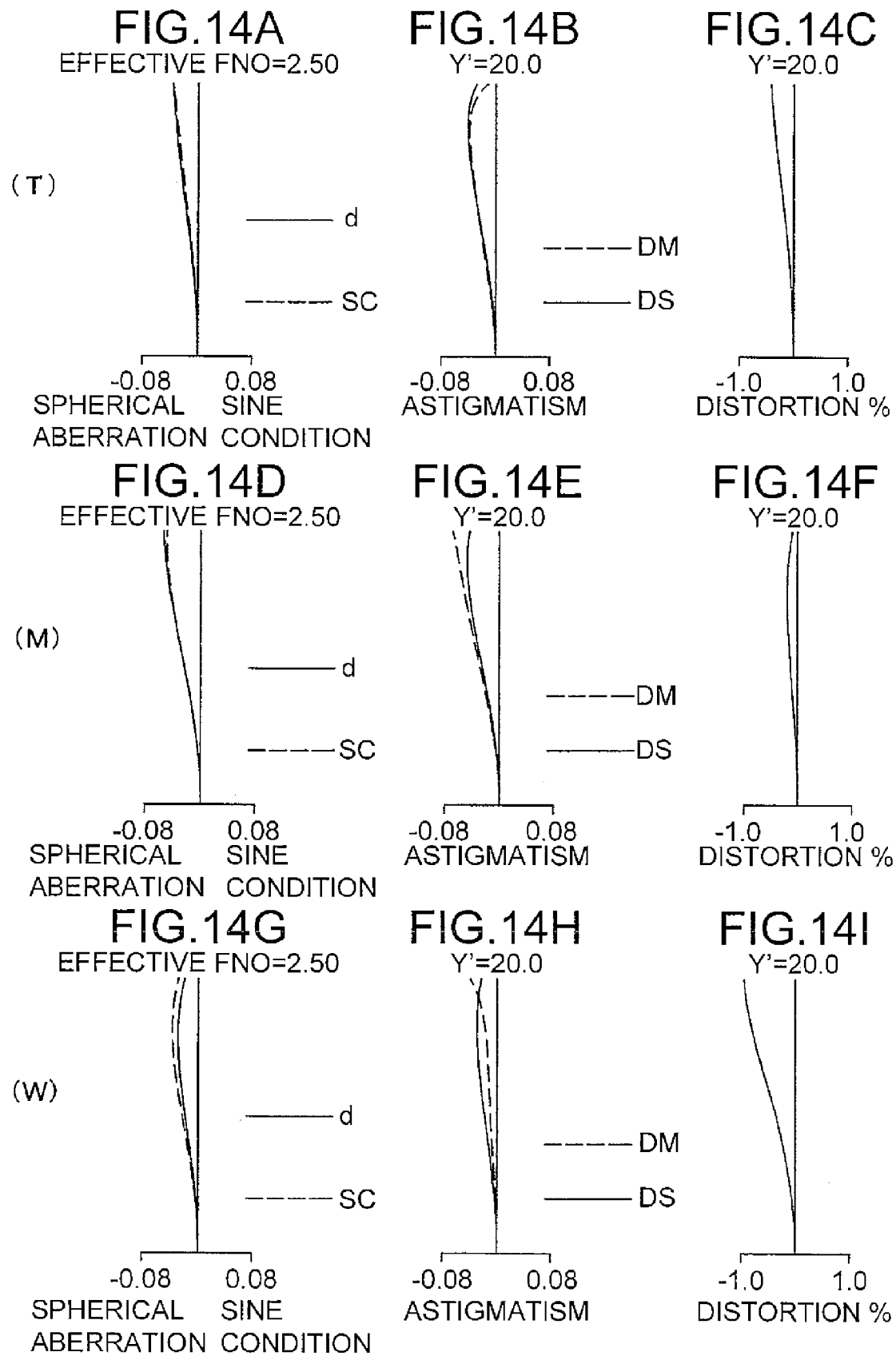

CX1 (P1:−15m)

EFFECTIVE FNO=2.50

(T)

-0.08   0.08
SPHERICAL  SINE
ABERRATION CONDITION
— d
---- SC

Y'=20.0

-0.08   0.08
ASTIGMATISM
---- DM
— DS

Y'=20.0

-1.0    1.0
DISTORTION %

EFFECTIVE FNO=2.50

(M)

-0.08   0.08
SPHERICAL  SINE
ABERRATION CONDITION
— d
---- SC

Y'=20.0

-0.08   0.08
ASTIGMATISM
---- DM
— DS

Y'=20.0

-1.0    1.0
DISTORTION %

EFFECTIVE FNO=2.50

(W)

-0.08   0.08
SPHERICAL  SINE
ABERRATION CONDITION
— d
---- SC

Y'=20.0

-0.08   0.08
ASTIGMATISM
---- DM
— DS

Y'=20.0

-1.0    1.0
DISTORTION %

EX2 (P2:−45m)

EFFECTIVE FNO=2.50

(T)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EFFECTIVE FNO=2.50

(M)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EFFECTIVE FNO=2.50

(W)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EX2 (P2:−15m)

EFFECTIVE FNO=2.50

(T)

-0.08    0.08
SPHERICAL   SINE
ABERRATION CONDITION
— d
----- SC

Y'=20.0

-0.08    0.08
ASTIGMATISM
----- DM
— DS

Y'=20.0

-1.0    1.0
DISTORTION %

EFFECTIVE FNO=2.50

(M)

-0.08    0.08
SPHERICAL   SINE
ABERRATION CONDITION
— d
----- SC

Y'=20.0

-0.08    0.08
ASTIGMATISM
----- DM
— DS

Y'=20.0

-1.0    1.0
DISTORTION %

EFFECTIVE FNO=2.50

(W)

-0.08    0.08
SPHERICAL   SINE
ABERRATION CONDITION
— d
----- SC

Y'=20.0

-0.08    0.08
ASTIGMATISM
----- DM
— DS

Y'=20.0

-1.0    1.0
DISTORTION %

CX2 (P2:−15m)
FIG.18A
EFFECTIVE FNO=2.50
(T)
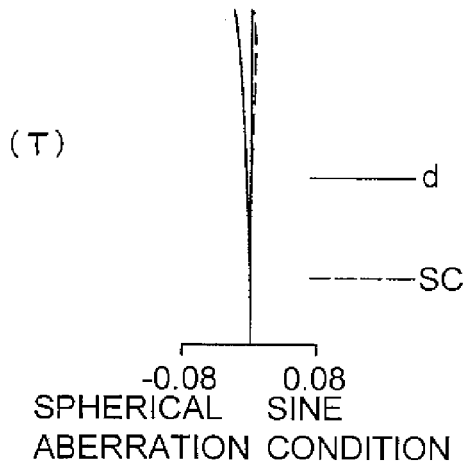
-0.08   0.08
SPHERICAL   SINE
ABERRATION  CONDITION
FIG.18B
Y'=20.0
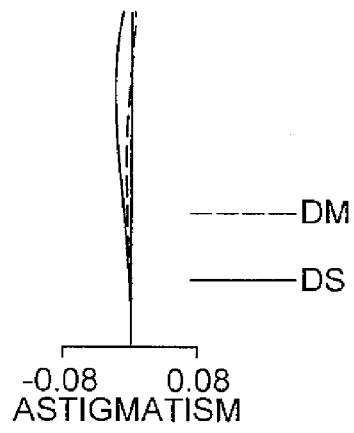
-0.08   0.08
ASTIGMATISM
FIG.18C
Y'=20.0
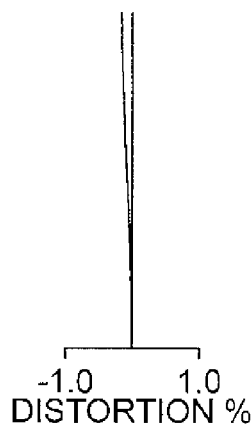
-1.0   1.0
DISTORTION %
FIG.18D
EFFECTIVE FNO=2.50
(M)
-0.08   0.08
SPHERICAL   SINE
ABERRATION  CONDITION
FIG.18E
Y'=20.0
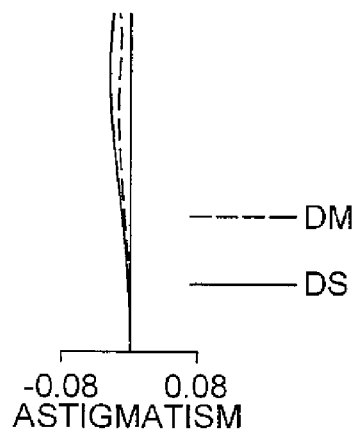
-0.08   0.08
ASTIGMATISM
FIG.18F
Y'=20.0
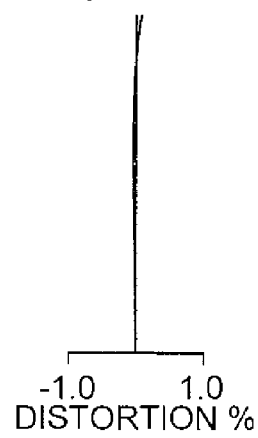
-1.0   1.0
DISTORTION %
FIG.18G
EFFECTIVE FNO=2.50
(W)
-0.08   0.08
SPHERICAL   SINE
ABERRATION  CONDITION
FIG.18H
Y'=20.0
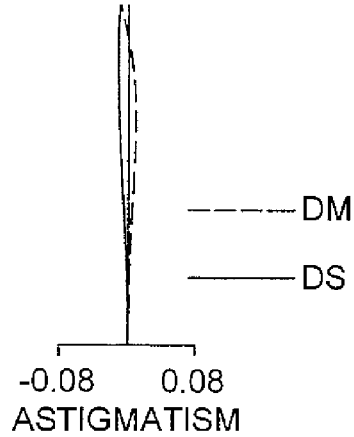
-0.08   0.08
ASTIGMATISM
FIG.18I
Y'=20.0
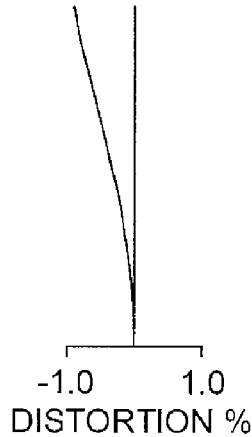
-1.0   1.0
DISTORTION %

EX3 (P3:−45m)

EFFECTIVE FNO=2.50

(T)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EFFECTIVE FNO=2.50

(M)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EFFECTIVE FNO=2.50

(W)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EX3 (P3:−15m)

EFFECTIVE FNO=2.50

(T)

SPHERICAL SINE
ABERRATION CONDITION
—— d
---- SC
-0.08   0.08

Y'=20.0

ASTIGMATISM
---- DM
—— DS
-0.08   0.08

Y'=20.0

DISTORTION %
-1.0   1.0

EFFECTIVE FNO=2.50

(M)

SPHERICAL SINE
ABERRATION CONDITION
—— d
---- SC
-0.08   0.08

Y'=20.0

ASTIGMATISM
---- DM
—— DS
-0.08   0.08

Y'=20.0

DISTORTION %
-1.0   1.0

EFFECTIVE FNO=2.50

(W)

SPHERICAL SINE
ABERRATION CONDITION
—— d
---- SC
-0.08   0.08

Y'=20.0

ASTIGMATISM
---- DM
—— DS
-0.08   0.08

Y'=20.0

DISTORTION %
-1.0   1.0

CX3 (P3:−15m)

EFFECTIVE FNO=2.50

(T)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EFFECTIVE FNO=2.50

(M)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EFFECTIVE FNO=2.50

(W)

—— d
---- SC

-0.08   0.08
SPHERICAL SINE
ABERRATION CONDITION

Y'=20.0

---- DM
—— DS

-0.08   0.08
ASTIGMATISM

Y'=20.0

-1.0   1.0
DISTORTION %

EX4 (P4;−45m)

EFFECTIVE FNO=2.50

(T)

-0.08   0.08
SPHERICAL  SINE
ABERRATION CONDITION
— d
----- SC

Y'=20.0

-0.08   0.08
ASTIGMATISM
----- DM
— DS

Y'=20.0

-1.0   1.0
DISTORTION %

EFFECTIVE FNO=2.50

(M)

-0.08   0.08
SPHERICAL  SINE
ABERRATION CONDITION
— d
----- SC

Y'=20.0

-0.08   0.08
ASTIGMATISM
----- DM
— DS

Y'=20.0

-1.0   1.0
DISTORTION %

EFFECTIVE FNO=2.50

(W)

-0.08   0.08
SPHERICAL  SINE
ABERRATION CONDITION
— d
----- SC

Y'=20.0

-0.08   0.08
ASTIGMATISM
----- DM
— DS

Y'=20.0

-1.0   1.0
DISTORTION %

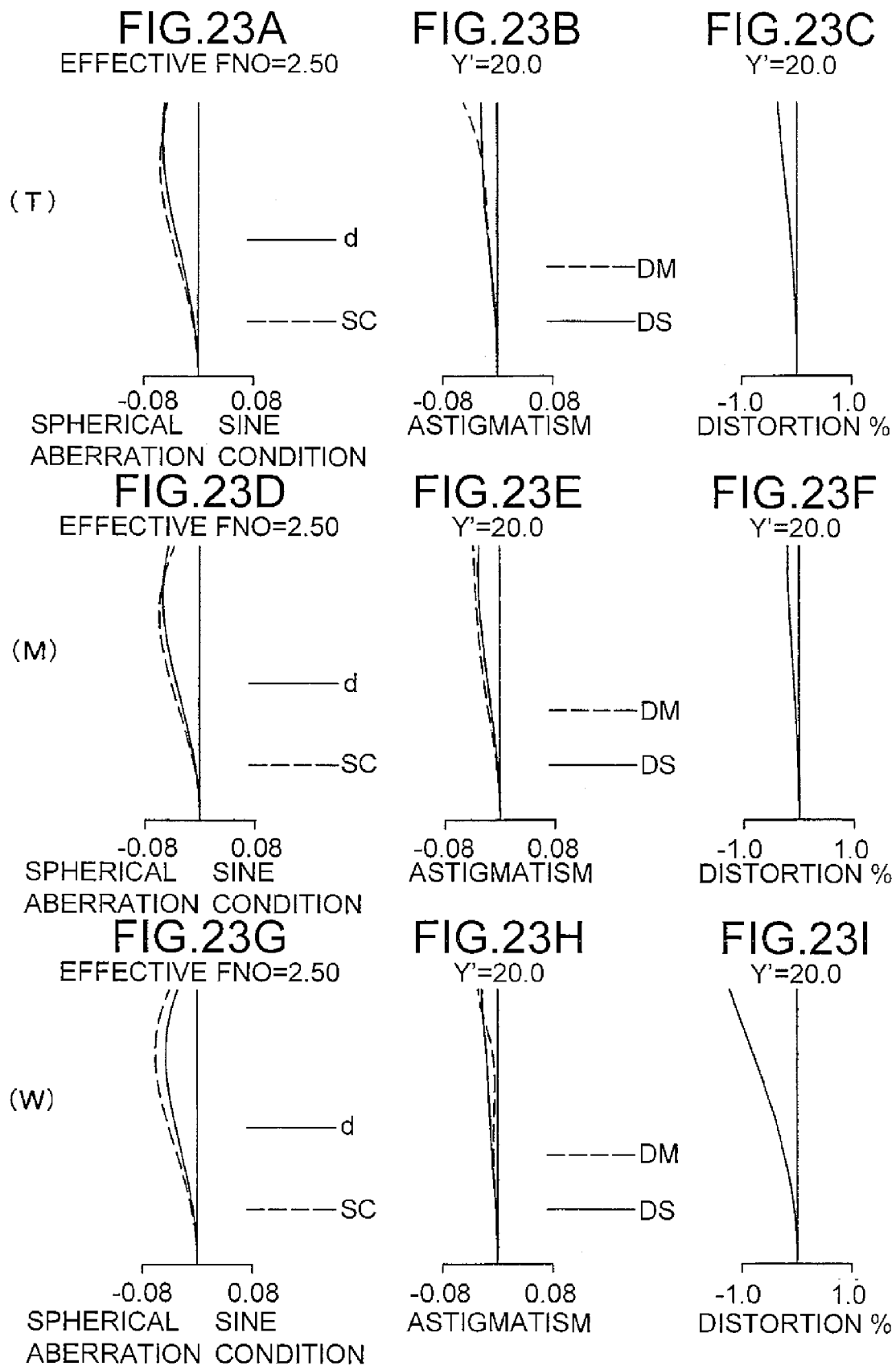

CX4 (P4:−15m)

EFFECTIVE FNO=2.50

(T)

-0.08   0.08
SPHERICAL  SINE
ABERRATION CONDITION

—— d
----- SC

Y'=20.0

-0.08   0.08
ASTIGMATISM

----- DM
—— DS

Y'=20.0

-1.0   1.0
DISTORTION %

EFFECTIVE FNO=2.50

(M)

-0.08   0.08
SPHERICAL  SINE
ABERRATION CONDITION

—— d
----- SC

Y'=20.0

-0.08   0.08
ASTIGMATISM

----- DM
—— DS

Y'=20.0

-1.0   1.0
DISTORTION %

EFFECTIVE FNO=2.50

(W)

-0.08   0.08
SPHERICAL  SINE
ABERRATION CONDITION

—— d
----- SC

Y'=20.0

-0.08   0.08
ASTIGMATISM

----- DM
—— DS

Y'=20.0

-1.0   1.0
DISTORTION %

EX5 (P5:−45m)

EFFECTIVE FNO=2.50

(T)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EFFECTIVE FNO=2.50

(M)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EFFECTIVE FNO=2.50

(W)

—— d
----- SC

-0.08    0.08
SPHERICAL  SINE
ABERRATION CONDITION

Y'=20.0

----- DM
—— DS

-0.08    0.08
ASTIGMATISM

Y'=20.0

-1.0    1.0
DISTORTION %

EX5 (P5:−15m)

EFFECTIVE FNO=2.50

(T)

-0.08   0.08
SPHERICAL   SINE
ABERRATION CONDITION

Y'=20.0

-0.08   0.08
ASTIGMATISM

Y'=20.0

-1.0   1.0
DISTORTION %

EFFECTIVE FNO=2.50

(M)

-0.08   0.08
SPHERICAL   SINE
ABERRATION CONDITION

Y'=20.0

-0.08   0.08
ASTIGMATISM

Y'=20.0

-1.0   1.0
DISTORTION %

EFFECTIVE FNO=2.50

(W)

-0.08   0.08
SPHERICAL   SINE
ABERRATION CONDITION

Y'=20.0

-0.08   0.08
ASTIGMATISM

Y'=20.0

-1.0   1.0
DISTORTION %

CX5 (P5:−15m)

EFFECTIVE FNO=2.50

(T)

−0.08　0.08
SPHERICAL　SINE
ABERRATION CONDITION

Y'=20.0

−0.08　0.08
ASTIGMATISM

Y'=20.0

−1.0　1.0
DISTORTION %

EFFECTIVE FNO=2.50

(M)

−0.08　0.08
SPHERICAL　SINE
ABERRATION CONDITION

Y'=20.0

−0.08　0.08
ASTIGMATISM

Y'=20.0

−1.0　1.0
DISTORTION %

EFFECTIVE FNO=2.50

(W)

−0.08　0.08
SPHERICAL　SINE
ABERRATION CONDITION

Y'=20.0

−0.08　0.08
ASTIGMATISM

Y'=20.0

−1.0　1.0
DISTORTION %

EX6 (P6:−45m)

EFFECTIVE FNO=2.50

(T)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

EFFECTIVE FNO=2.50

(M)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

EFFECTIVE FNO=2.50

(W)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

EX6 (P6;−15m)
FIG.29A
EFFECTIVE FNO=2.50
FIG.29B
Y'=20.0
FIG.29C
Y'=20.0
(T)
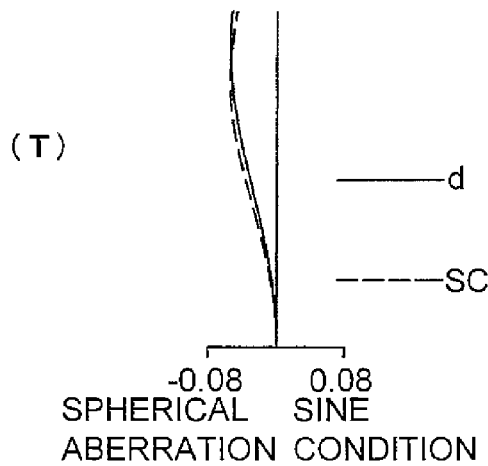
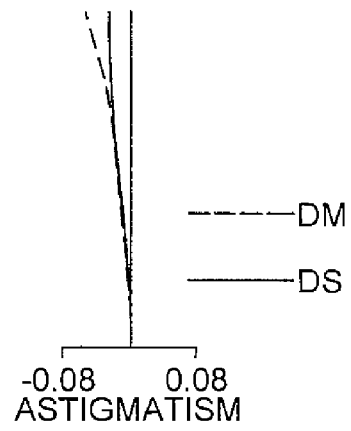
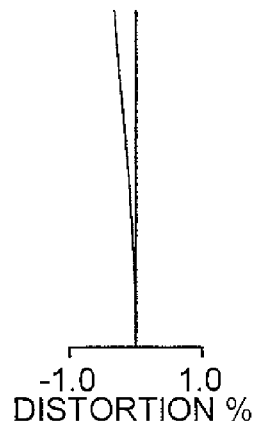
SPHERICAL SINE
ABERRATION CONDITION
ASTIGMATISM
DISTORTION %
FIG.29D
EFFECTIVE FNO=2.50
FIG.29E
Y'=20.0
FIG.29F
Y'=20.0
(M)
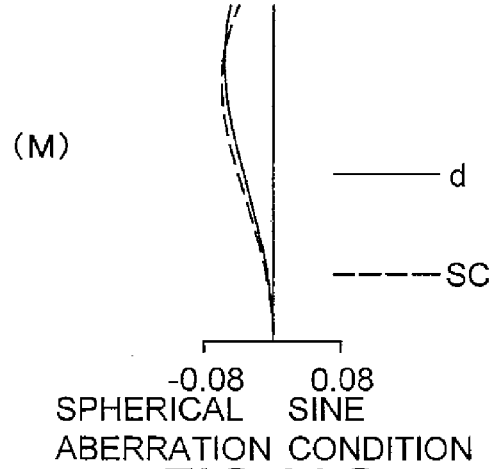
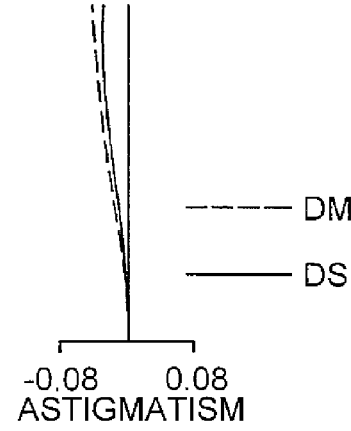
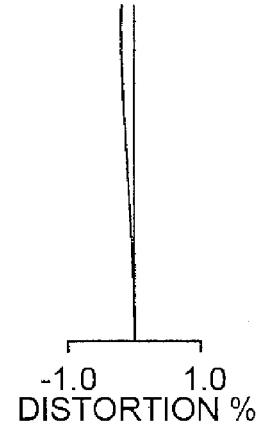
SPHERICAL SINE
ABERRATION CONDITION
ASTIGMATISM
DISTORTION %
FIG.29G
EFFECTIVE FNO=2.50
FIG.29H
Y'=20.0
FIG.29I
Y'=20.0
(W)
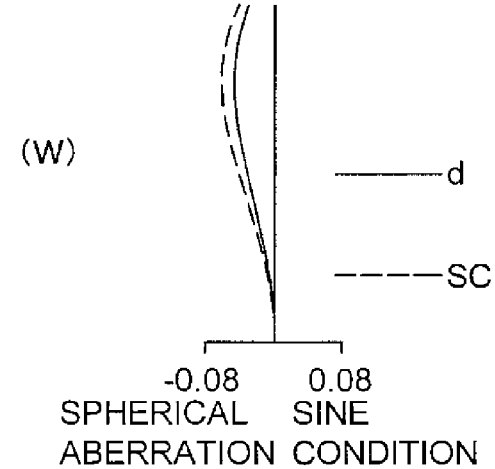
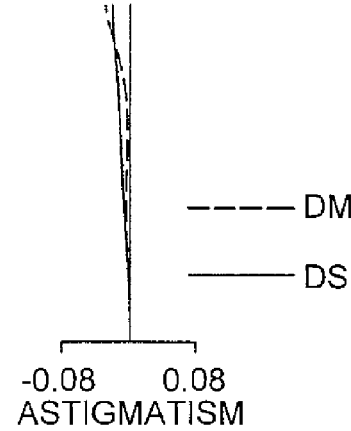
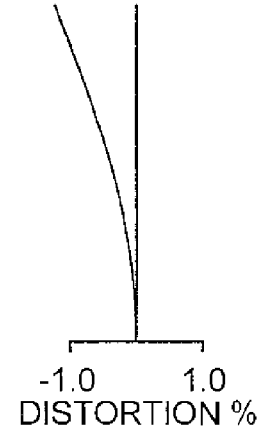
SPHERICAL SINE
ABERRATION CONDITION
ASTIGMATISM
DISTORTION %

CX6 (P6:−15m)

EFFECTIVE FNO=2.50

(T)

-0.08   0.08
SPHERICAL  SINE
ABERRATION  CONDITION

Y'=20.0

-0.08   0.08
ASTIGMATISM

Y'=20.0

-1.0   1.0
DISTORTION %

EFFECTIVE FNO=2.50

(M)

-0.08   0.08
SPHERICAL  SINE
ABERRATION  CONDITION

Y'=20.0

-0.08   0.08
ASTIGMATISM

Y'=20.0

-1.0   1.0
DISTORTION %

EFFECTIVE FNO=2.50

(W)

-0.08   0.08
SPHERICAL  SINE
ABERRATION  CONDITION

Y'=20.0

-0.08   0.08
ASTIGMATISM

Y'=20.0

-1.0   1.0
DISTORTION %

EX7 (N1:−45m)

EFFECTIVE FNO=2.50

(T)

SPHERICAL SINE
ABERRATION CONDITION

Y'=20.0

ASTIGMATISM

Y'=20.0

DISTORTION %

EFFECTIVE FNO=2.50

(M)

SPHERICAL SINE
ABERRATION CONDITION

Y'=20.0

ASTIGMATISM

Y'=20.0

DISTORTION %

EFFECTIVE FNO=2.50

(W)

SPHERICAL SINE
ABERRATION CONDITION

Y'=20.0

ASTIGMATISM

Y'=20.0

DISTORTION %

EX7 (N1: −15m)
FIG.32A
EFFECTIVE FNO=2.50
(T)
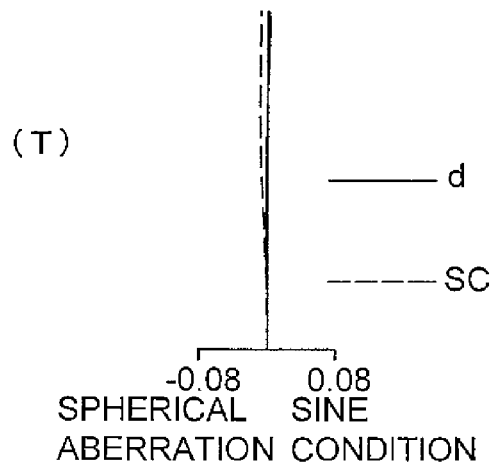
-0.08  0.08
SPHERICAL  SINE
ABERRATION  CONDITION
— d
---- SC
FIG.32B
Y'=20.0
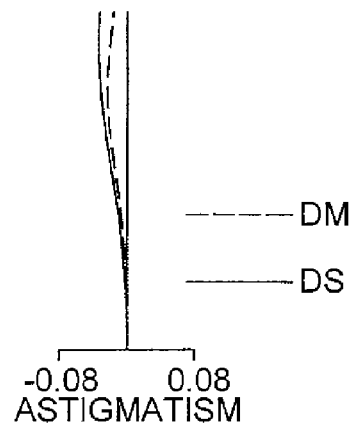
-0.08  0.08
ASTIGMATISM
---- DM
— DS
FIG.32C
Y'=20.0
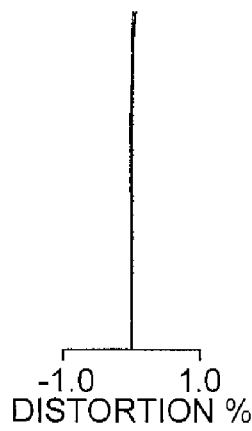
-1.0  1.0
DISTORTION %
FIG.32D
EFFECTIVE FNO=2.50
(M)
-0.08  0.08
SPHERICAL  SINE
ABERRATION  CONDITION
— d
---- SC
FIG.32E
Y'=20.0
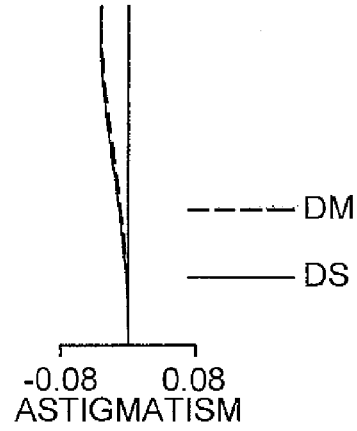
-0.08  0.08
ASTIGMATISM
---- DM
— DS
FIG.32F
Y'=20.0
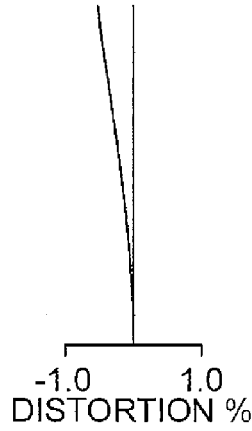
-1.0  1.0
DISTORTION %
FIG.32G
EFFECTIVE FNO=2.50
(W)
-0.08  0.08
SPHERICAL  SINE
ABERRATION  CONDITION
— d
---- SC
FIG.32H
Y'=20.0
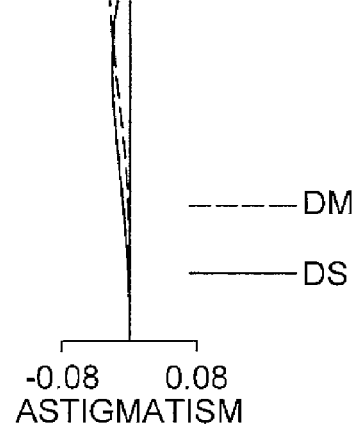
-0.08  0.08
ASTIGMATISM
---- DM
— DS
FIG.32I
Y'=20.0
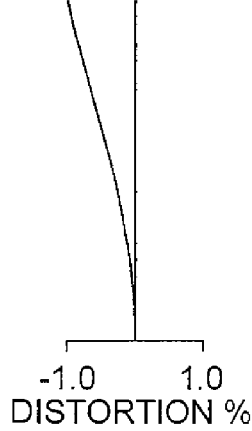
-1.0  1.0
DISTORTION %

CX7 (N1:−15m)
FIG.33A
EFFECTIVE FNO=2.50
(T)
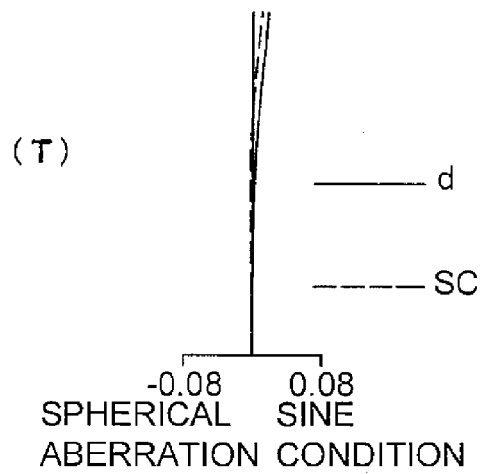
−0.08  0.08
SPHERICAL  SINE
ABERRATION  CONDITION
FIG.33B
Y'=20.0
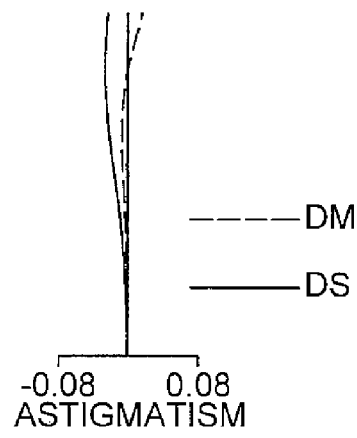
−0.08  0.08
ASTIGMATISM
FIG.33C
Y'=20.0
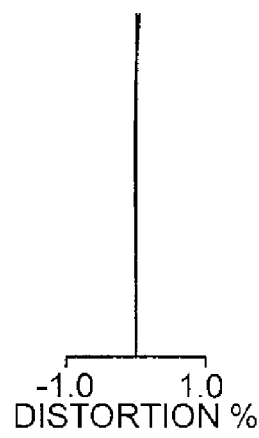
−1.0  1.0
DISTORTION %
FIG.33D
EFFECTIVE FNO=2.50
(M)
−0.08  0.08
SPHERICAL  SINE
ABERRATION  CONDITION
FIG.33E
Y'=20.0
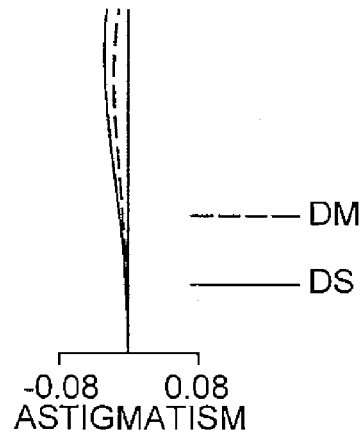
−0.08  0.08
ASTIGMATISM
FIG.33F
Y'=20.0
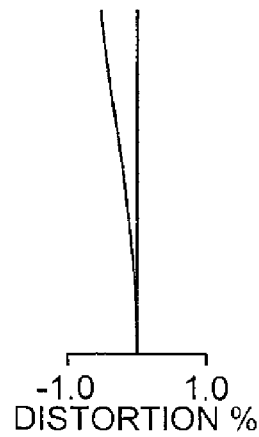
−1.0  1.0
DISTORTION %
FIG.33G
EFFECTIVE FNO=2.50
(W)
−0.08  0.08
SPHERICAL  SINE
ABERRATION  CONDITION
FIG.33H
Y'=20.0
−0.08  0.08
ASTIGMATISM
FIG.33I
Y'=20.0
−1.0  1.0
DISTORTION %

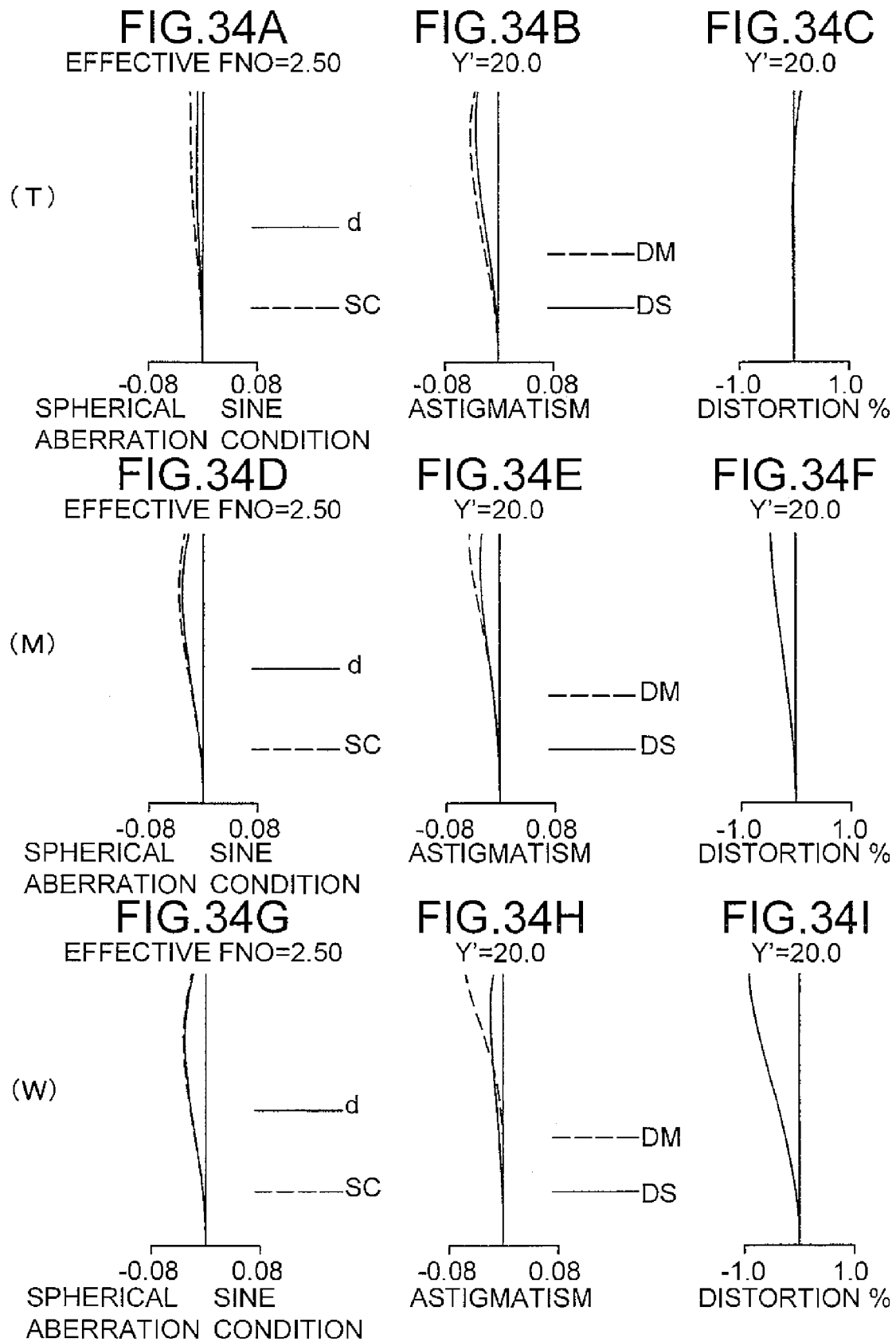

EX8 (N2:−15m)

EFFECTIVE FNO=2.50

(T)

−0.08　0.08
SPHERICAL　SINE
ABERRATION CONDITION

Y'=20.0

−0.08　0.08
ASTIGMATISM

Y'=20.0

−1.0　1.0
DISTORTION %

EFFECTIVE FNO=2.50

(M)

−0.08　0.08
SPHERICAL　SINE
ABERRATION CONDITION

Y'=20.0

−0.08　0.08
ASTIGMATISM

Y'=20.0

−1.0　1.0
DISTORTION %

EFFECTIVE FNO=2.50

(W)

−0.08　0.08
SPHERICAL　SINE
ABERRATION CONDITION

Y'=20.0

−0.08　0.08
ASTIGMATISM

Y'=20.0

−1.0　1.0
DISTORTION %

CX8 (N2:−15m)
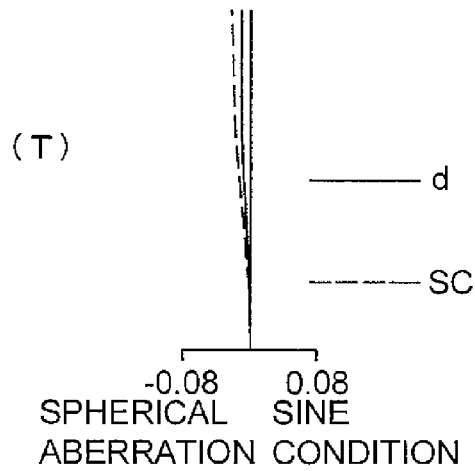
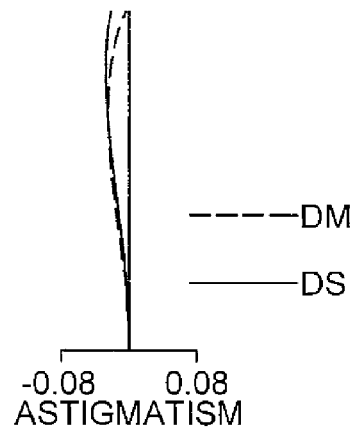
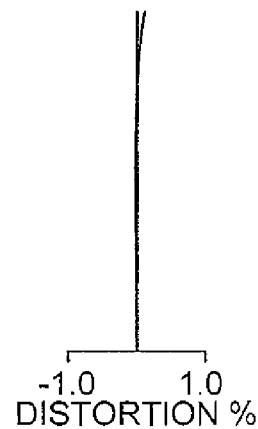

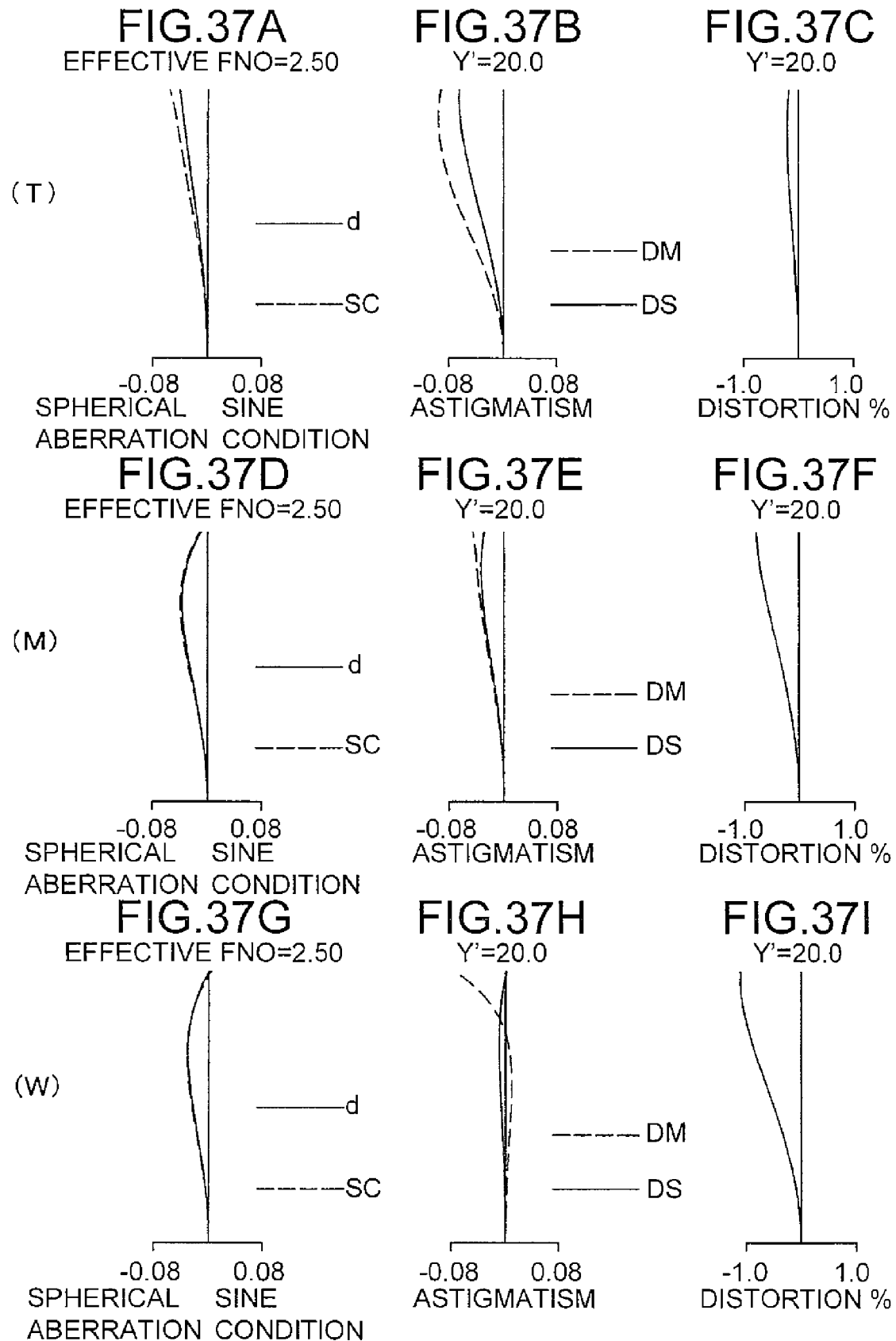

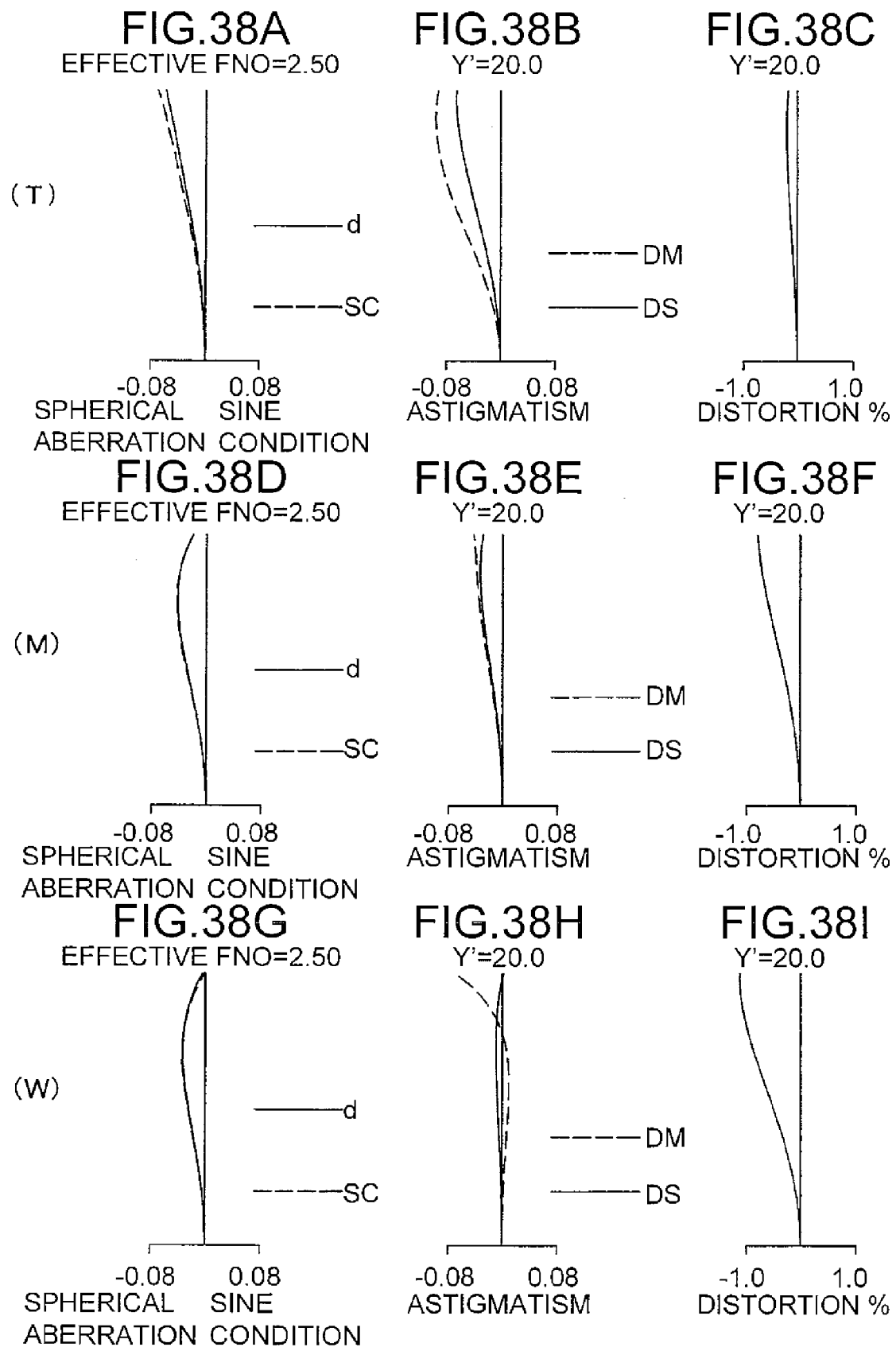

CX9 (N3: −15m)

EFFECTIVE FNO=2.50

(T)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

EFFECTIVE FNO=2.50

(M)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

EFFECTIVE FNO=2.50

(W)

-0.08  0.08
SPHERICAL SINE
ABERRATION CONDITION
— d
---- SC

Y'=20.0

-0.08  0.08
ASTIGMATISM
---- DM
— DS

Y'=20.0

-1.0  1.0
DISTORTION %

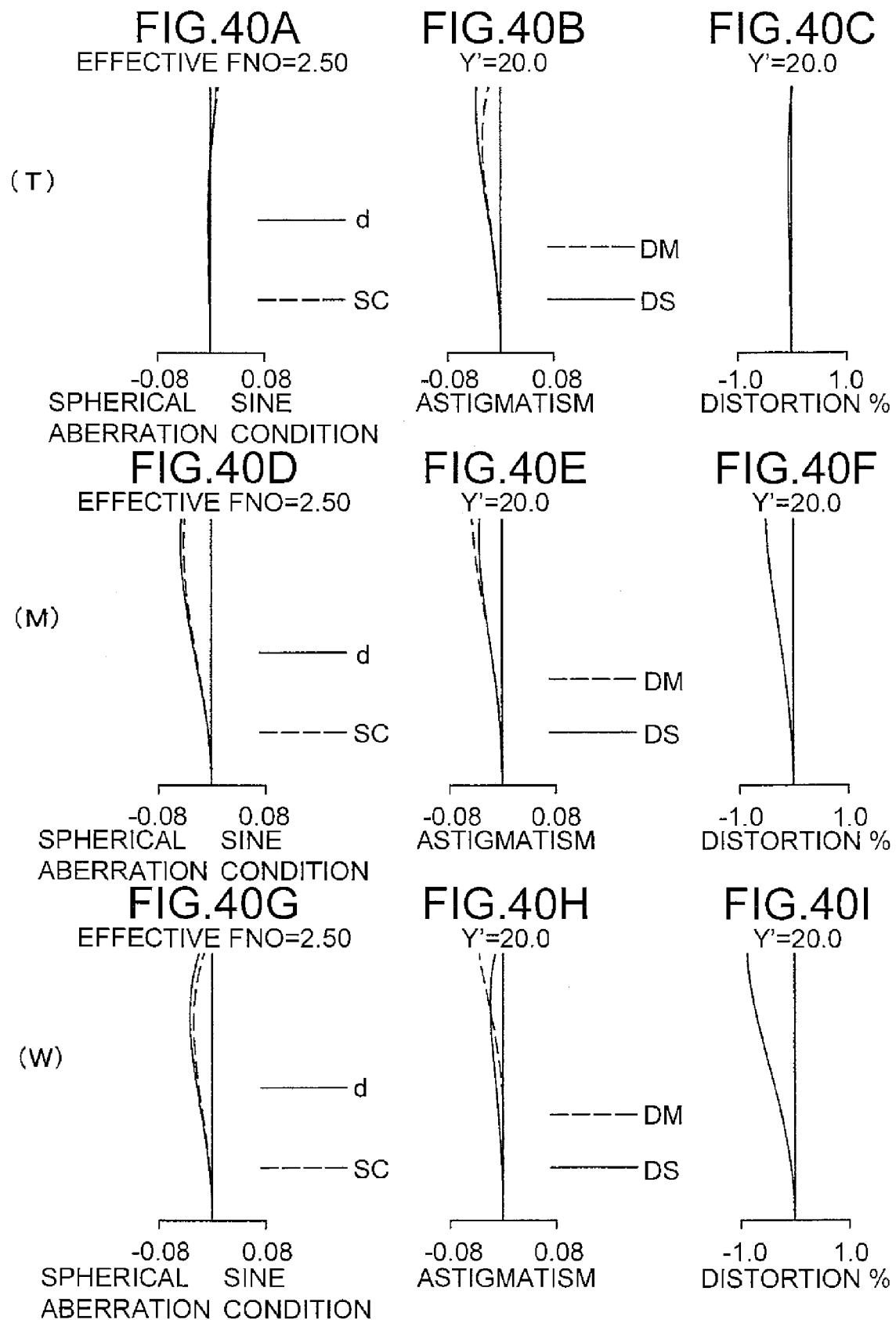

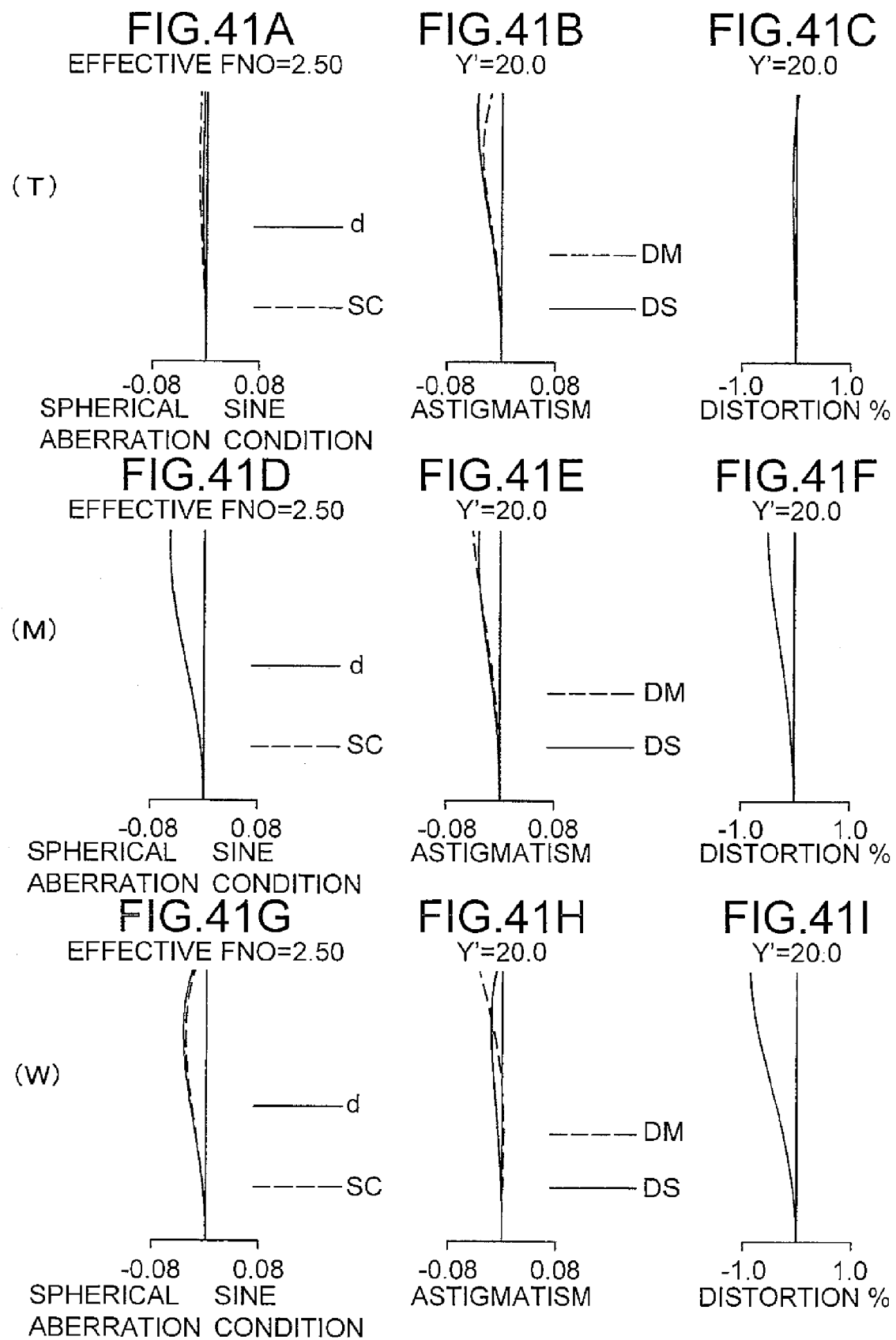

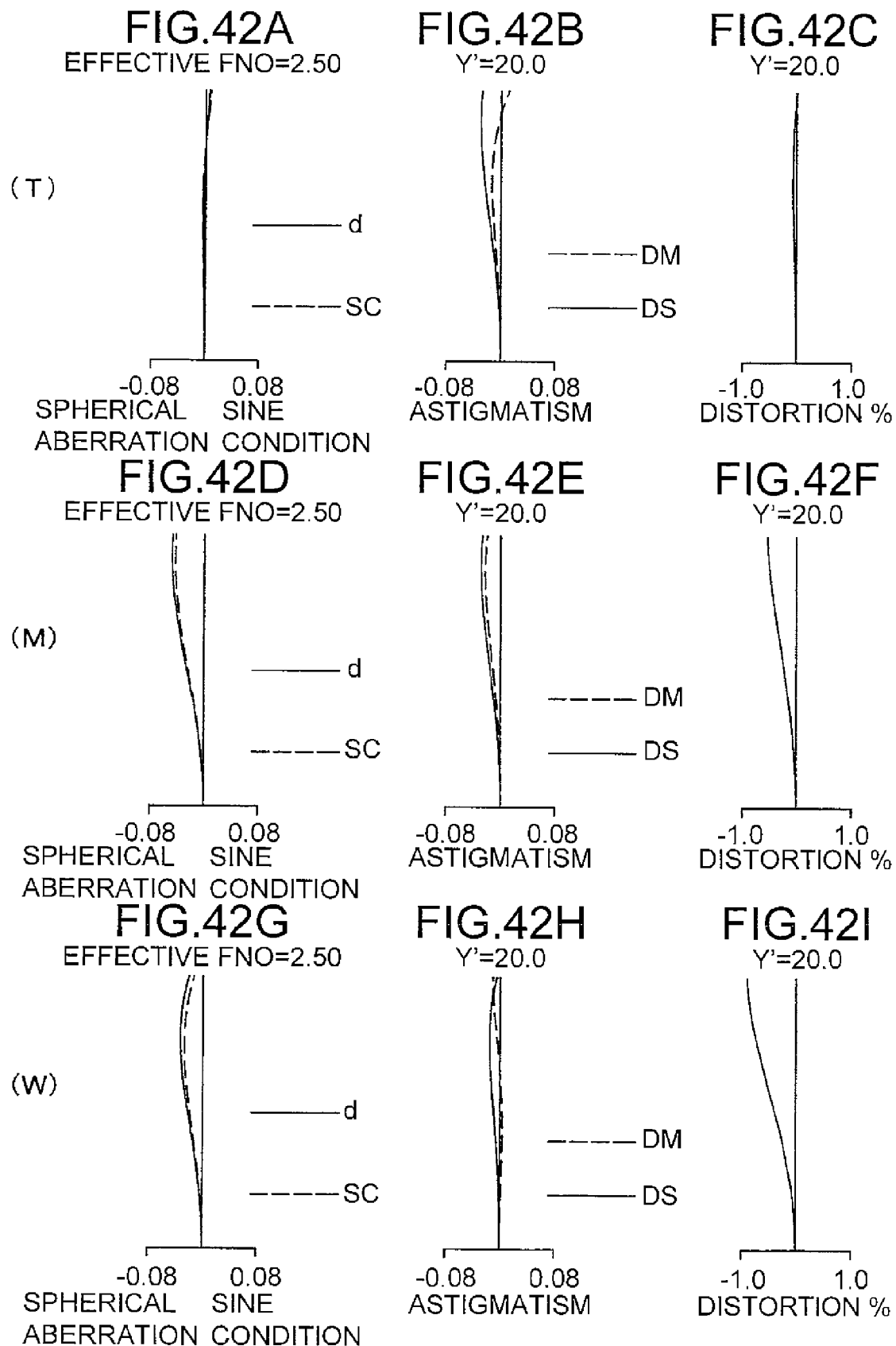

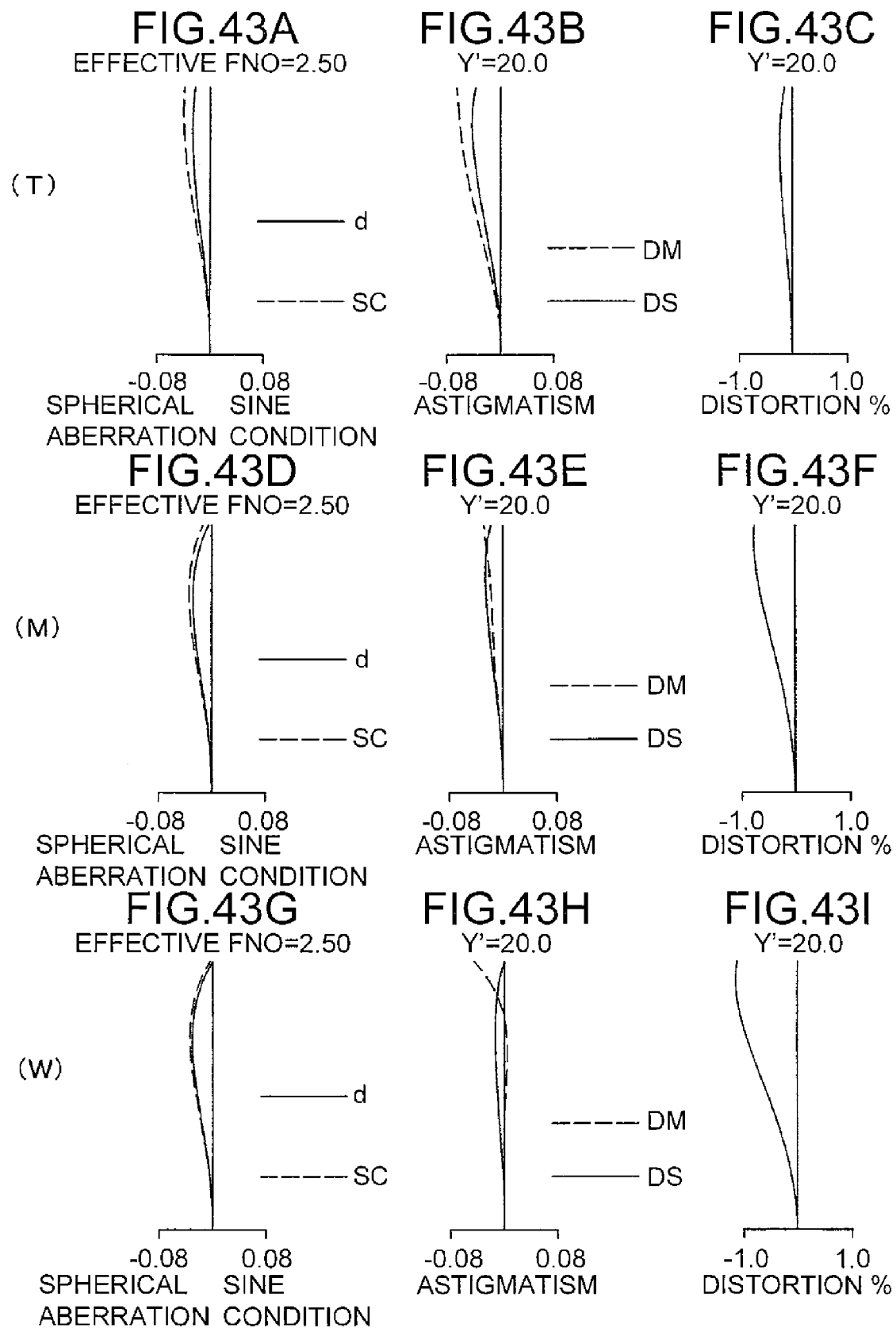

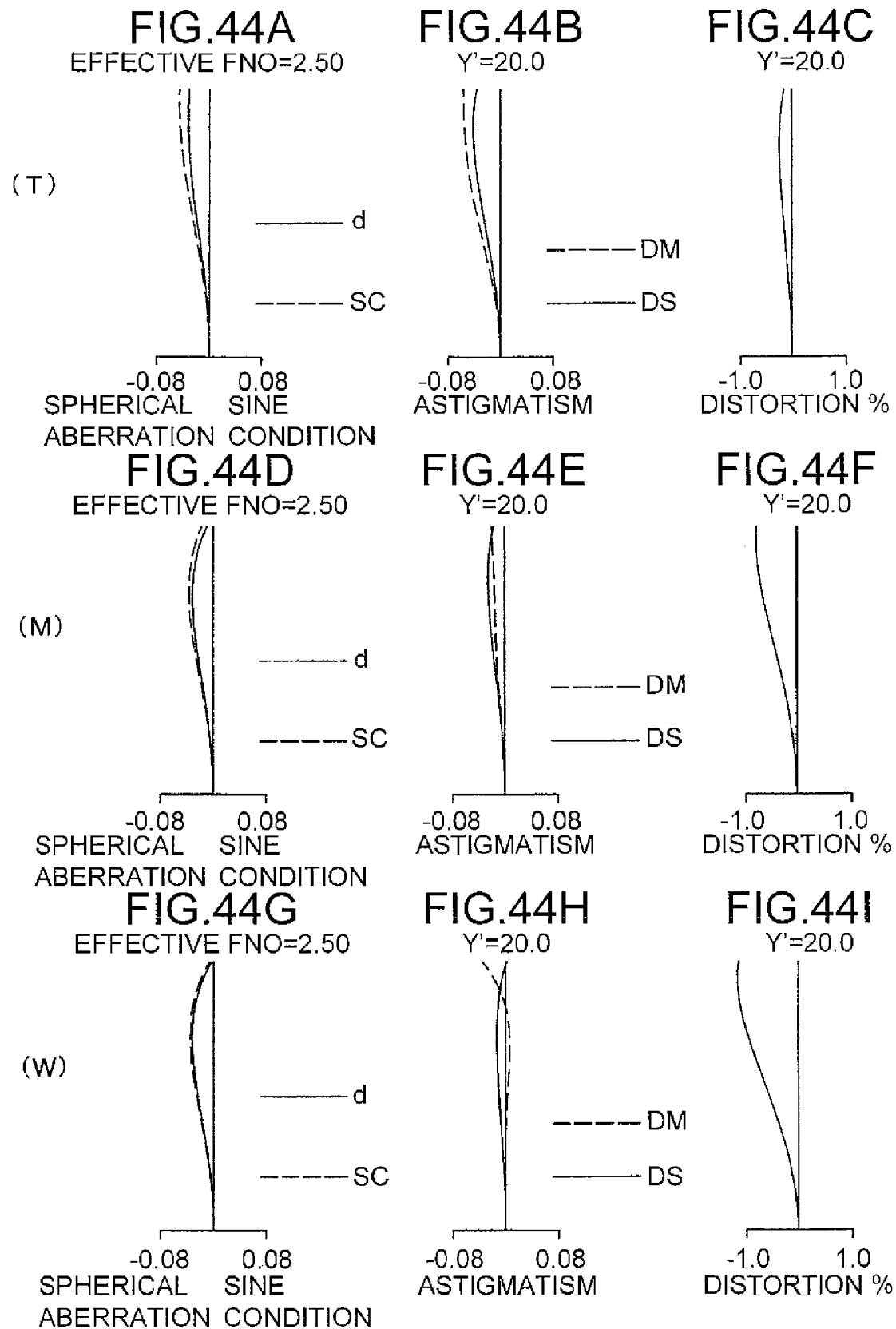

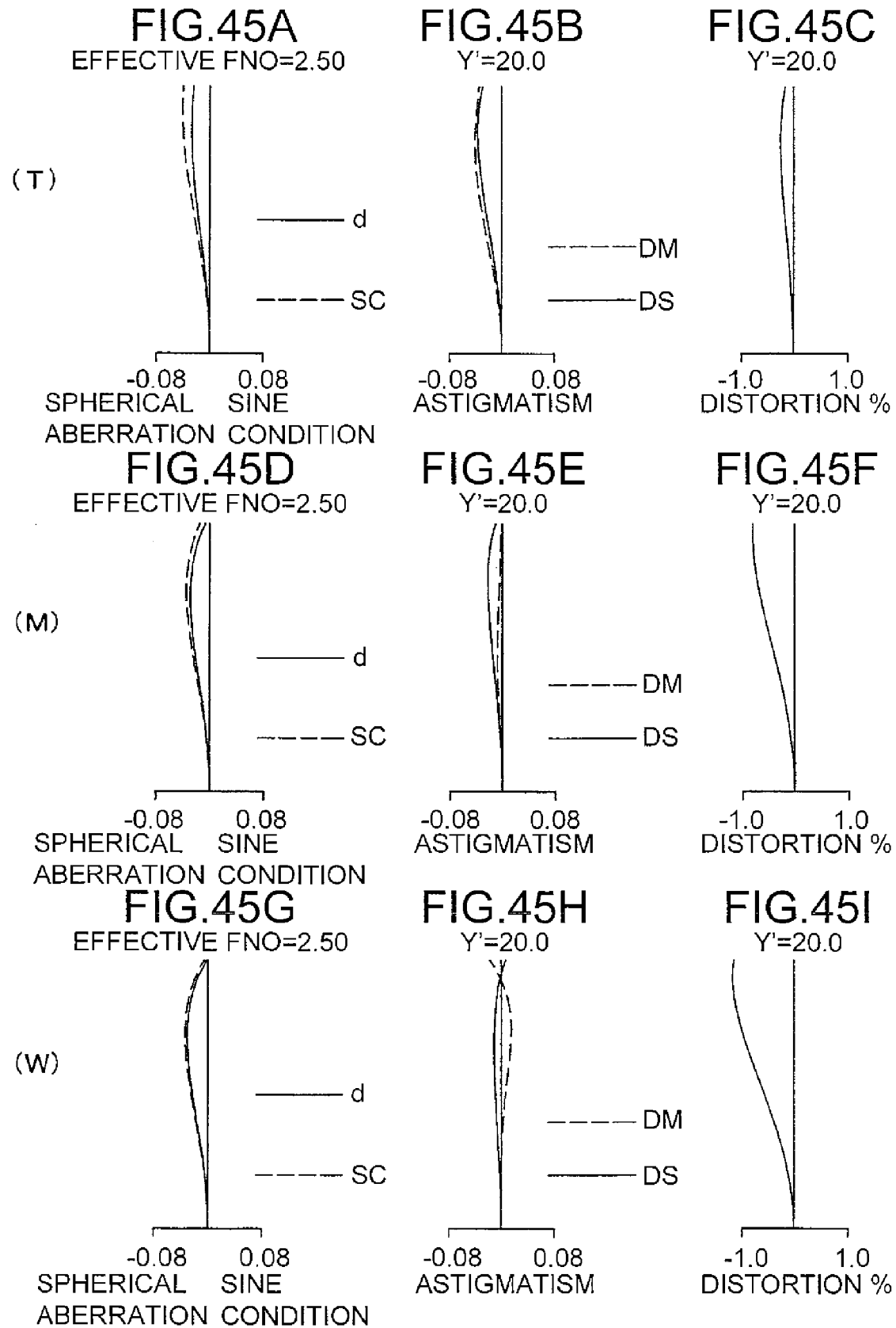

EX12 (N6;−45m)
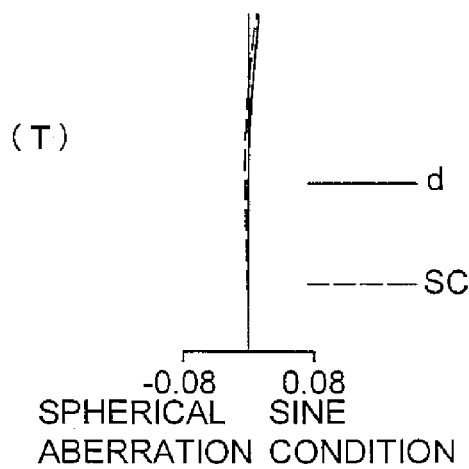
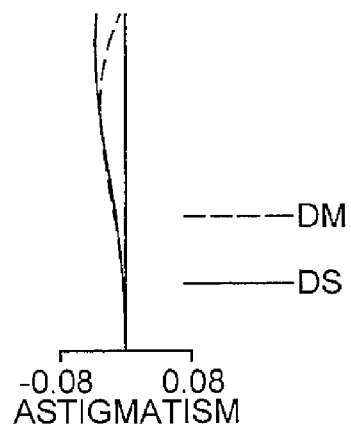
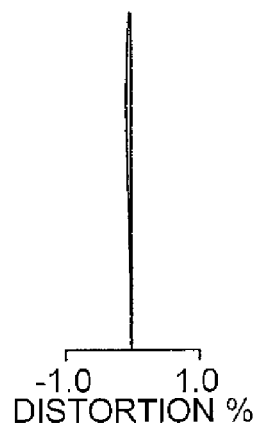
FIG.46A EFFECTIVE FNO=2.50 (T)
FIG.46B Y'=20.0
FIG.46C Y'=20.0
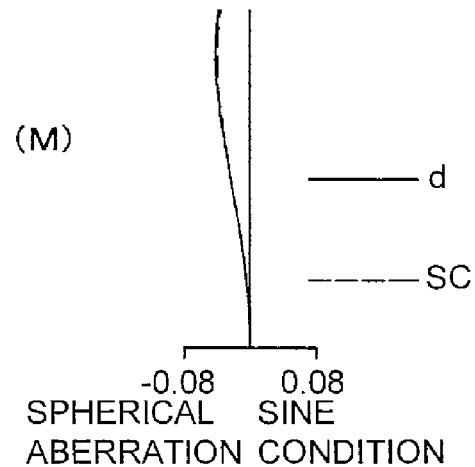
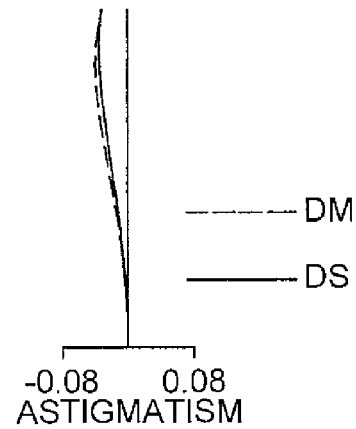
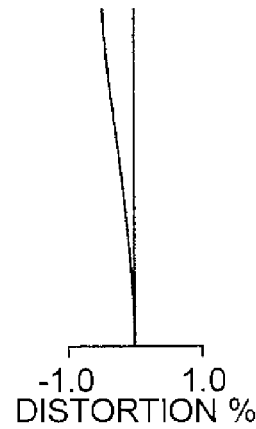
FIG.46D EFFECTIVE FNO=2.50 (M)
FIG.46E Y'=20.0
FIG.46F Y'=20.0
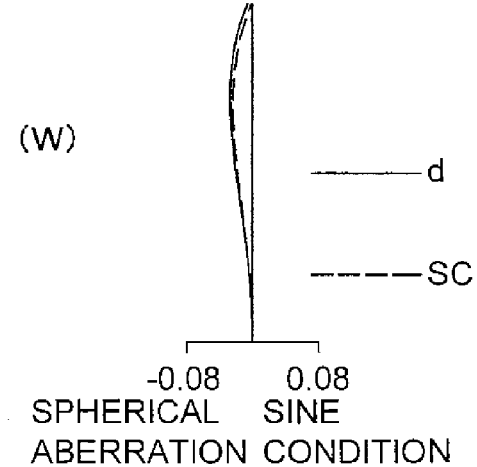
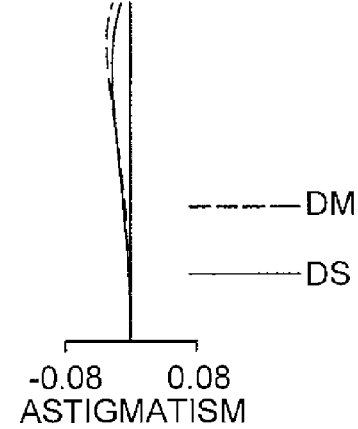
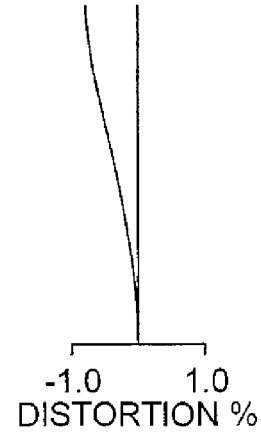
FIG.46G EFFECTIVE FNO=2.50 (W)
FIG.46H Y'=20.0
FIG.46I Y'=20.0

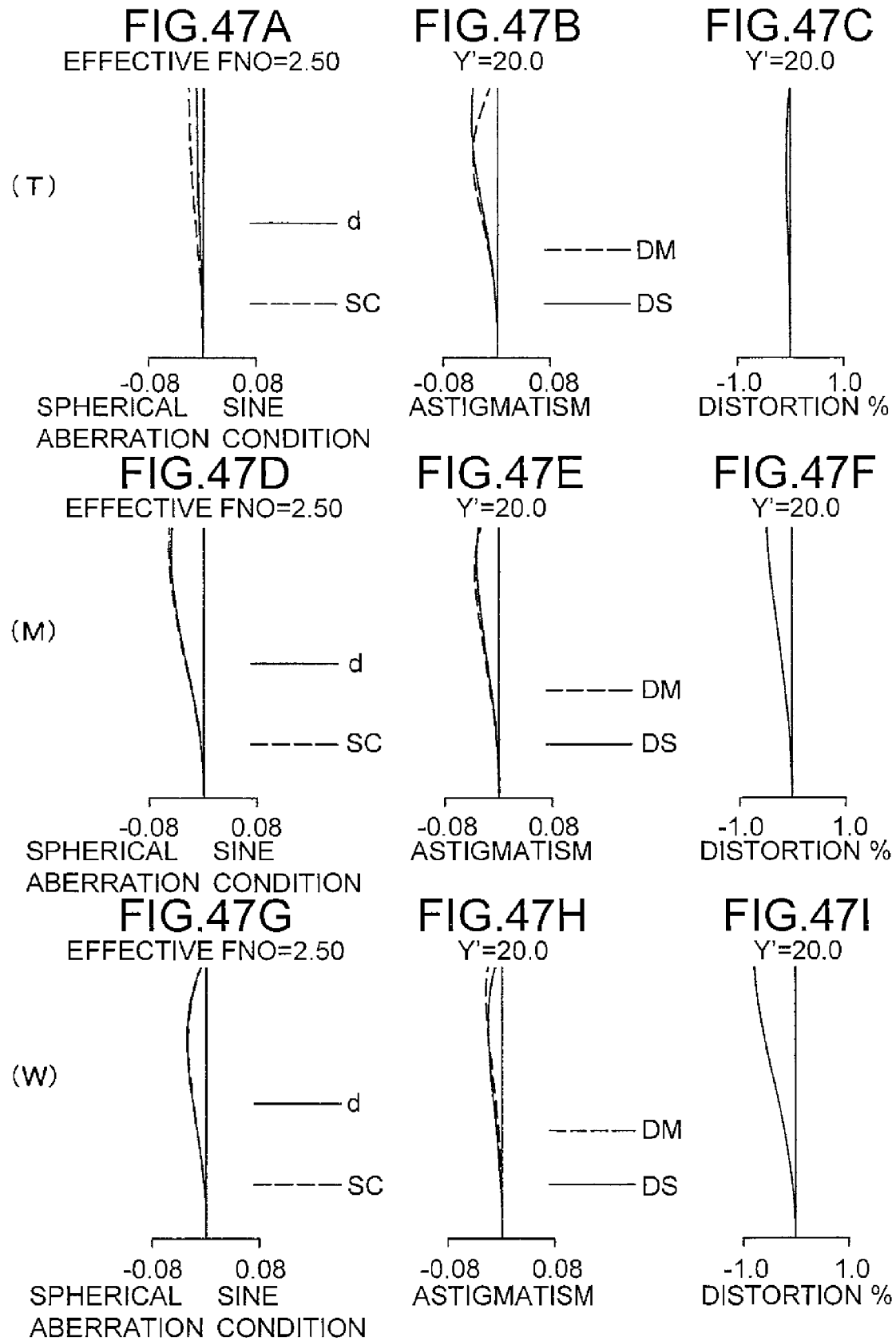

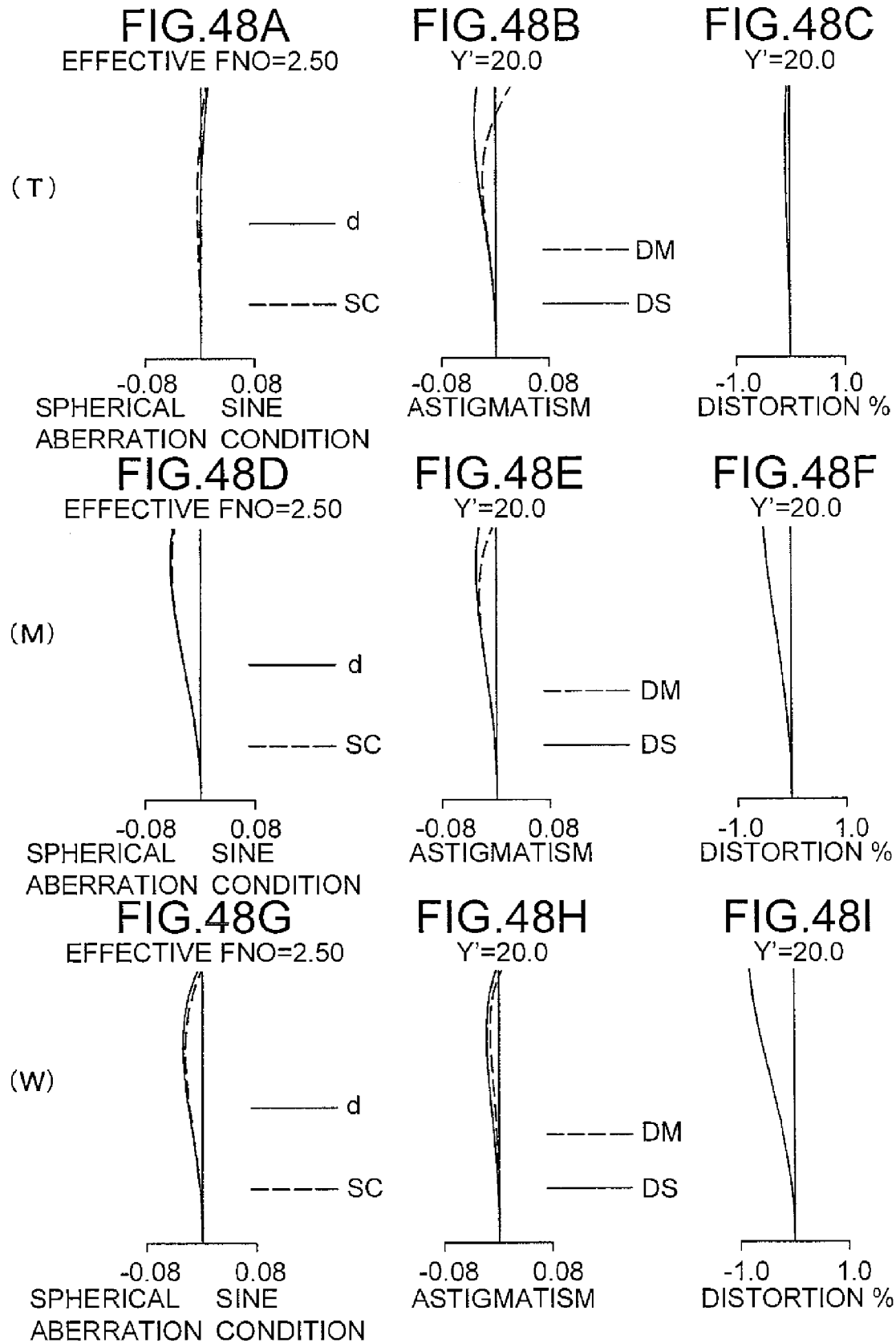

VARIABLE-FOCAL-LENGTH PROJECTION LENS SYSTEM AND PROJECTION APPARATUS

This application is based on Japanese Patent Application No. 2011-120823 filed on May 30, 2011, the contents of which are hereby incorporated by reference.

BACKGROUND OF THE INVENTION

1. Field of the Invention

The present invention relates to a variable-focal-length lens system for projection and a projection apparatus. More particularly, the invention relates, for example, to a variable-focal-length projection lens system with a magnification varying function suitable for enlarged projection of an image displayed on an image display device, such as a digital micromirror device or an LCD (liquid crystal display), onto a screen, and to a projection apparatus provided with such a variable-focal-length projection lens system.

2. Description of Related Art

Many projection apparatus for business use, in particular digital cinematographic projection apparatus, adopt a focusing method involving forward shifting of an entire projection lens system. This projection method involving the forward shifting of an entire lens system has the disadvantage of requiring a large focusing mechanism for moving the large, heavy lens system as a whole, though, on the other hand, it also has the advantage of achieving satisfactory focus even when the back focal length of the projection lens system is slightly deviated from the design value. Thus, the entire-system forward shifting projection method is considered suitable for business use.

Inconveniently, however, the entire-system forward shifting projection method mentioned above suffers from a number of problems in terms of optical performance. Specifically, the projection lens system is expected to provide satisfactory projection performance over the range of distance in which the projection distance may vary, but in reality, so long as the projection lens system is left intact, its performance deteriorates notably as the projection distance varies. Though depending on the size of the movie theater, when the projection distance varies from 45 m (remote projection) to 15 m (close projection), leaving the projection lens system intact brings a variation in curvature of field that amounts to 20 µm to 30 µm (as measured on the reduction-side image surface) to the over side (the over side here denotes the direction going away from the projection lens system).

Before, the size of each pixel on an image display device was so large that a variation in curvature of field as mentioned above did not pose a serious problem. Today, however, a 4K-compatible (4096×2160-pixel) image display device of the same chip size has a far larger number of pixels, and thus each pixel has one-half or less of the conventional size. Accordingly, a variation in curvature of field resulting from a variation in projection distance now poses a serious problem. Addressing the problem, Patent Document 1 listed below proposes a varifocal lens system devised for improved projection performance.

Patent Document 1: JP-A-2002-122782

The variable-focal-length projection lens system disclosed in Patent Document 1 is a varifocal projection lens system composed of four, namely a positive, a negative, a positive, and a positive, lens groups wherein, during magnification varying, the first lens group remains stationary while the second, third, and fourth lens groups move. During focusing, the entire projection lens system moves, and during magnification varying, the image surface moves greatly even with the projection distance constant. For example, in Example 1, the image surface (reduction-side) moves 2.2 mm at the maximum, and in Example 2, the image surface (reduction-side) moves 17 mm at the maximum. Here, increasing flexibility in design results in enhanced projection performance, but no measures are taken against a variation in curvature of field resulting from a variation in projection distance, with the result that, as the projection distance varies from 45 m (remote projection) to 15 m (close projection), curvature of field varies about 20 µm to the over side. Such notable deterioration in projection performance resulting from a variation in projection distance makes the projection performance unsatisfactory in projection onto screens of varying sizes, from large to small, using recent high-definition image display devices.

SUMMARY OF THE INVENTION

The present invention has been devised against the background discussed above, and aims to provide a high-performance variable-focal-length lens system for projection that offers satisfactory projection performance even with a variation in projection distance, and to provide a projection apparatus that is provided with such a variable-focal-length projection lens system.

According to one aspect of the invention, a variable-focal-length lens system for projection which achieves focusing by movement of the entire system includes: two or more focal-length-varying lens groups which individually move in the optical axis direction to vary the group-to-group distances so as to vary the focal length of the entire system; and a distance-compensation lens group which is separate from the focal-length-varying lens groups and which, during focusing, move in the optical axis direction such that, as the projection distance varies from a remote distance to a close distance, curvature of field varies to the under side.

According to another aspect of the invention, a projection apparatus includes: a variable-focal-length lens system for projection which achieves focusing by movement of the entire system, the variable-focal-length lens system including two or more focal-length-varying lens groups which individually move in the optical axis direction to vary the group-to-group distance so as to vary the focal length of the entire system, and a distance-compensation lens group which is separate from the focal-length-varying lens groups and which, during focusing, move in the optical axis direction such that, as the projection distance varies from a remote distance to a close distance, curvature of field varies to the under side; and a focusing mechanism which, during focusing, moves the entire system and also moves the distance-compensation lens group in the optical axis direction.

According to yet another aspect of the invention, a projection apparatus includes: a variable-focal-length lens system including, from the enlargement side, a distance-compensation lens group which remains stationary during magnification varying and which, during focusing, moves in the optical axis direction such that, as the projection distance varies from a remote distance to a close distance, curvature of field varies to an under side, and at least two focal-length-varying lens groups which individually move in the optical axis direction to vary the group-to-group distance so as to vary the focal length of the entire system; a lens barrel which holds the variable-focal-length lens system including the distance-compensation lens group and the focal-length-varying lens groups; and a focusing mechanism which, during focusing, moves the entire variable-focal-length lens system in the optical axis direction and also moves the distance-compensation lens group in the optical axis direction.

BRIEF DESCRIPTION OF THE DRAWINGS

FIGS. 13A to 13I are aberration diagrams of Practical Example 1 (remote projection);

FIGS. 14A to 14I are aberration diagrams of Practical Example 1 (close projection);

FIGS. 18A to 18I are aberration diagrams of Comparison Example 2 (close projection, no correction);

FIGS. 23A to 23I are aberration diagrams of Practical Example 4 (close projection);

FIGS. 29A to 29I are aberration diagrams of Practical Example 6 (close projection);

FIGS. 32A to 32I are aberration diagrams of Practical Example 7 (close projection);

FIGS. 33A to 33I are aberration diagrams of Comparison Example 7 (close projection, no correction);

FIGS. 34A to 34I are aberration diagrams of Practical Example 8 (remote projection);

FIGS. 36A to 36I are aberration diagrams of Comparison Example 8 (close projection, no correction);

FIGS. 37A to 37I are aberration diagrams of Practical Example 9 (remote projection);

FIGS. 38A to 38I are aberration diagrams of Practical Example 9 (close projection);

FIGS. 40A to 40I are aberration diagrams of Practical Example 10 (remote projection);

FIGS. 41A to 41I are aberration diagrams of Practical Example 10 (close projection);

FIGS. 42A to 42I are aberration diagrams of Comparison Example 10 (close projection, no correction);

FIGS. 43A to 43I are aberration diagrams of Practical Example 11 (remote projection);

FIGS. 44A to 44I are aberration diagrams of Practical Example 11 (close projection);

FIGS. 45A to 45I are aberration diagrams of Comparison Example 11 (close projection, no correction);

FIGS. 46A to 46I are aberration diagrams of Practical Example 12 (remote projection);

FIGS. 47A to 47I are aberration diagrams of Practical Example 12 (close projection);

FIGS. 48A to 48I are aberration diagrams of Comparison Example 12 (close projection, no correction);

DETAILED DESCRIPTION OF PREFERRED EMBODIMENTS

Figure 1:
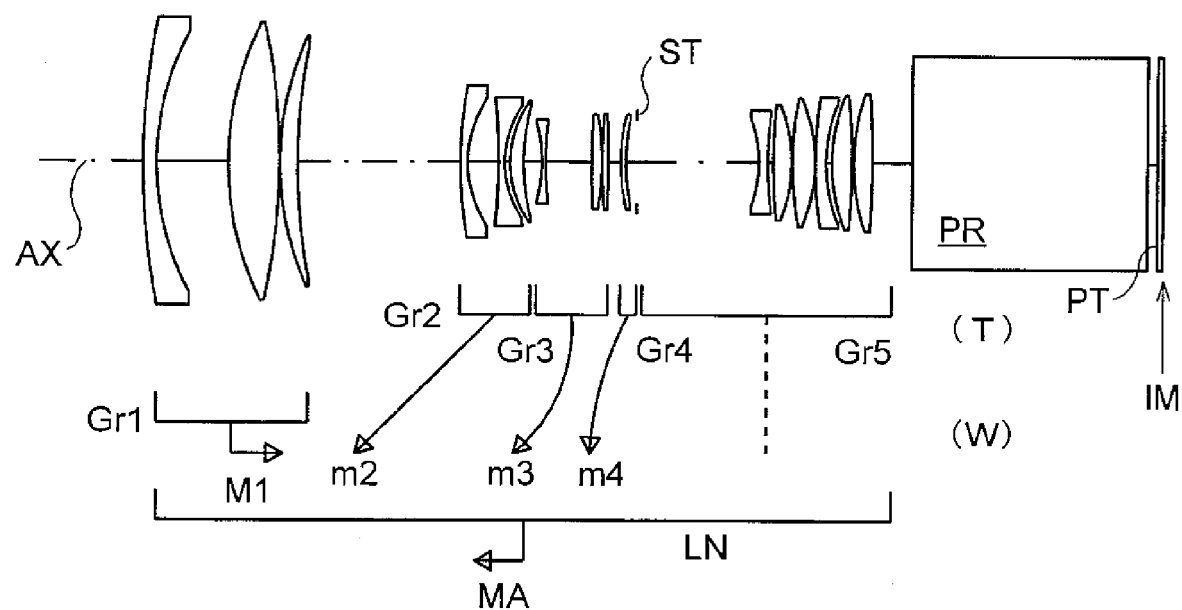
FIG. 1 is a lens construction diagram of a first embodiment (Practical Example 1) of the invention.

Hereinafter, variable-focal-length lens systems etc. according to the present invention will be described. A variable-focal-length lens system according to the invention is a variable-focal-length lens system for projection that performs focusing by movement of the entire system; it includes two or more focal-length-varying lens groups which individually move in the optical axis direction to vary the group-to-group distances so as to vary the focal length of the entire system, and a distance-compensation lens group which is separate from the focal-length-varying lens groups and which, during focusing, moves in the optical axis direction such that, as the projection distance varies from a remote distance to a close distance, curvature of field (reduction-side) varies to the under side. The under side here denotes the direction coming closer to the projection lens system.

For example, in a case where a variable-focal-length lens system of an entire-system moving-out type is incorporated in a cinematographic projector compatible with a 4K panel relying on DLP (digital light processing, a registered trademark of Texas Instruments, USA), without distance compensation, as the projection distance varies from 45 m (remote projection) to 15 m (close projection), curvature of field (reduction-side) varies about 20 μm to 30 μm to the over side. As mentioned earlier, deterioration in performance resulting from such a variation in distance poses a serious problem with modern image display devices with ever increasing numbers of pixels. Allowing for variations in performance to secure satisfactory projection performance leads to a steep increase in lens cost, and the increased size of the projection lens system means an increased burden on the projection apparatus that incorporates it. By contrast, a variable-focal-length projection lens system according to the invention includes, separate from focal-length-varying lens groups, a distance-compensation lens group which, during focusing, moves in the optical axis direction such that, as the projection distance varies from a remote distance to a close distance, curvature of field varies to the under side. Thus, it is possible, with a simple construction, to correct curvature of field satisfactorily and obtain high projection performance.

Owing to the above-described distinctive construction of the variable-focal-length lens system, even when the projection distance varies, satisfactory projection performance is obtained; in addition, it is possible, with a simple construction, to achieve high performance, low cost, and compact size simultaneously. Incorporating the variable-focal-length lens system in a projection apparatus contributes to achieving compactness, high performance, high versatility, etc. in the projection apparatus. These effects can be obtained with a good balance, and even higher optical performance, further size reduction, etc. can be achieved, by fulfilling the conditions and other requirements described below.

It is preferable that the amount of movement of the distance-compensation lens group remains constant so long as the projection distance is constant, regardless of the focal length of the entire system. This construction eliminates the need to move the distance-compensation lens group when the projection size is varied by zooming, and thus helps greatly improve ease of operation.

It is preferable that the variable-focal-length lens system include, from the enlargement side, a distance-compensation lens group as mentioned above which has a positive optical power and focal-length-varying lens groups as mentioned above of which at least one has a negative optical power (an optical power is a quantity defined as the reciprocal of a focal length), wherein, as the projection distance varies from a remote distance to a close distance, the distance-compensation lens group moves to the reduction side, and the following conditional formulae (1A) and (2A) are fulfilled:

$$0.15 < fw/fa < 0.25 \quad (1A)$$

$$-0.75 < AT/1T < -0.05 \quad (2A)$$

where
fw represents the focal length of the entire system at the wide-angle end;
fa represents the focal length of the distance-compensation lens group;
AT represents the amount of movement of the entire system for a variation in projection distance from a remote distance to a close distance (with an amount of movement to the reduction side defined to be in the positive direction); and
1T represents the amount of movement of the distance-compensation lens group for a variation in projection distance from a remote distance to a close distance (with an amount of movement to the reduction side defined to be in the positive direction).

In common front-lens focusing, the focusing lens group, irrespective of whether it has a positive or negative optical power, moves to the enlargement side as the projection distance varies from a remote distance to a close distance. By contrast, in the above construction, as the projection distance varies from a remote distance to a close distance, the distance-compensation lens group which has a positive optical power moves to the reduction side and thereby corrects curvature of field to the under side. This movement of the distance-compensation lens group causes the focus position to move in the positive direction; thus, the entire variable-focal-length lens system needs to be moved farther in the negative direction (to the enlargement side) than when the distance-compensation lens group is not moved.

Below the lower limit of conditional formula (1A), the focal length fa of the distance-compensation lens group is long in relation to the focal length fw at the wide-angle end, and thus the desired correction of curvature of field requires an increased amount of movement. This results in an increased difference in the amount of correction of curvature of field between the telephoto and wide-angle ends. For example, when the amount of movement is set such that the amount of correction of curvature of field is adequate at the wide-angle end, the amount of correction of curvature of field is excessive at the telephoto end, with the result that the image surface tends to lean greatly to the under side on the close-distance side.

Above the upper limit of conditional formula (1A), the focal length fa of the distance-compensation lens group is short in relation to the focal length fw at the wide-angle end, and thus with a reduced amount of movement, curvature of field can be corrected properly both at the telephoto and wide-angle ends. Simultaneously, however, differences in other aberrations, such as coma and chromatic spherical aberration, tend to increase. Out of these considerations, conditional formula (1A) defines a conditional range that should preferably be observed in correcting curvature of field and other aberrations. It is preferable that the distance-compensation lens group be composed of two or more lens elements.

Conditional formula (2A) represents the ratio of the amount of movement of the entire system to the amount of movement of the distance-compensation lens group for a variation in projection distance from a remote distance to a close distance (that is, assuming that the projection distance is the distance from the lens front end to the screen, for the variation in projection distance from 45 m to 15 m). The amount of movement AT of the entire system has a negative value because the direction of its movement from a remote distance to a close distance is to the enlargement side, and the amount of movement 1T of the distance-compensation lens group has a positive value because the direction of its movement from a remote distance to a close distance is to the reduction side.

Above the upper limit of conditional formula (2A), the amount of movement of the distance-compensation lens group is large, and thus the amount of correction of curvature of field by the distance-compensation lens group tends to be excessive. By contrast, below the lower limit of conditional formula (2A), the amount of correction of curvature of field by the distance-compensation lens group tends to be small. Out of these considerations, conditional formula (2A) defines a conditional range that should preferably be fulfilled. Incidentally, the amount of forward shifting of the entire system is large at the telephoto end, where the focal length is long. Thus, for a given projection distance, provided that the amount of movement of the distance-compensation lens group is constant over the range from the telephoto to the wide-angle end, the value of conditional formula (2A) approaches the lower limit at the telephoto end and approaches the upper limit at the wide-angle end. The amount of forward shifting of the entire system and the focal length are in a linear relationship, and accordingly the value of conditional formula (2A) at the middle position equals the middle value between its values at the telephoto and wide-angle ends.

It is preferable that the variable-focal-length lens system include, from the enlargement side, a distance-compensation lens group as mentioned above which has a negative optical power and focal-length-varying lens groups as mentioned above of which at least one has a positive optical power, wherein, as the projection distance varies from a remote distance to a close distance, the distance-compensation lens group moves to the enlargement side, and the following conditional formulae (1B) and (2B) are fulfilled:

$$-0.8 < fw/fa < -0.3 \quad (1B)$$

$$-0.35 < |AT|/1T < -0.03 \quad (2B)$$

where fw represents the focal length of the entire system at the wide-angle end;

fa represents the focal length of the distance-compensation lens group;

AT represents the amount of movement of the entire system for a variation in projection distance from a remote distance to a close distance (with an amount of movement to the reduction side defined to be in the positive direction); and 1T represents the amount of movement of the distance-compensation lens group for a variation in projection distance from a remote distance to a close distance (with an amount of movement to the reduction side defined to be in the positive direction).

In a case where the distance-compensation lens group has a negative optical power, the direction in which it is moved is the same as in ordinary front-lens focusing. As the projection distance varies from a remote distance to a close distance, the distance-compensation lens group moves in the negative direction (to the enlargement side) and thereby corrects curvature of field to the under side. Depending on how effectively the distance-compensation lens group corrects curvature of field and how the projection distance varies as the distance-compensation lens group moves, the entire variable-focal-length lens system may be moved in the positive direction (to the reduction side), or may be hardly moved, or may be slightly moved in the negative direction (to the enlargement side). When the entire variable-focal-length lens system is moved in the positive direction (to the reduction side), curvature of field can be corrected further to the under side.

Above the upper limit of conditional formula (1B), the focal length fa of the distance-compensation lens group is long in relation to the focal length fw at the wide-angle end, and thus the desired correction of curvature of field requires an increased amount of movement. This results in an increased difference in the amount of correction of curvature of field between the telephoto and wide-angle ends. For example, when the amount of movement is set such that the amount of correction of curvature of field is adequate at the wide-angle end, the amount of correction of curvature of field is excessive at the telephoto end, with the result that the image surface tends to lean greatly to the under side on the close-distance side.

Below the lower limit of conditional formula (1B), the focal length fa of the distance-compensation lens group is short in relation to the focal length fw at the wide-angle end, and thus with a reduced amount of movement, curvature of field can be corrected properly both at the telephoto and wide-angle ends. Simultaneously, however, differences in other aberrations, such as coma and chromatic spherical aberration, tend to increase. Out of these considerations, conditional formula (1B) defines a conditional range that should preferably be observed in correcting curvature of field and other aberrations. It is preferable that the distance-compensation lens group be composed of two or more lens elements.

Conditional formula (2B) represents the ratio of the amount of movement of the entire system to the amount of movement of the distance-compensation lens group for a variation in projection distance from a remote distance to a close distance (that is, assuming that the projection distance is the distance from the lens front end to the screen, for the variation in projection distance from 45 m to 15 m). The amount of movement AT of the entire system has a positive or negative value because the direction of its movement from a remote distance to a close distance may be to the enlargement side or to the reduction side, and the amount of movement 1T of the distance-compensation lens group has a negative value because the direction of its movement from a remote distance to a close distance is to the reduction side.

Below the lower limit of conditional formula (2B), the amount of movement of the distance-compensation lens group is large, and thus the amount of correction of curvature of field by the distance-compensation lens group tends to be excessive. By contrast, above the upper limit of conditional formula (2B), the amount of correction of curvature of field by the distance-compensation lens group tends to be small. Out of these considerations, conditional formula (2B) defines a conditional range that should preferably be fulfilled. Incidentally, the amount of forward shifting of the entire system is large at the telephoto end, where the focal length is long. Thus, for a given projection distance, provided that the amount of movement of the distance-compensation lens group is constant over the range from the telephoto to the wide-angle end, the value of conditional formula (2B) approaches the lower limit at the telephoto end and approaches the upper limit at the wide-angle end. The amount of forward shifting of the entire system and the focal length are in a linear relationship, and accordingly the value of conditional formula (2B) at the middle position equals the middle value between its values at the telephoto and wide-angle ends.

It is preferable that the variable-focal-length lens system include five or more lens groups including, from the enlargement side, a distance-compensation lens group as mentioned above which has a positive optical power, a focal-length-varying lens group as mentioned above which has the largest amount of movement and which has a negative optical power, two or more focal-length-varying lens groups as mentioned above which have a positive or negative optical power, and a lens group which is located the reduction-side end, which remains stationary during magnification varying, and which has a positive optical power. The second lens group from the enlargement side, that is, the focal-length-varying lens group which has a negative optical power, has a long movement stroke to mainly perform a magnification varying function, and the subsequent two or more focal-length-varying lens groups which have a positive or negative optical power mainly perform a curvature-of-field correcting function. Since the lens system is a variable-focal-length lens system (that is, a varifocal lens system), it can even be constructed to have only one lens group with a curvature-of-field correcting function; this configuration, however, produces a large variation in curvature of field during magnification varying, and therefore, to avoid that, it is preferable that the lens system be constructed to have two or more lens groups with a curvature-of-field correcting function.

It is preferable that the variable-focal-length lens system include five or more lens groups including, from the enlargement side, a distance-compensation lens group as mentioned above which has a negative optical power, three or more focal-length-varying lens groups as mentioned above which have a positive or negative optical power, and a lens group which is located at the reduction-side end, which remains stationary during magnification varying, and which has a positive optical power, wherein at least one of the three or more focal-length-varying lens groups is a focal-length-varying lens group which has the largest amount of movement and which has a positive optical power. The focal-length-varying lens group which has a positive optical power has a long movement stroke to mainly perform a magnification varying function, and the two or more focal-length-varying lens groups which have a positive or negative optical power mainly perform a curvature-of-field correcting function. Since the lens system is a variable-focal-length lens system (that is, a varifocal lens system), it can even be constructed to have only one lens group with a curvature-of-field correcting function; this configuration, however, produces a large variation in curvature of field during magnification varying, and therefore, to avoid that, it is preferable that the lens system be constructed to have two or more lens groups with a curvature-of-field correcting function.

It is preferable that the variable-focal-length lens system be approximately telecentric to the reduction side and fulfill the following conditional formulae (3) and (4):

$$1.27 < ft/fw < 2.5 \quad (3)$$

$$5 < LB/Y\max < 7 \quad (4)$$

where ft represents the focal length of the entire system at the telephoto end;

fw represents the focal length of the entire system at the wide-angle end;

LB represents the minimum air-equivalent back focal length; and

Ymax represents the maximum image height.

Fulfilling conditional formulae (3) and (4) and adopting a construction approximately telecentric to the reduction side make it possible to secure a long back focal length as well as a zoom ratio that can cope with varying screen sizes from VistaVision to CinemaScope. Thus, it is possible to meet the requirements for high-resolution cinematographic projection apparatus.

Next, specific optical constructions of the variable-focal-length lens system LN for projection will be described by way of a first to a twelfth embodiment. FIGS. 1 to 12 are optical construction diagrams corresponding to the variable-focal-length lens system LN in the first to twelfth embodiments, respectively, showing the lens arrangement and other features as observed at the telephoto end (T), with a projection distance (distance from the lens front end to the screen) of −45 m, as seen on an optical section. In the optical construction diagrams, arrow MA indicates the direction of the movement of the entire system during focusing to vary the projection distance from a remote distance to a close distance. The first lens group Gr1 is a distance-compensation lens group, and in the optical construction diagrams, arrow M1 indicates the direction of the movement of the first lens group Gr1 during focusing to vary the projection distance from a remote distance to a close distance.

In the optical construction diagrams, movement loci m2, m3, m4, and m5 schematically indicate the movement of the second, third, fourth, and fifth lens groups Gr2, Gr3, Gr4, and Gr5, respectively, during zooming from the telephoto end (T) to the wide-angle end (W). It should be noted that the first lens group Gr1 and the last lens group (that is, the fifth lens group Gr5 in FIGS. 1 to 6 and 8 to 12 and the sixth lens group Gr6 in FIG. 7) are stationary lens groups, and that the prism PR (for example, a TIR (total internal reflection) prism) and the cover glass PT of an image display device, which are located on the reduction side of the variable-focal-length lens system LN, also remain stationary during zooming.

Table 1 shows the power arrangements of the variable-focal-length lens system LN in the first to twelfth embodiments respectively. In Table 1, the symbol "+" stands for "positive," and the symbol "−" stands for "negative." Of the twelve embodiments, the first to sixth are of the type in which the first lens group Gr1, that is, the distance-compensation lens group, has a positive optical power (P1 to P6) and the seventh to twelfth are of the type in which the first lens group Gr1, that is, the distance-compensation lens group, has a negative optical power (N1 to N6).

TABLE 1

Figure 2:
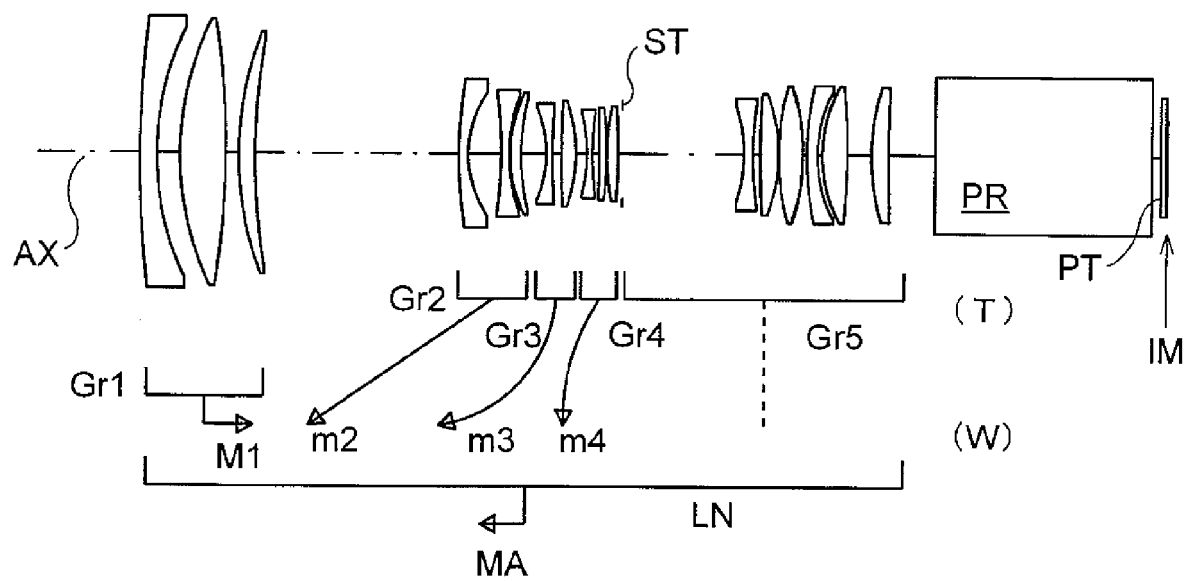
FIG. 2 is a lens construction diagram of a second embodiment (Practical Example 2) of the invention.
Figure 3:
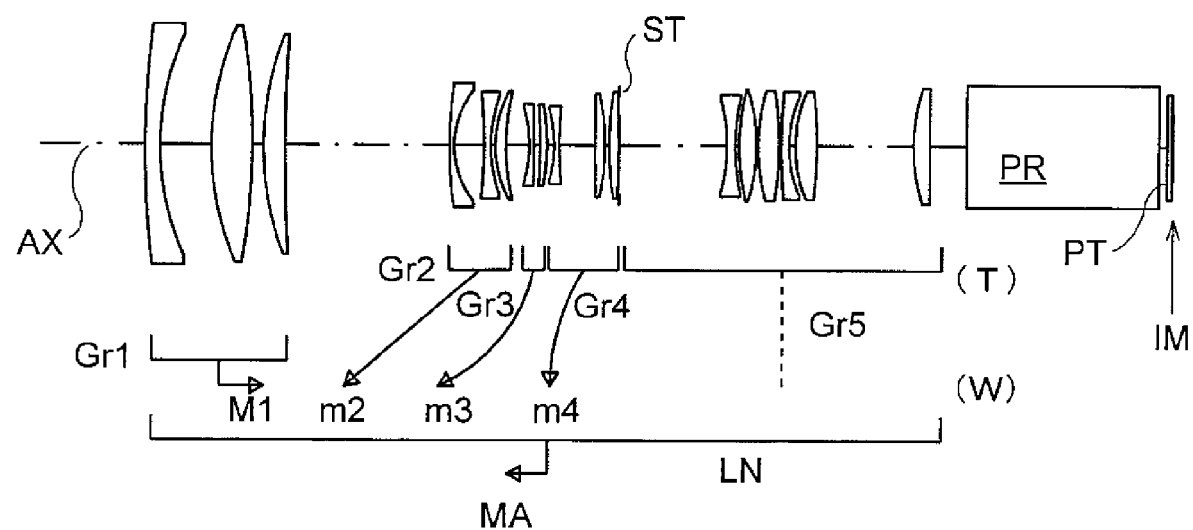
FIG. 3 is a lens construction diagram of a third embodiment (Practical Example 3) of the invention.
Figure 4:
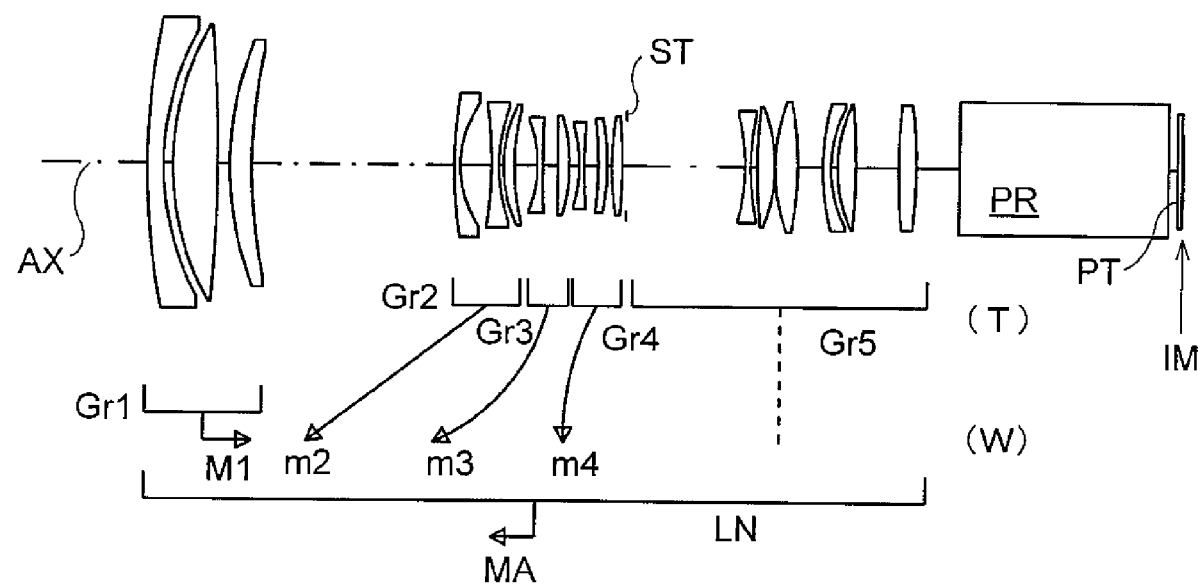
FIG. 4 is a lens construction diagram of a fourth embodiment (Practical Example 4) of the invention.
Figure 5:
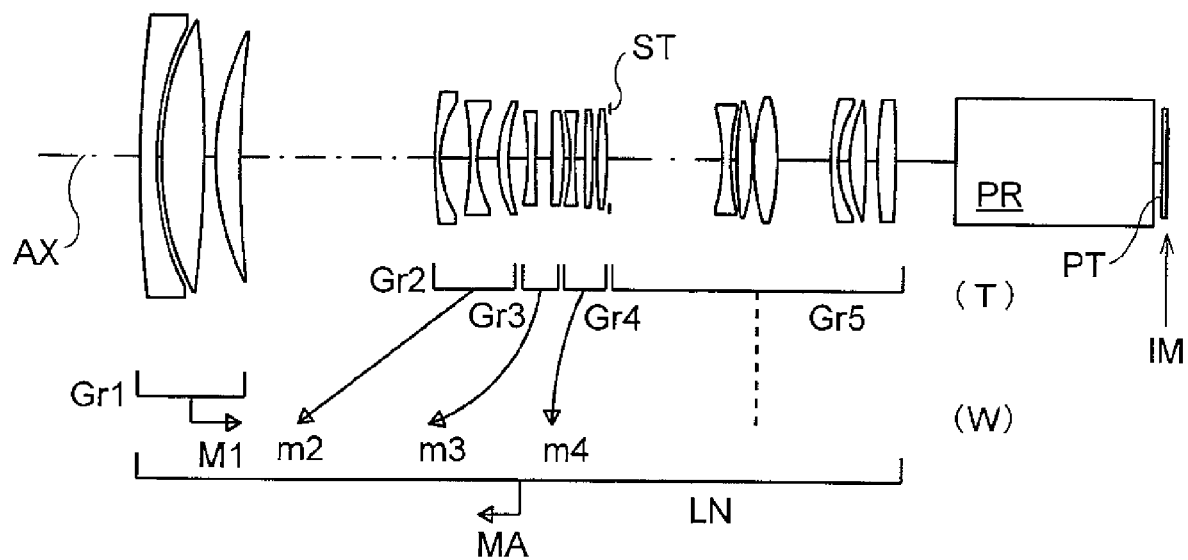
FIG. 5 is a lens construction diagram of a fifth embodiment (Practical Example 5) of the invention.
Figure 6:
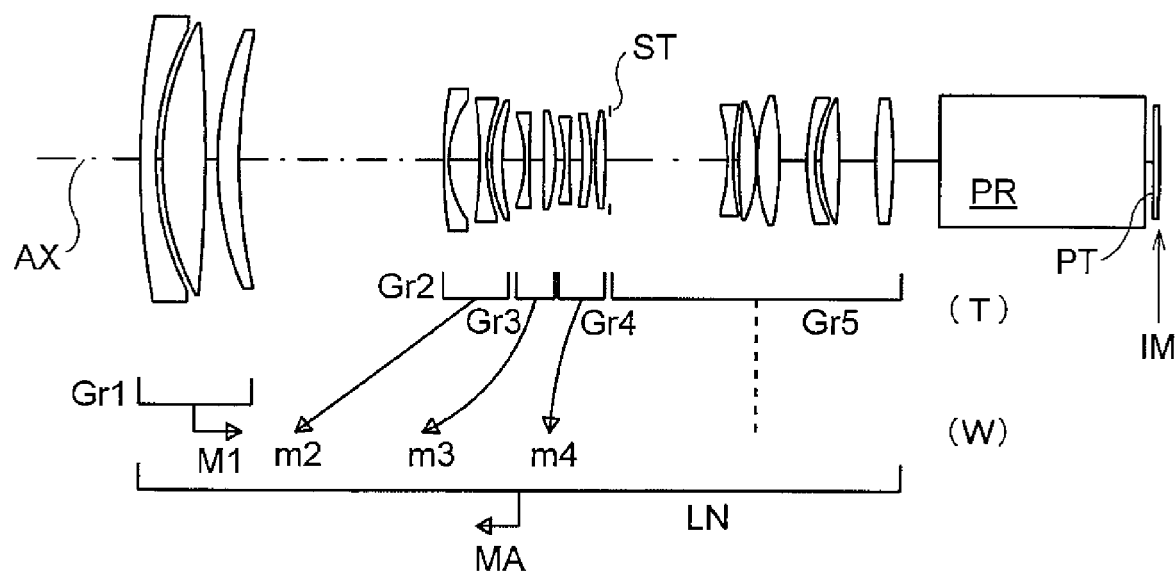
FIG. 6 is a lens construction diagram of a sixth embodiment (Practical Example 6) of the invention.
Figure 7:
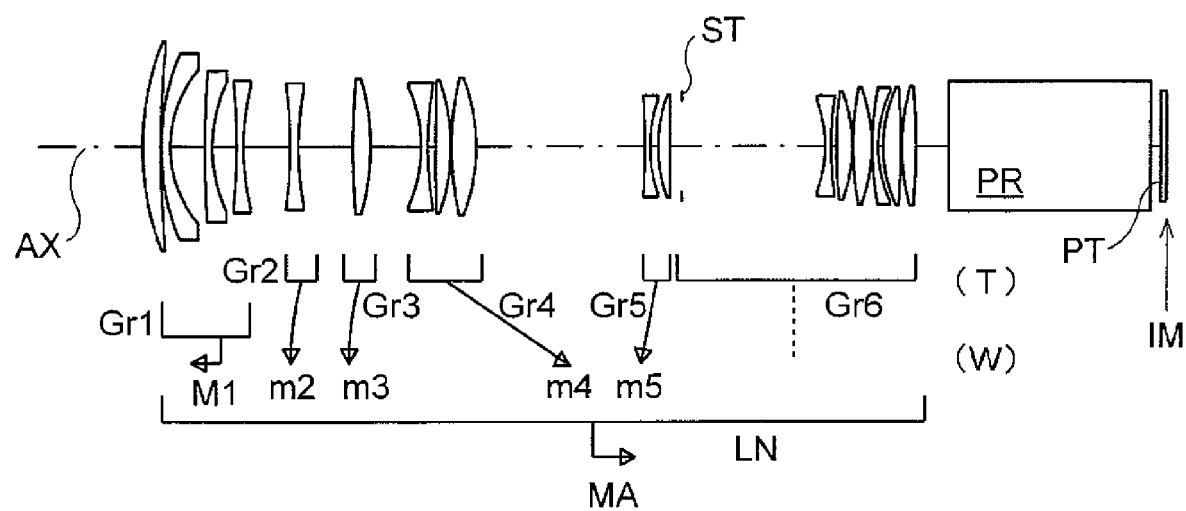
FIG. 7 is a lens construction diagram of a seventh embodiment (Practical Example 7) of the invention.
Figure 8:
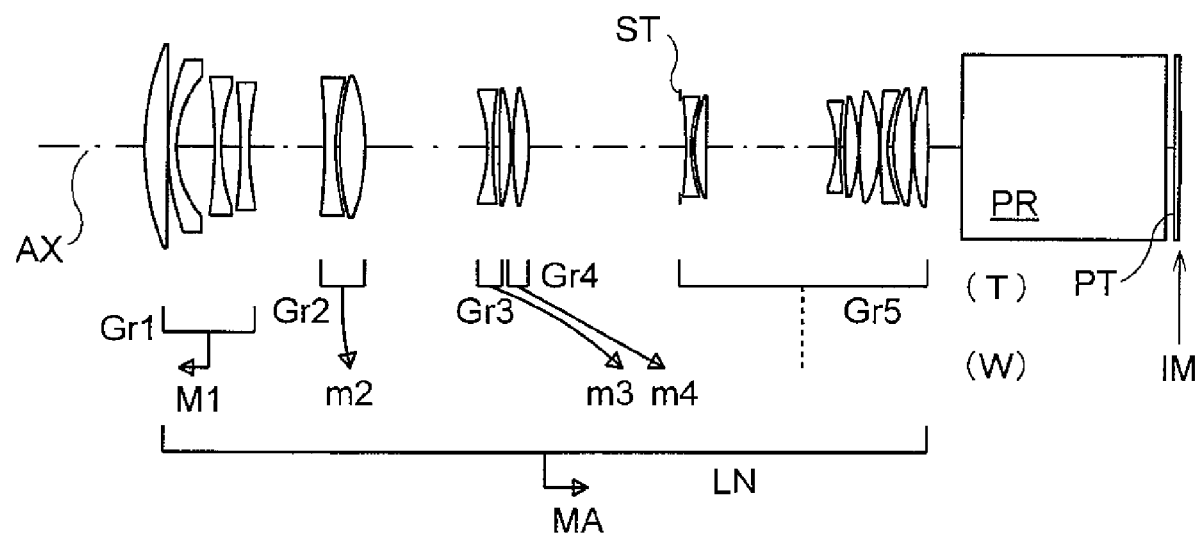
FIG. 8 is a lens construction diagram of an eighth embodiment (Practical Example 8) of the invention.
Figure 9:
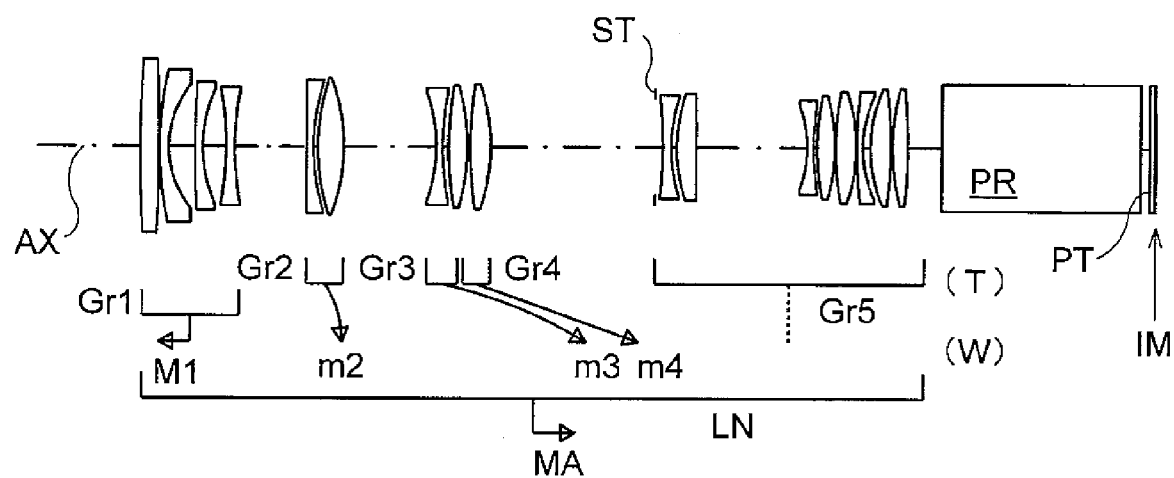
FIG. 9 is a lens construction diagram of a ninth embodiment (Practical Example 9) of the invention.
Figure 10:
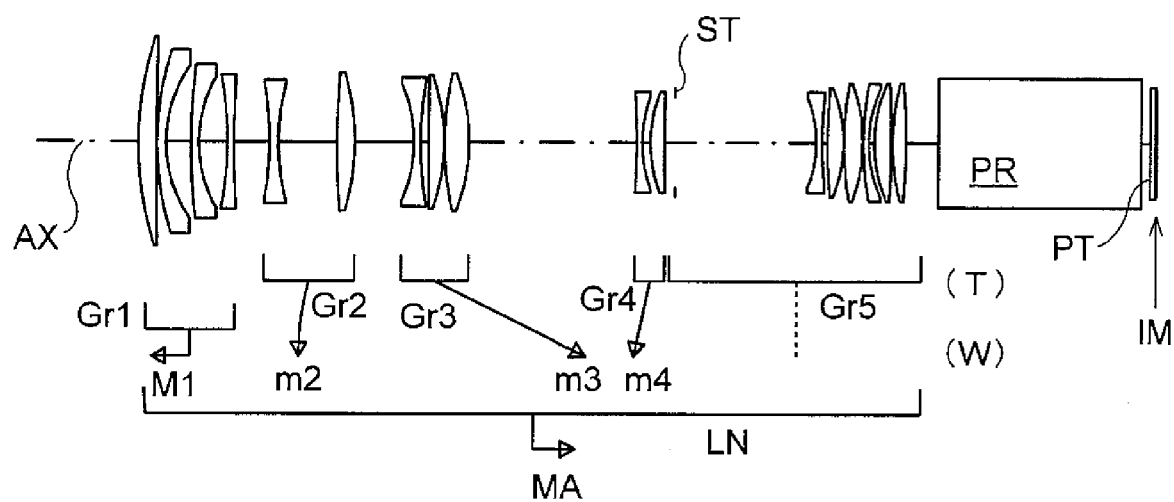
FIG. 10 is a lens construction diagram of a tenth embodiment (Practical Example 10) of the invention.
Figure 11:
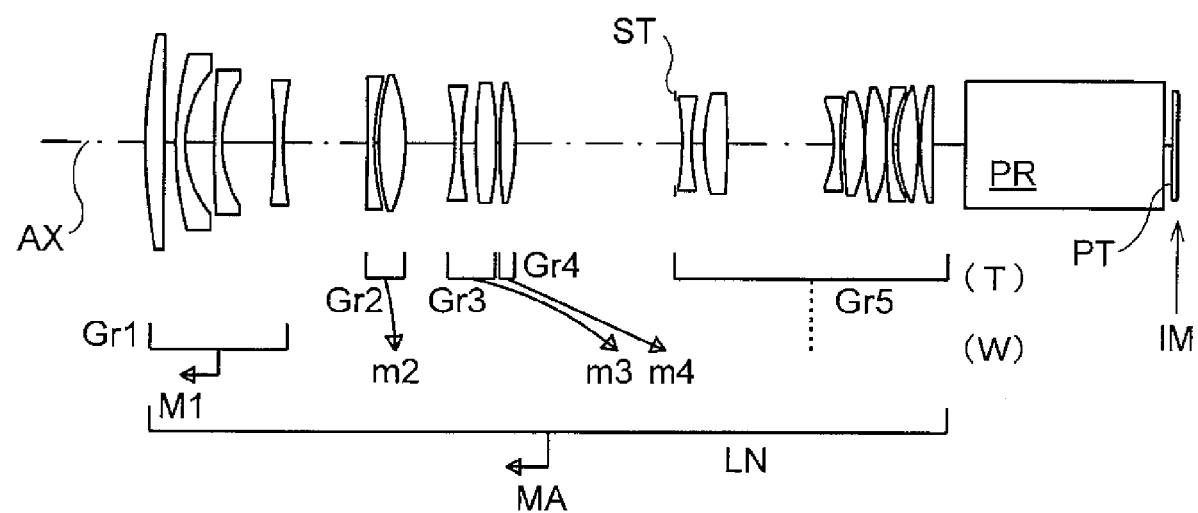
FIG. 11 is a lens construction diagram of an eleventh embodiment (Practical Example 11) of the invention.
Figure 12:
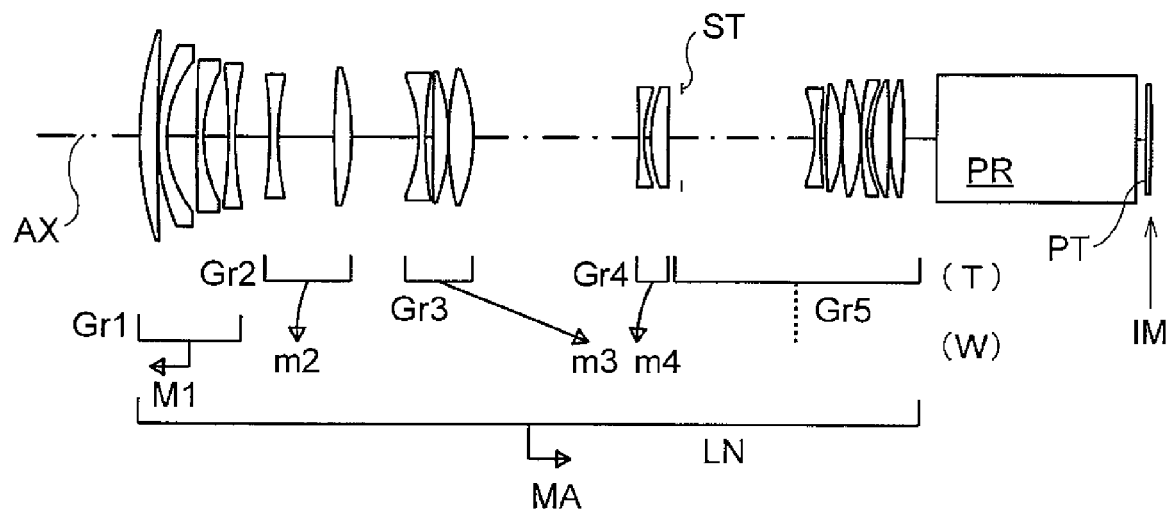
FIG. 12 is a lens construction diagram of a twelfth embodiment (Practical Example 12) of the invention.
Figure 15A:
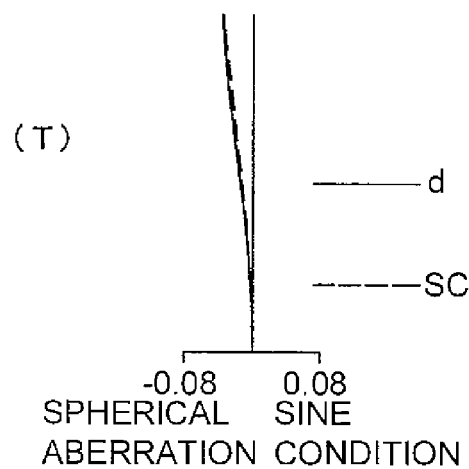
FIGS. 15A to 15I are aberration diagrams of Comparison Example 1 (close projection, no correction)
Figure 15B:
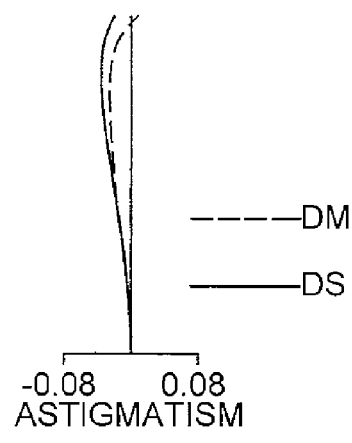
Figure 15C:
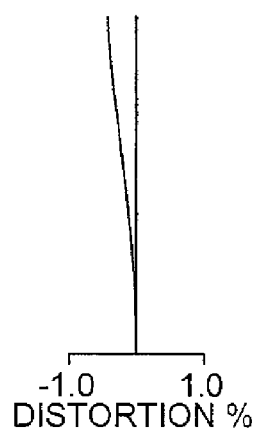
Figure 15D:
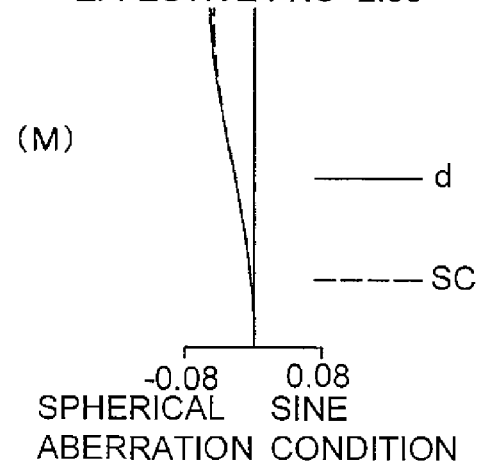
Figure 15E:
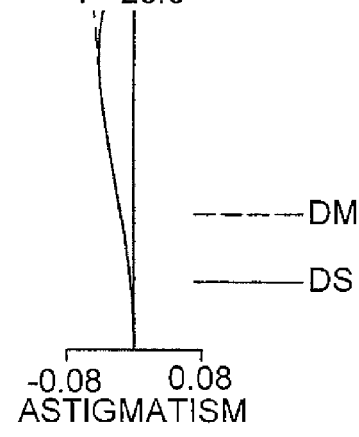
Figure 15F:
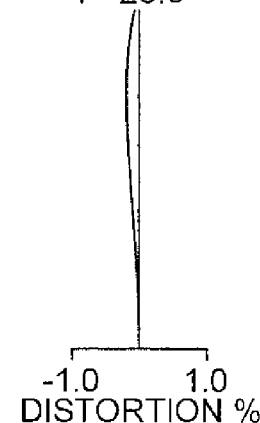
Figure 15G:
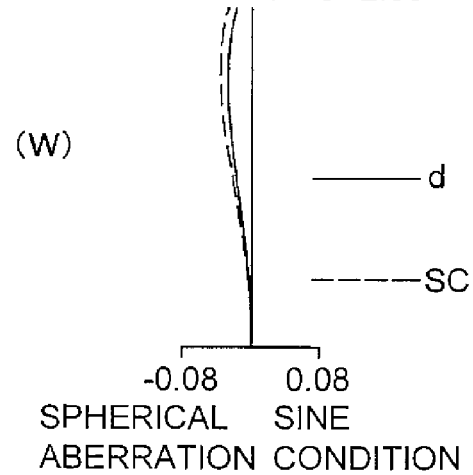
Figure 15H:
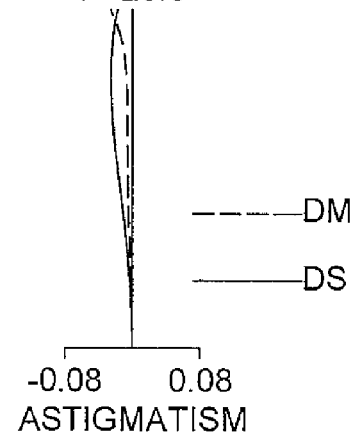
Figure 15I:
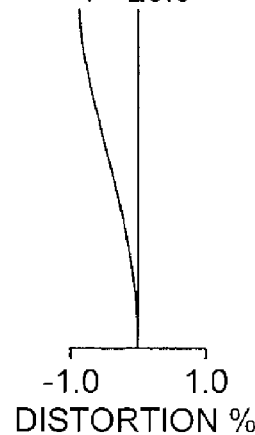
Figure 16A:
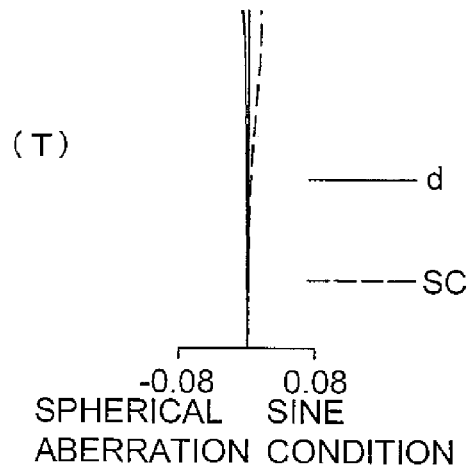
FIGS. 16A to 16I are aberration diagrams of Practical Example 2 (remote projection)
Figure 16B:
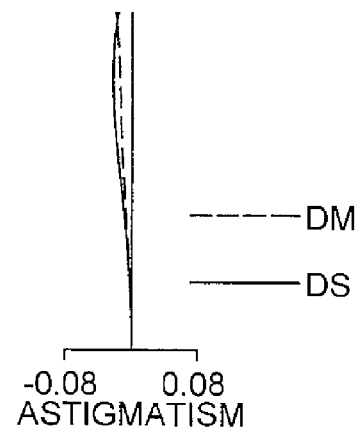
Figure 16C:
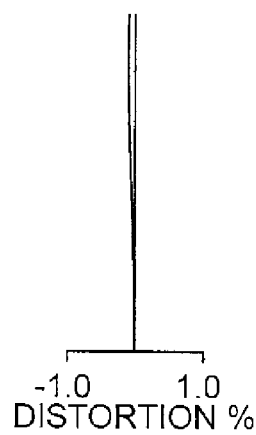
Figure 16D:
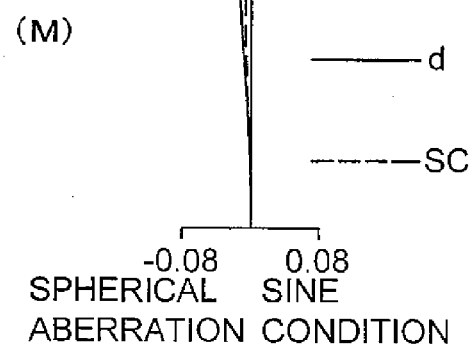
Figure 16E:
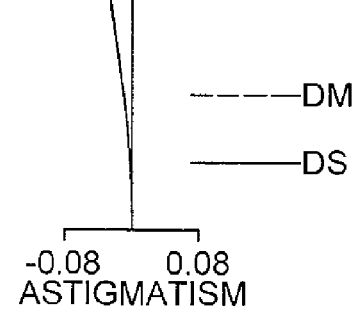
Figure 16F:
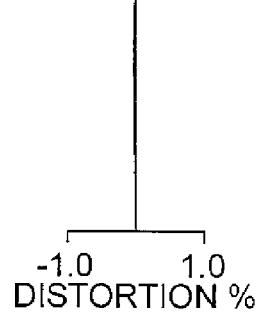
Figure 16G:
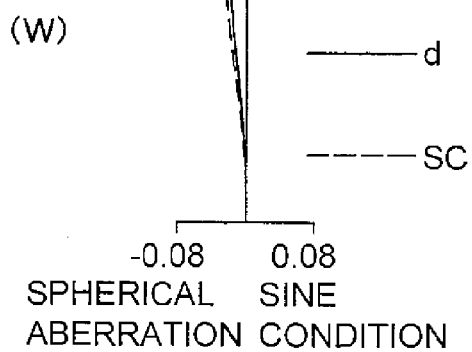
Figure 16H:
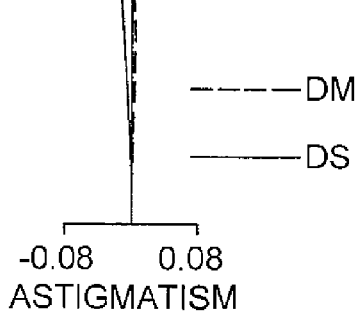
Figure 16I:
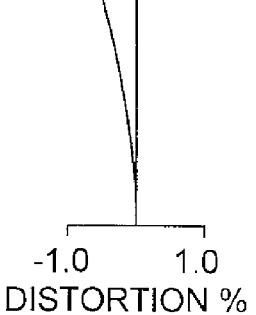
Figure 17A:
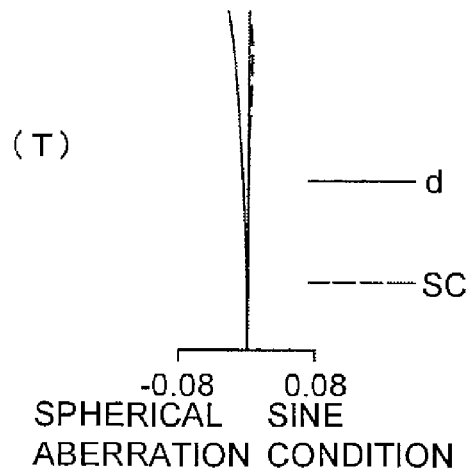
FIGS. 17A to 17I are aberration diagrams of Practical Example 2 (close projection)
Figure 17B:
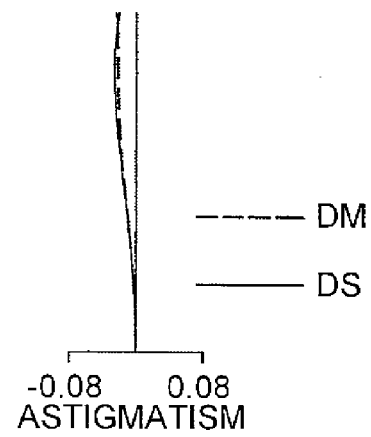
Figure 17C:
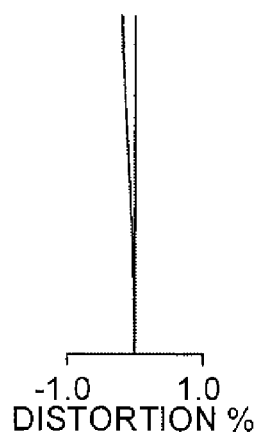
Figure 17D:
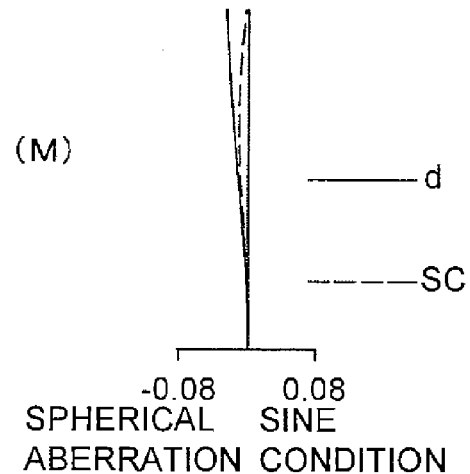
Figure 17E:
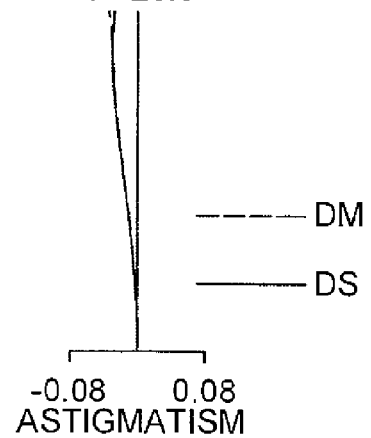
Figure 17F:
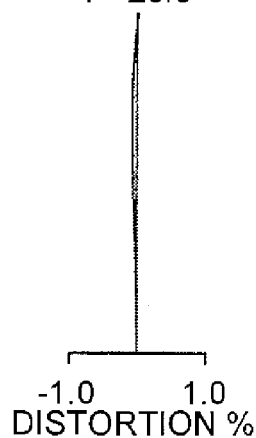
Figure 17G:
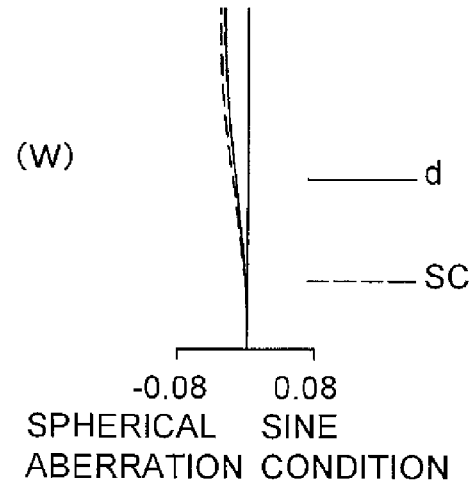
Figure 17H:
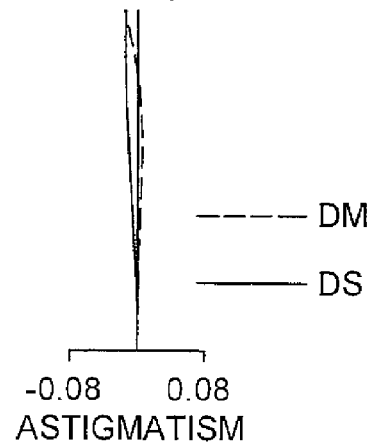
Figure 17I:
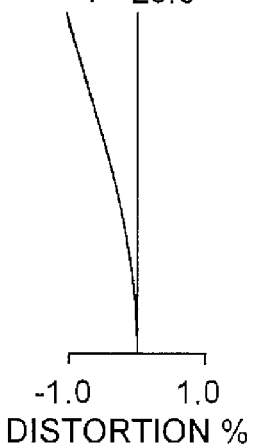
Figure 19A:
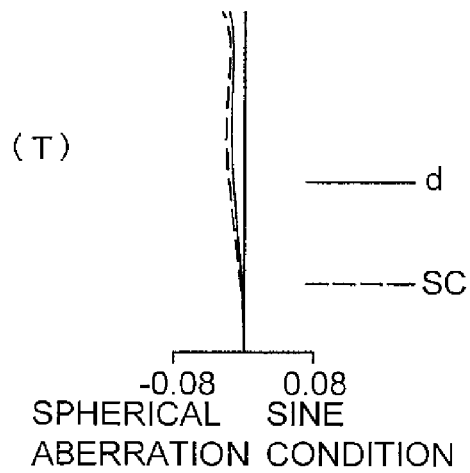
FIGS. 19A to 19I are aberration diagrams of Practical Example 3 (remote projection)
Figure 19B:
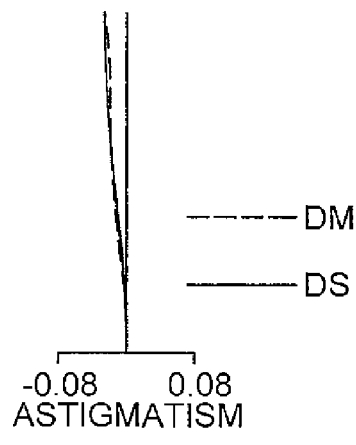
Figure 19C:
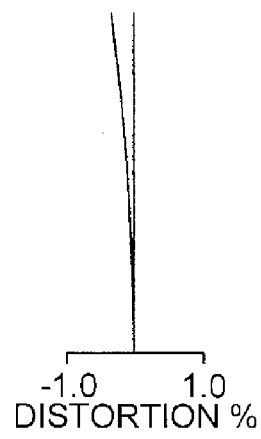
Figure 19D:
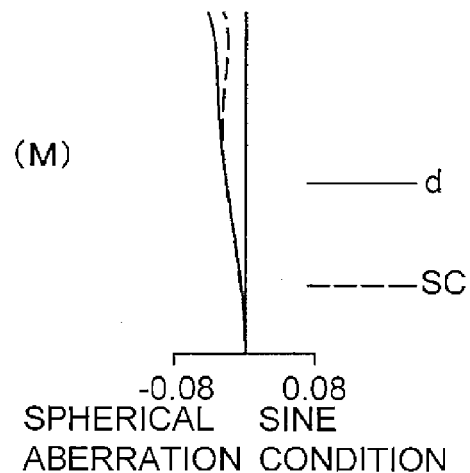
Figure 19E:
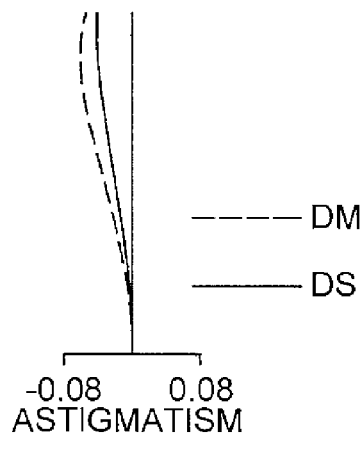
Figure 19F:
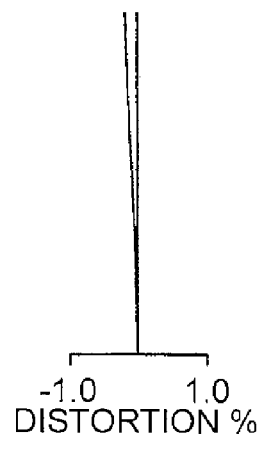
Figure 19G:
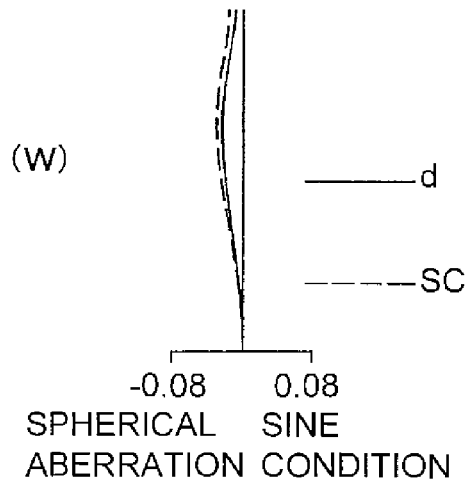
Figure 19H:
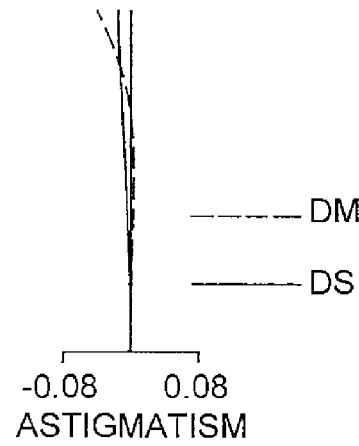
Figure 19I:
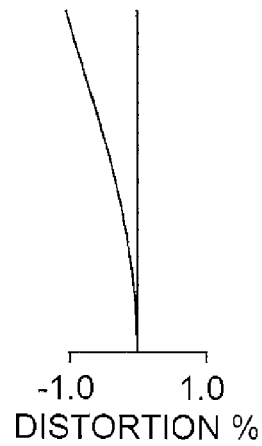
Figure 20A:
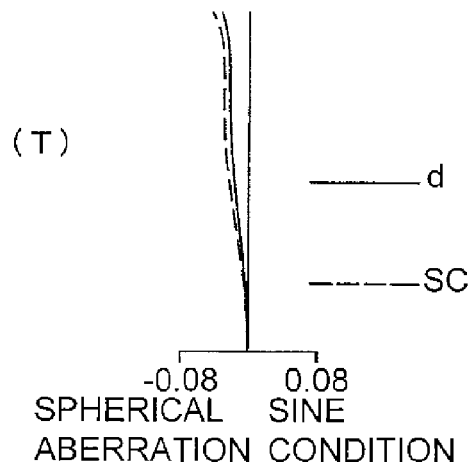
FIGS. 20A to 20I are aberration diagrams of Practical Example 3 (close projection)
Figure 20B:
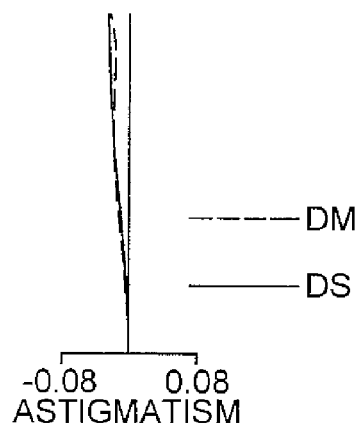
Figure 20C:
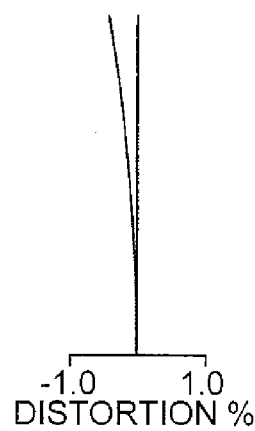
Figure 20D:
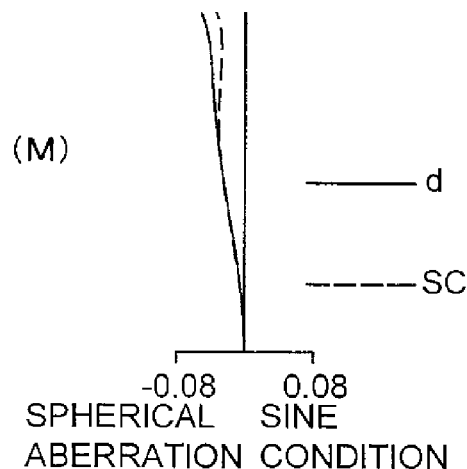
Figure 20E:
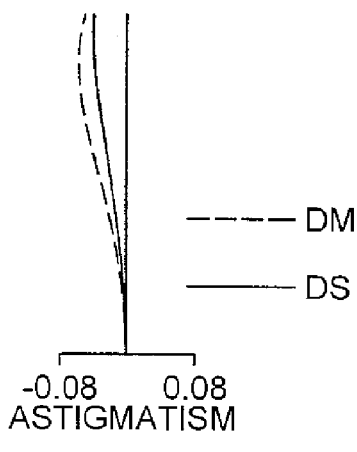
Figure 20F:
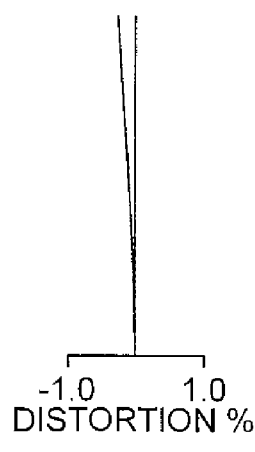
Figure 20G:
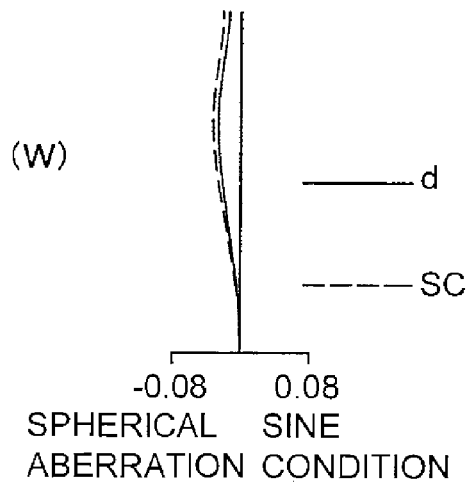
Figure 20H:
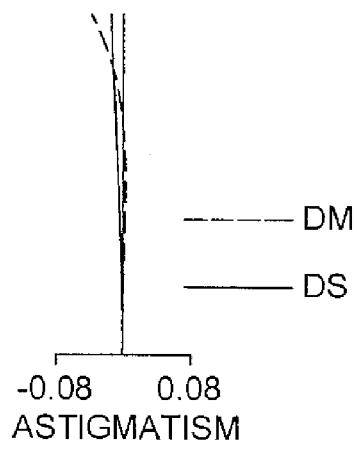
Figure 20I:
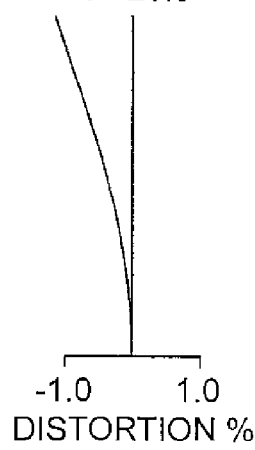
Figure 21A:
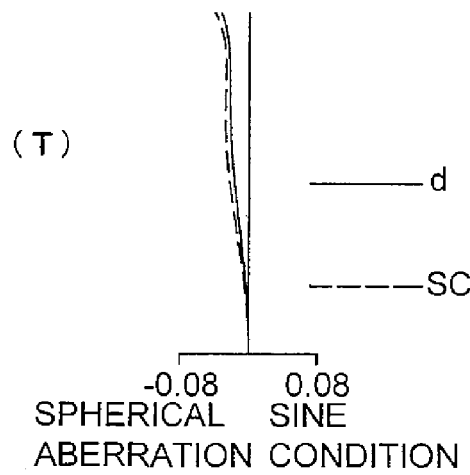
FIGS. 21A to 21I are aberration diagrams of Comparison Example 3 (close projection, no correction)
Figure 21B:
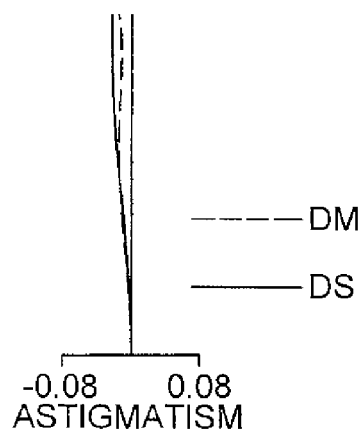
Figure 21C:
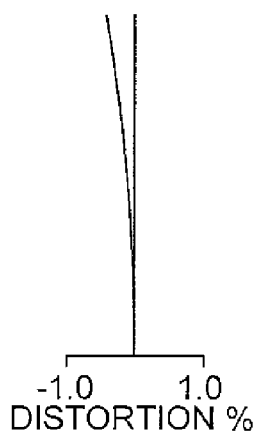
Figure 21D:
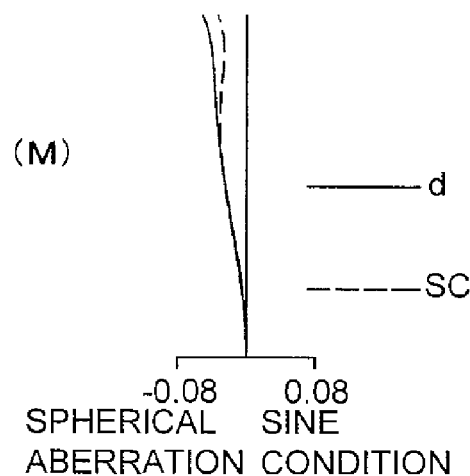
Figure 21E:
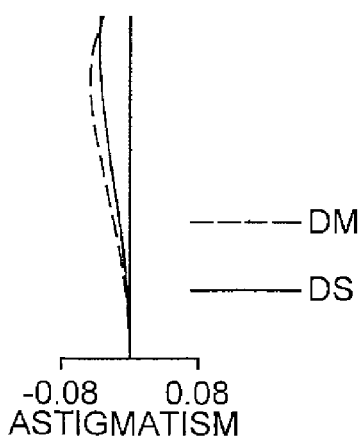
Figure 21F:
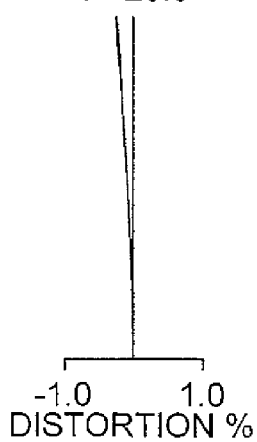
Figure 21G:
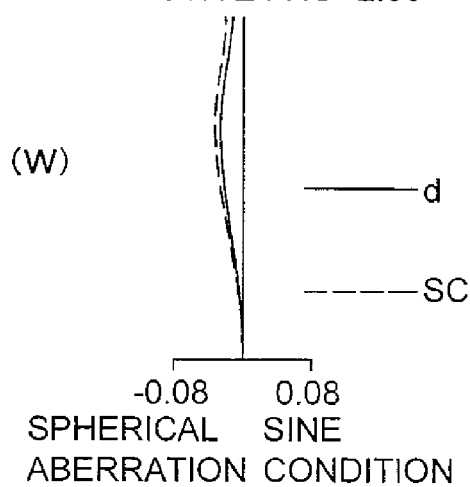
Figure 21H:
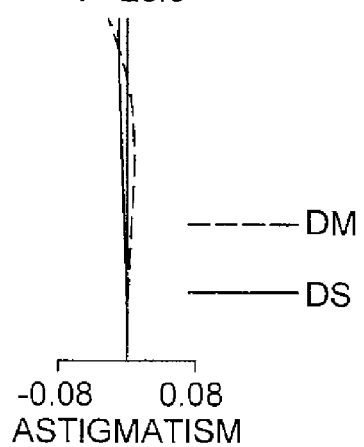
Figure 21I:
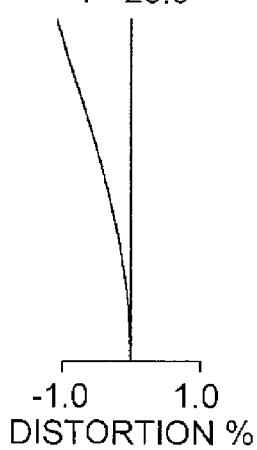
Figure 22A:
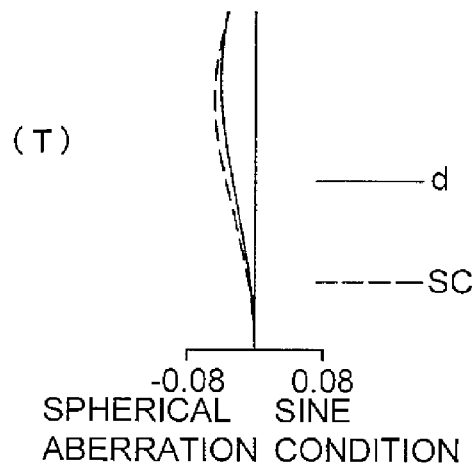
FIGS. 22A to 22I are aberration diagrams of Practical Example 4 (remote projection)
Figure 22B:
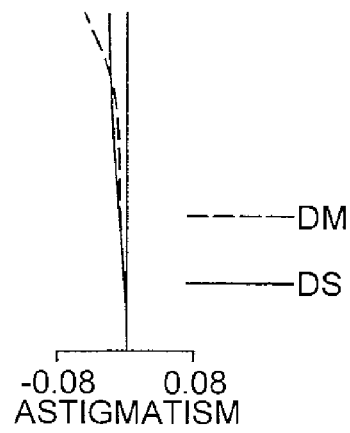
Figure 22C:
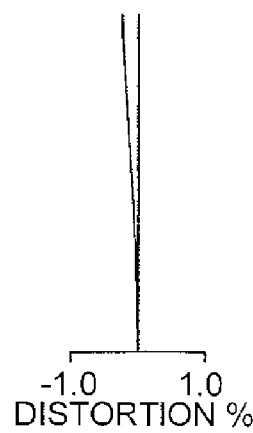
Figure 22D:
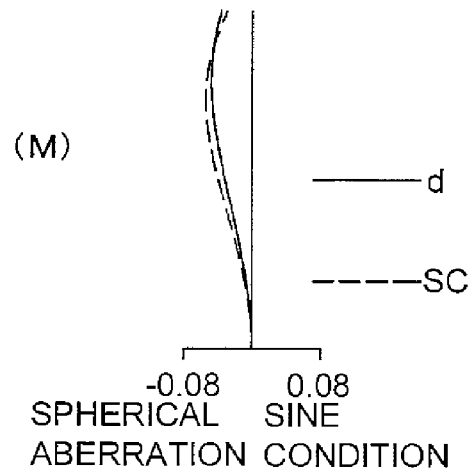
Figure 22E:
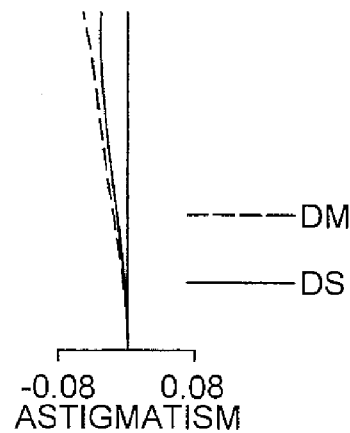
Figure 22F:
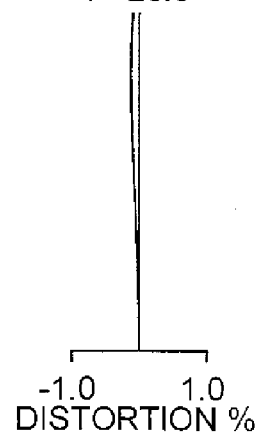
Figure 22G:
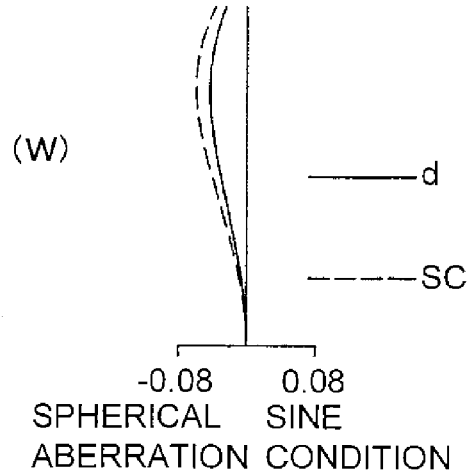
Figure 22H:
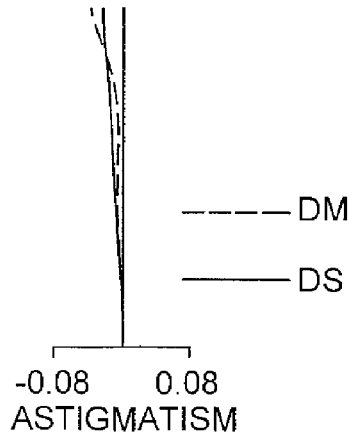
Figure 22I:
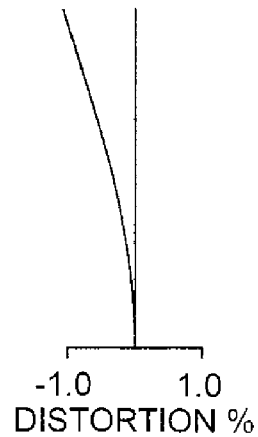
Figure 24A:
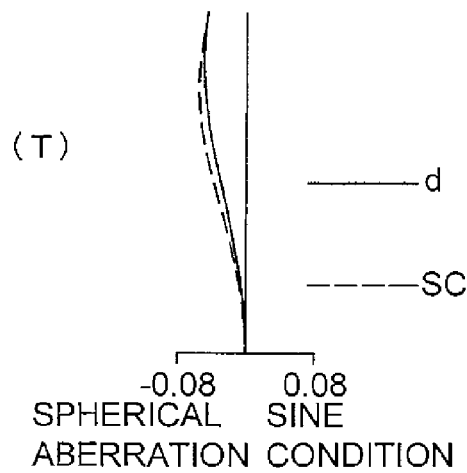
FIGS. 24A to 24I are aberration diagrams of Comparison Example 4 (close projection, no correction)
Figure 24B:
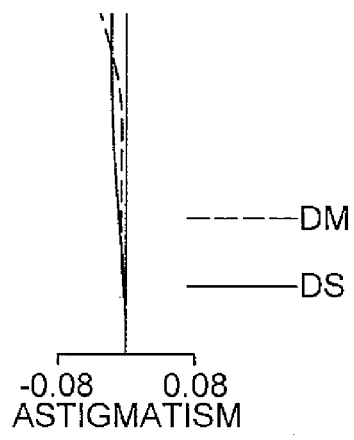
Figure 24C:
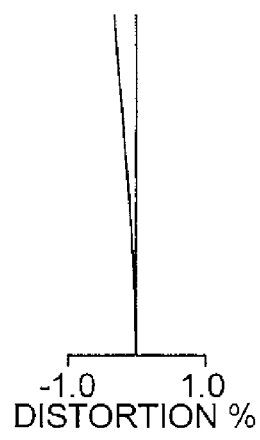
Figure 24D:
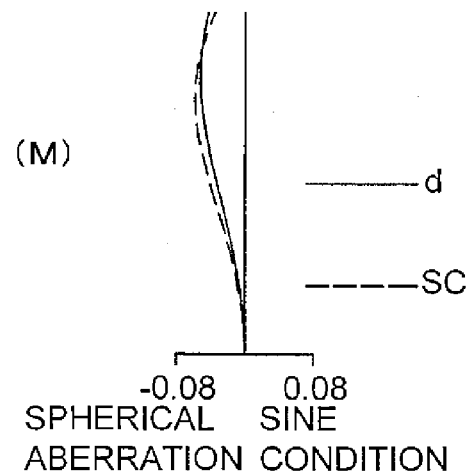
Figure 24E:
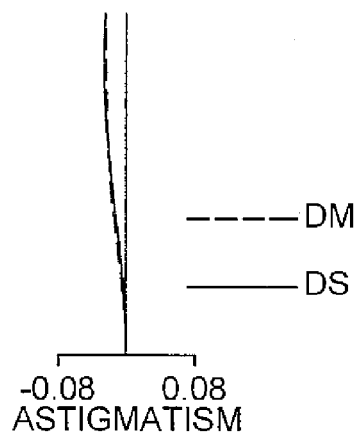
Figure 24F:
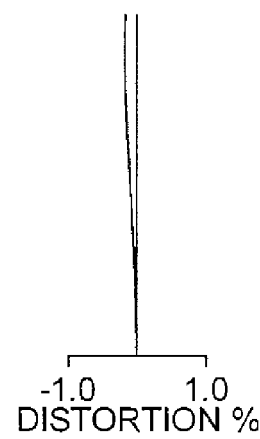
Figure 24G:
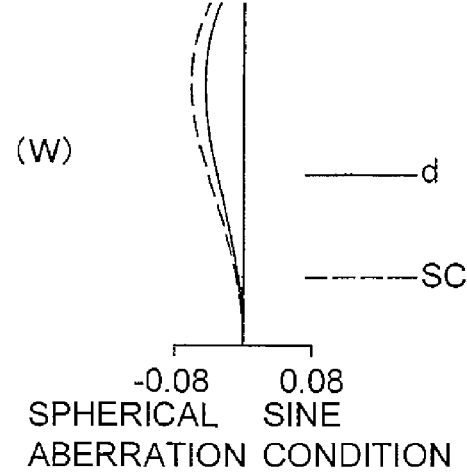
Figure 24H:
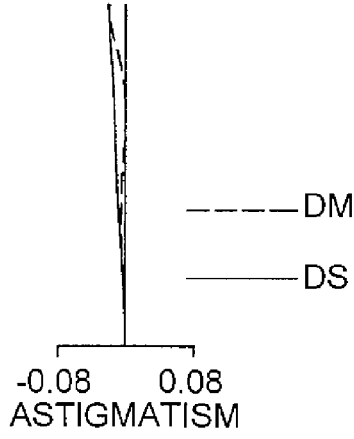
Figure 24I:
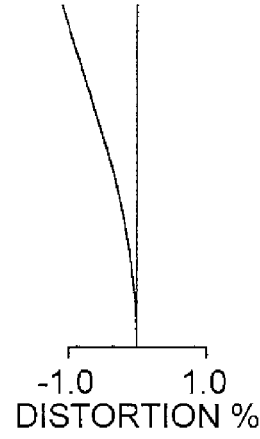
Figure 25A:
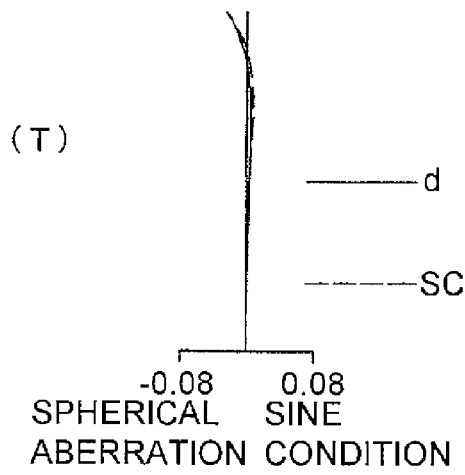
FIGS. 25A to 25I are aberration diagrams of Practical Example 5 (remote projection)
Figure 25B:
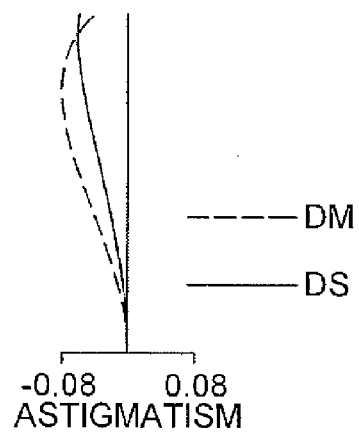
Figure 25C:
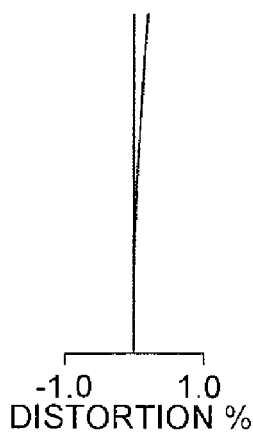
Figure 25D:
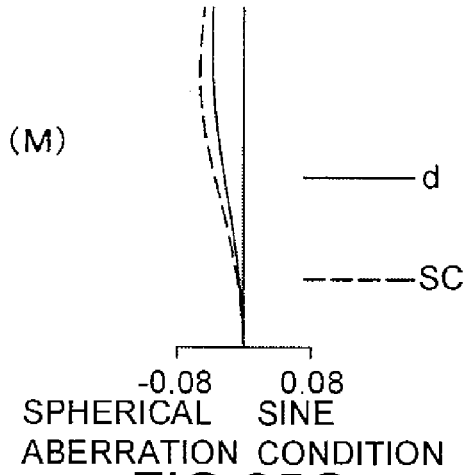
Figure 25E:
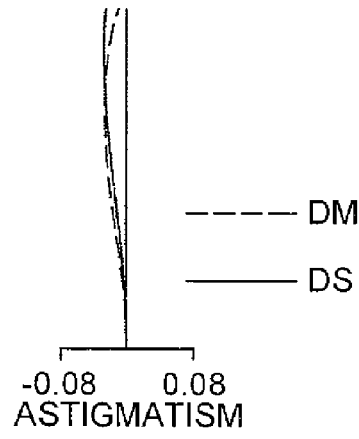
Figure 25F:
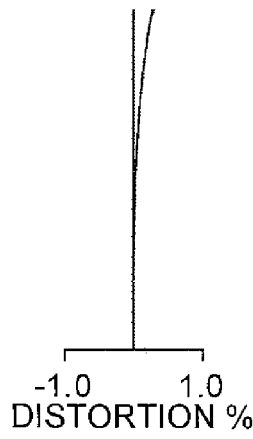
Figure 25G:
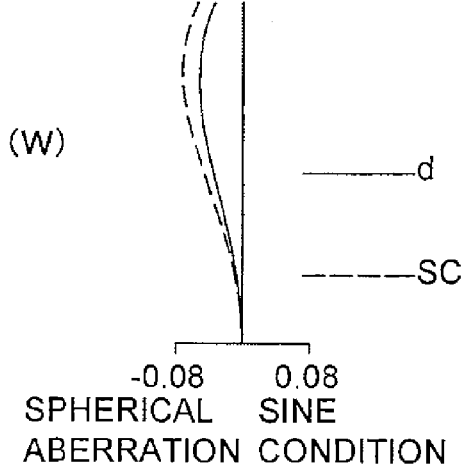
Figure 25H:
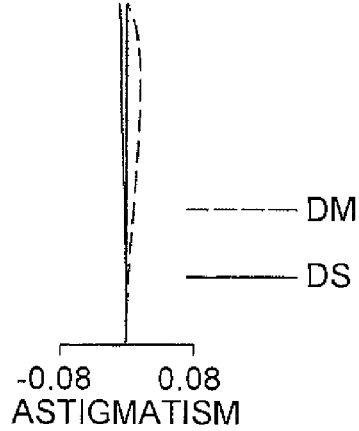
Figure 25I:
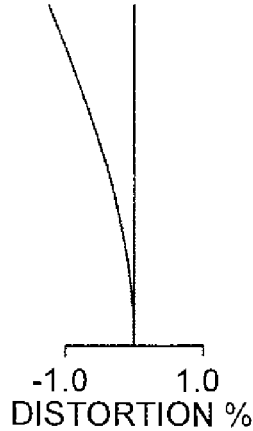
Figure 26A:
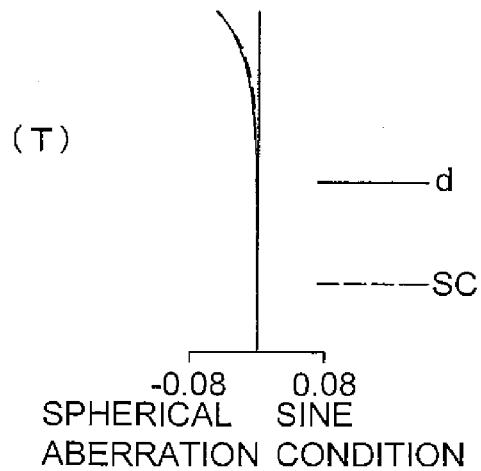
FIGS. 26A to 26I are aberration diagrams of Practical Example 5 (close projection)
Figure 26B:
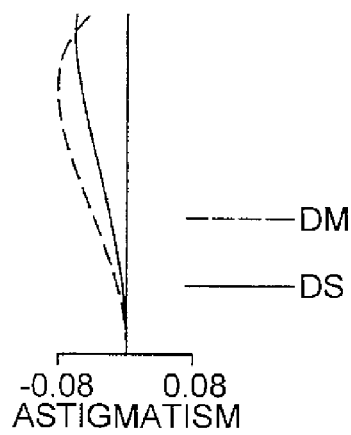
Figure 26C:
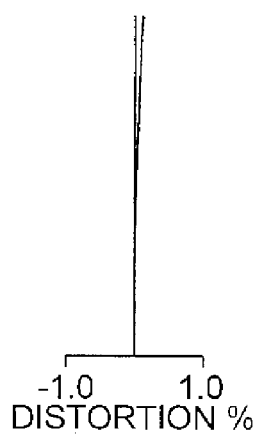
Figure 26D:
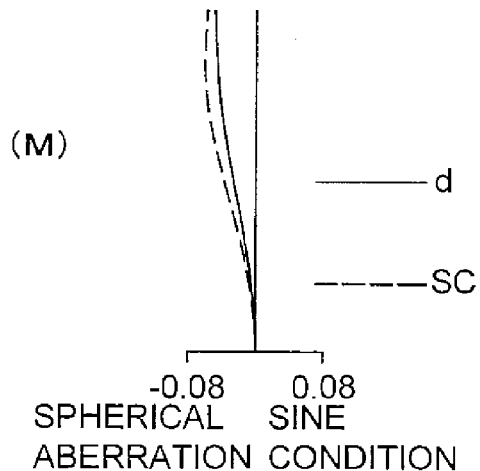
Figure 26E:
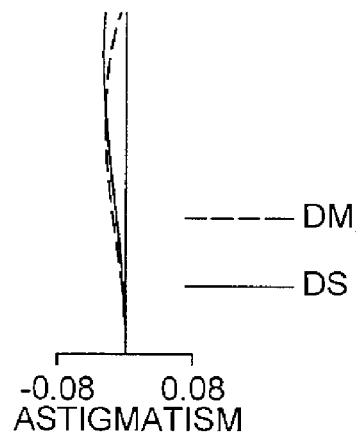
Figure 26F:
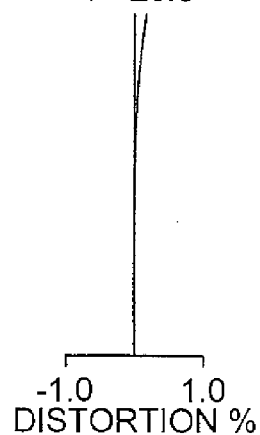
Figure 26G:
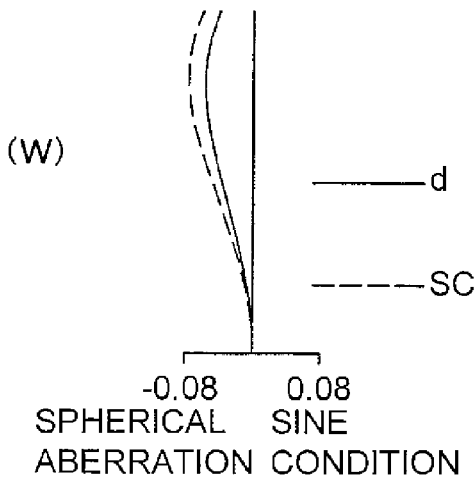
Figure 26H:
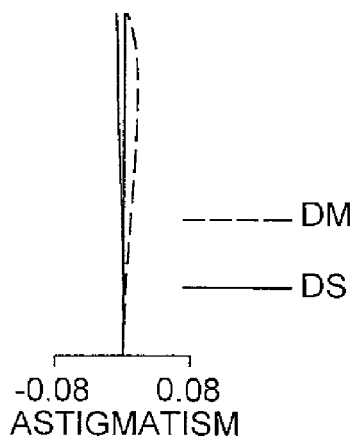
Figure 26I:
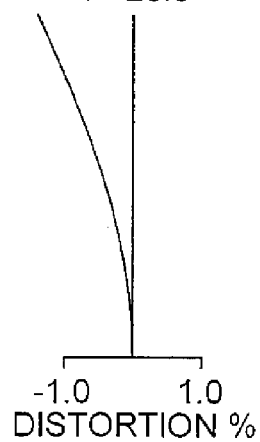
Figure 27A:
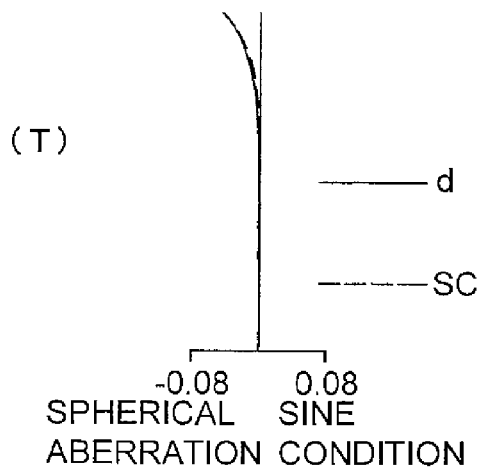
FIGS. 27A to 27I are aberration diagrams of Comparison Example 5 (close projection, no correction)
Figure 27B:
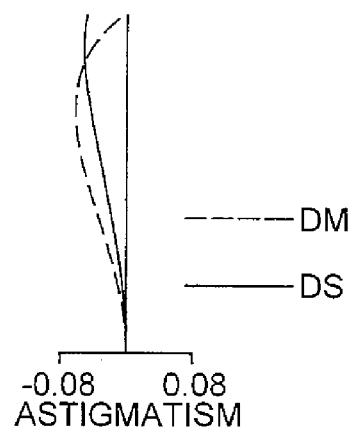
Figure 27C:
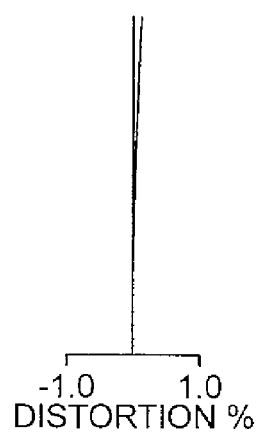
Figure 27D:
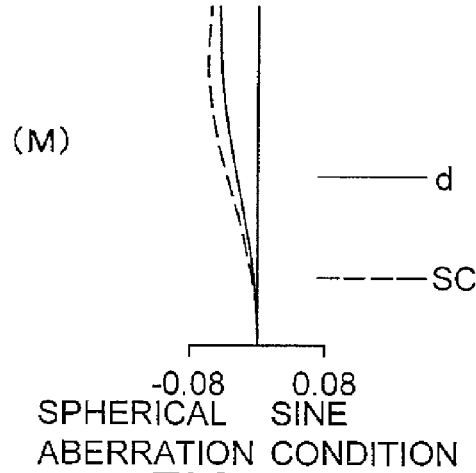
Figure 27E:
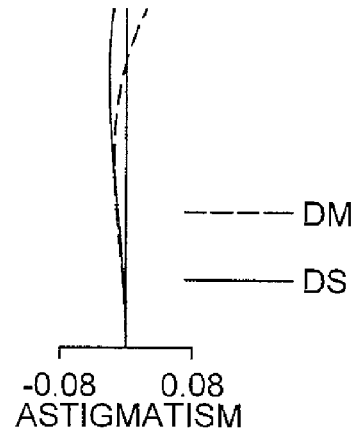
Figure 27F:
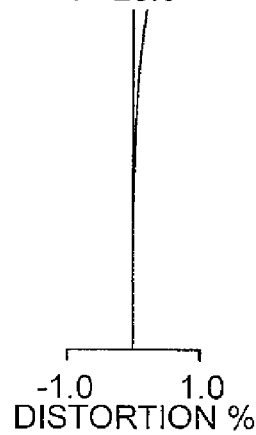
Figure 27G:
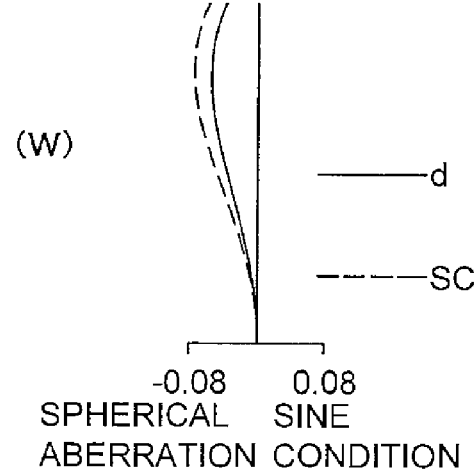
Figure 27H:
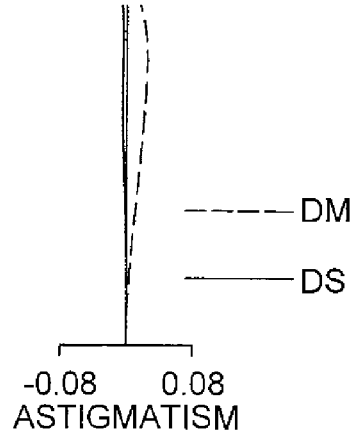
Figure 27I:
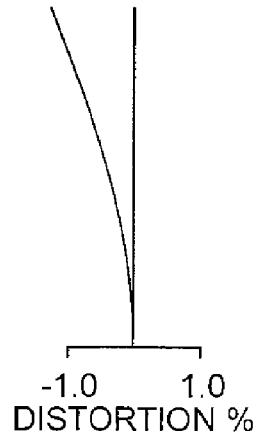
Figure 28A:
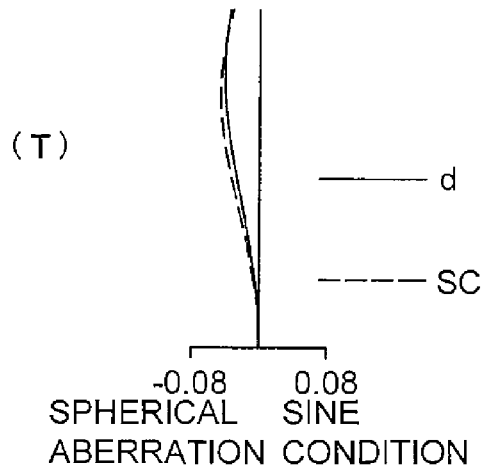
FIGS. 28A to 28I are aberration diagrams of Practical Example 6 (remote projection)
Figure 28B:
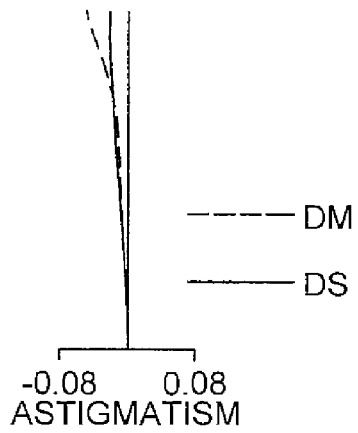
Figure 28C:
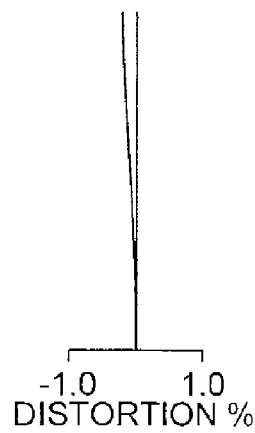
Figure 28D:
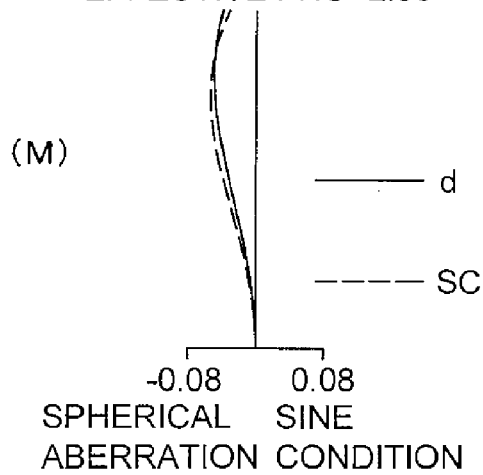
Figure 28E:
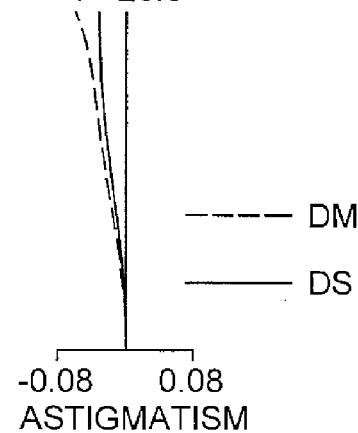
Figure 28F:
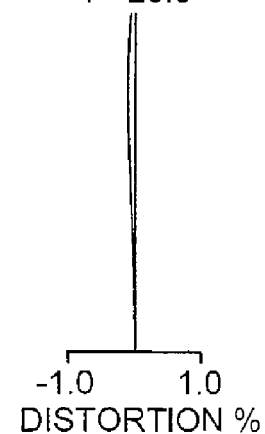
Figure 28G:
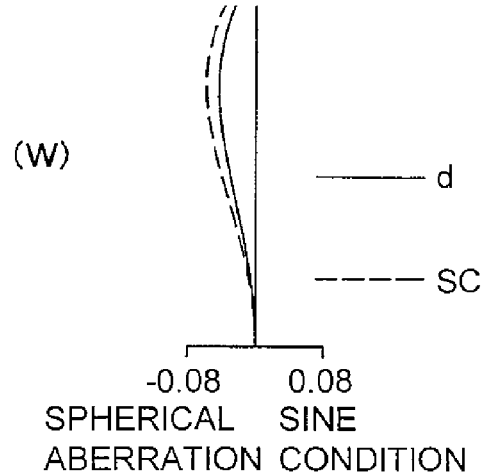
Figure 28H:
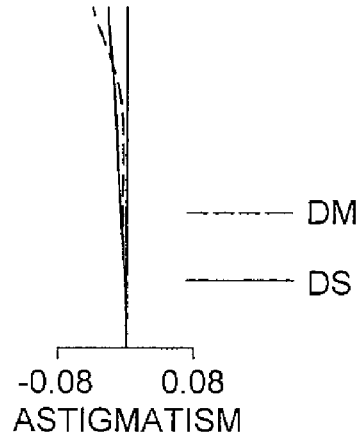
Figure 28I:
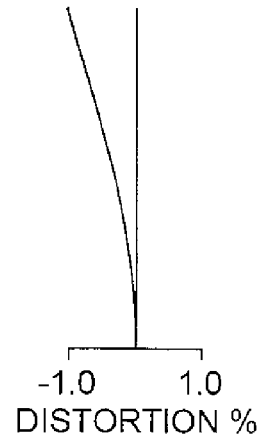
Figure 30A:
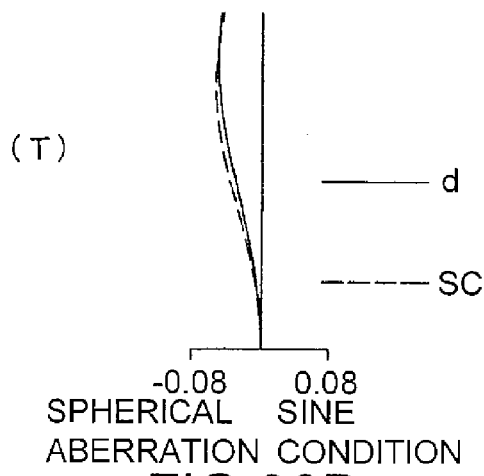
FIGS. 30A to 30I are aberration diagrams of Comparison Example 6 (close projection, no correction)
Figure 30B:
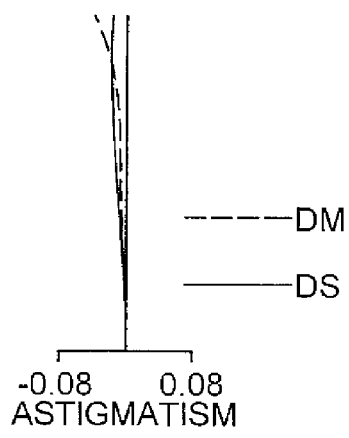
Figure 30C:
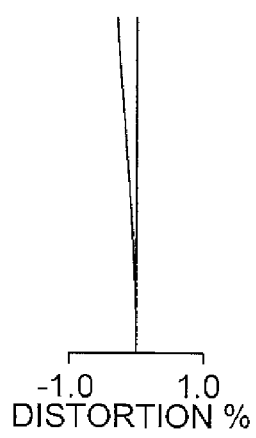
Figure 30D:
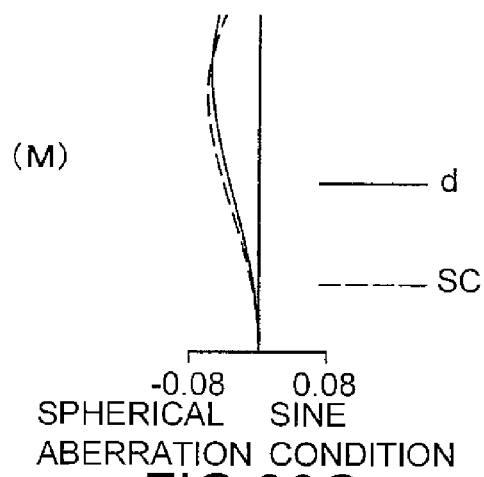
Figure 30E:
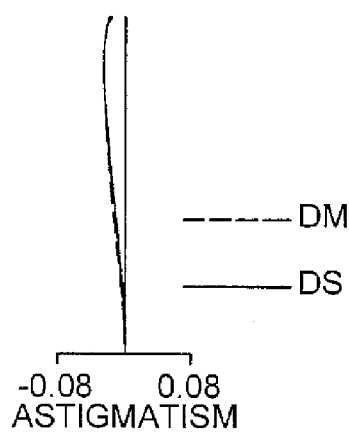
Figure 30F:
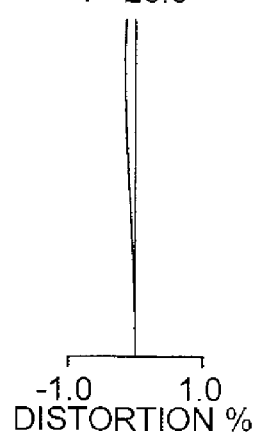
Figure 30G:
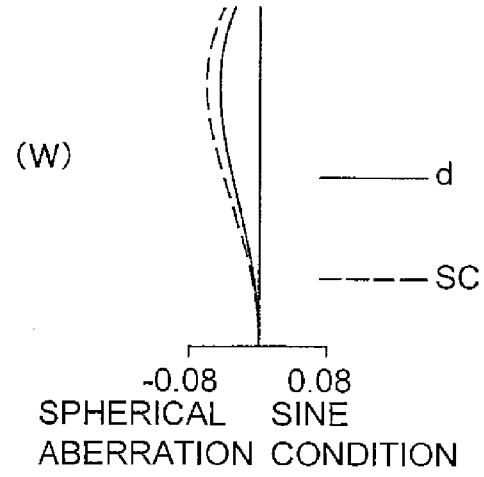
Figure 30H:
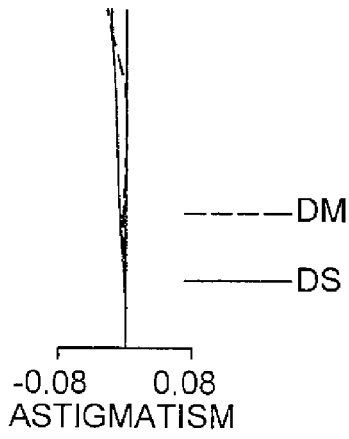
Figure 30I:
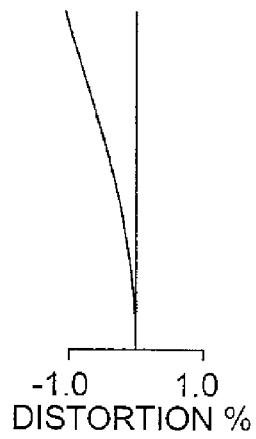
Figure 31A:
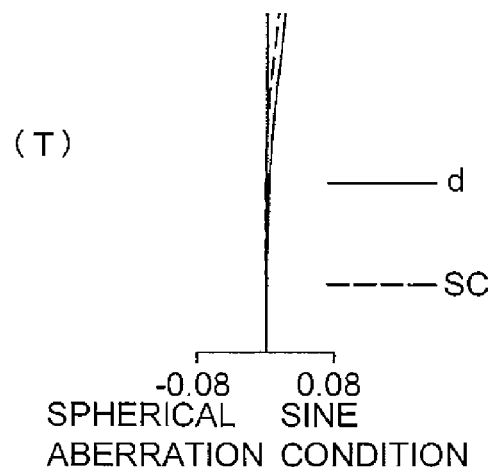
FIGS. 31A to 31I are aberration diagrams of Practical Example 7 (remote projection)
Figure 31B:
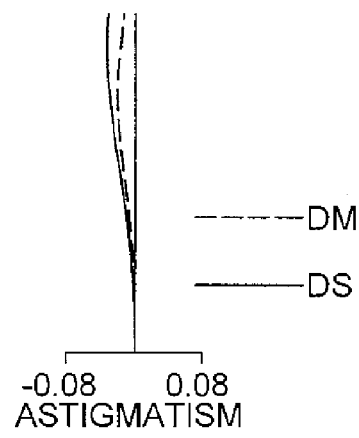
Figure 31C:
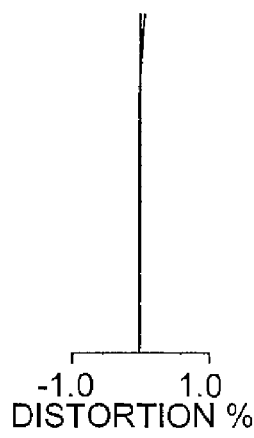
Figure 31D:
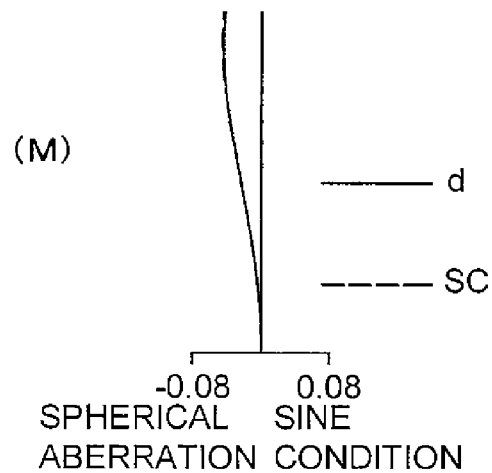
Figure 31E:
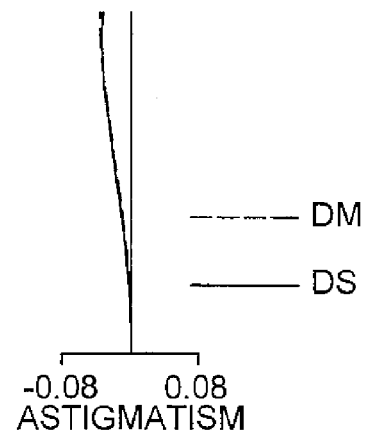
Figure 31F:
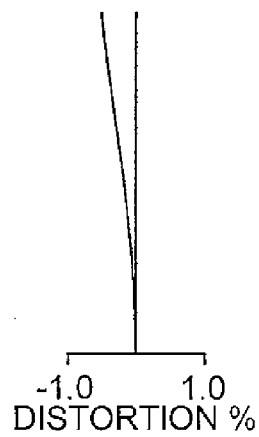
Figure 31G:
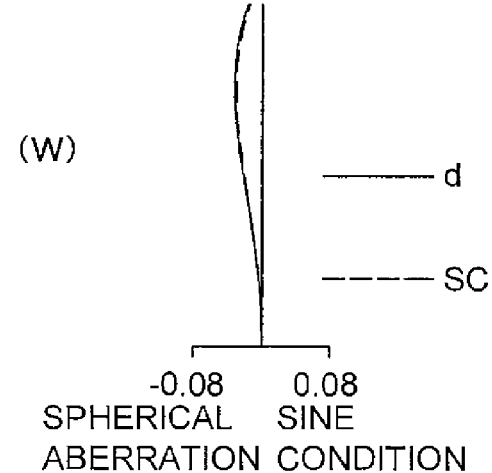
Figure 31H:
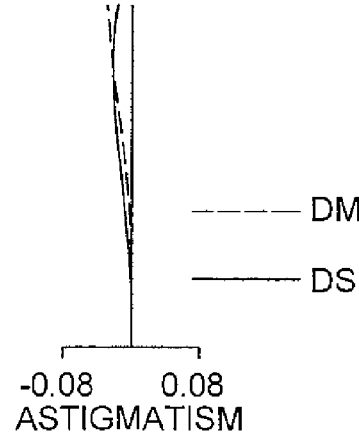
Figure 31I:
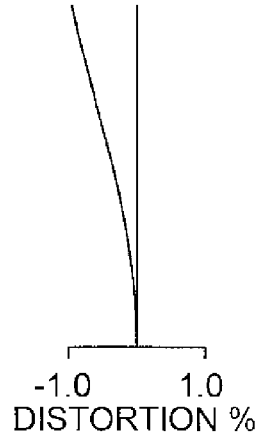
Figure 35A:
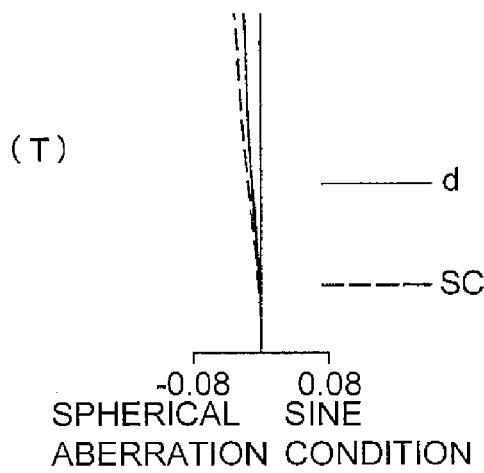
FIGS. 35A to 35I are aberration diagrams of Practical Example 8 (close projection)
Figure 35B:
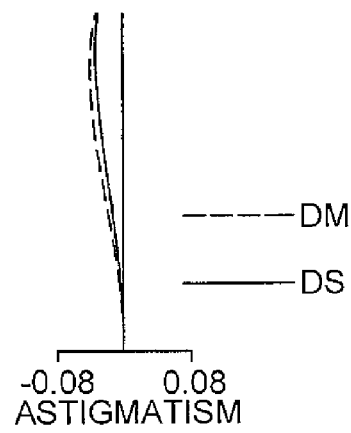
Figure 35C:
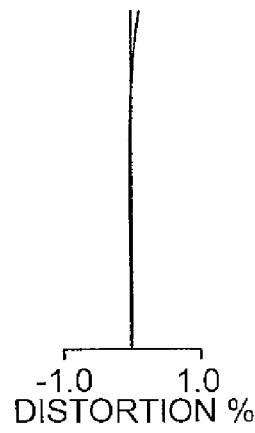
Figure 35D:
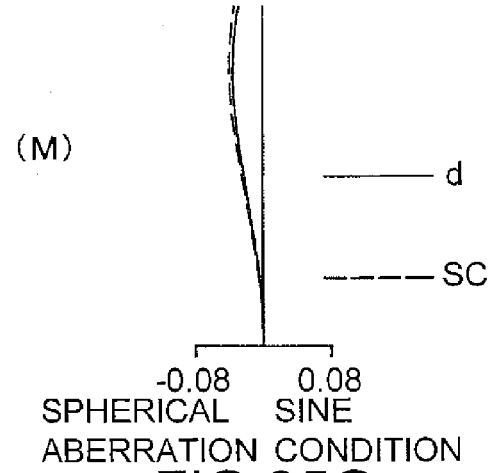
Figure 35E:
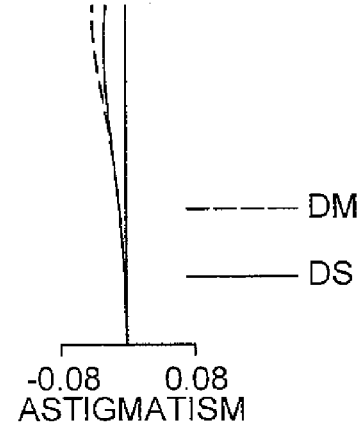
Figure 35F:
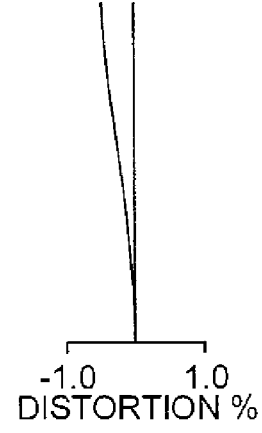
Figure 35G:
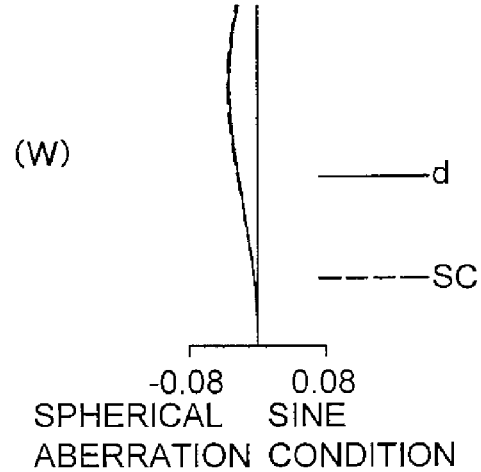
Figure 35H:
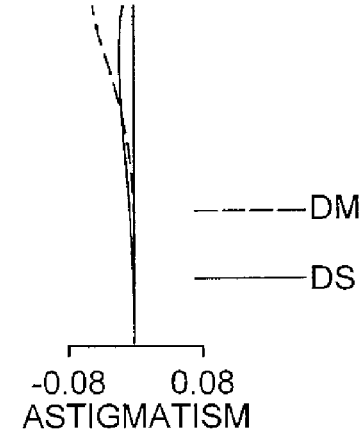
Figure 35I:
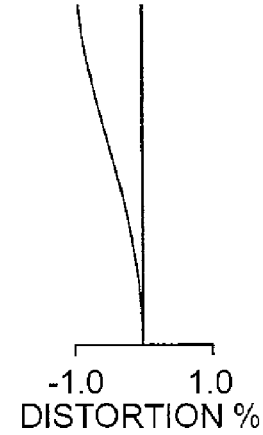
Figure 39A:
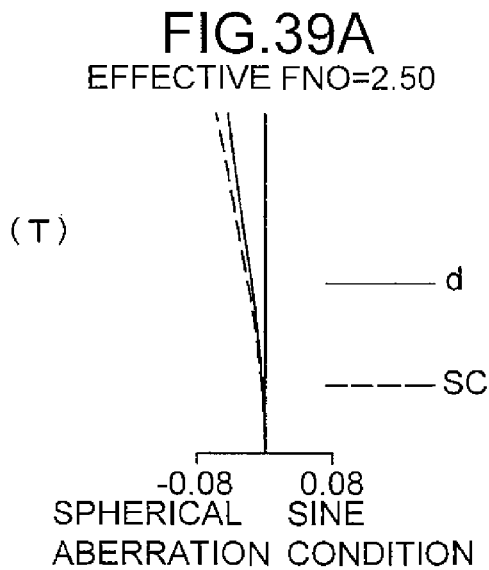
FIGS. 39A to 39I are aberration diagrams of Comparison Example 9 (close projection, no correction)
Figure 39B:
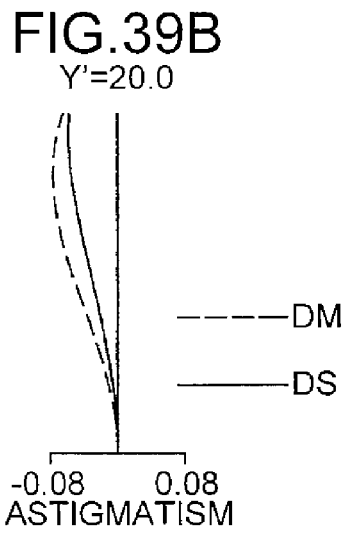
Figure 39C:
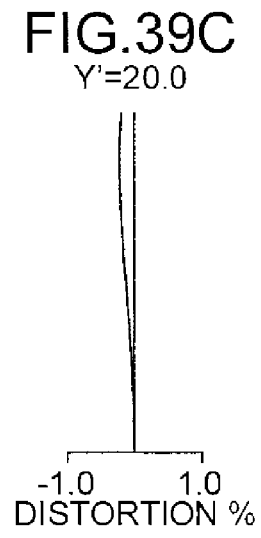
Figure 39D:
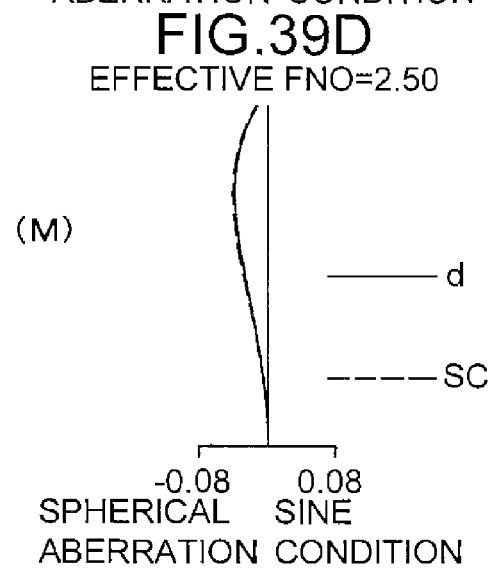
Figure 39E:
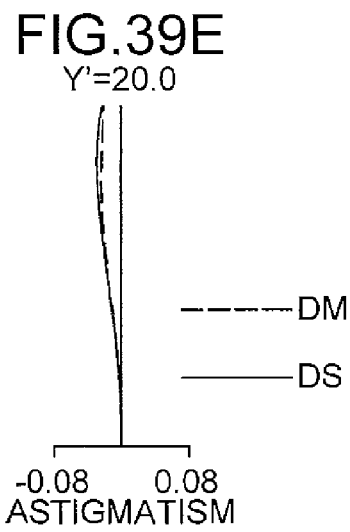
Figure 39F:
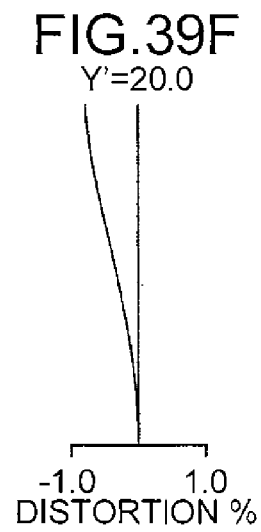
Figure 39G:
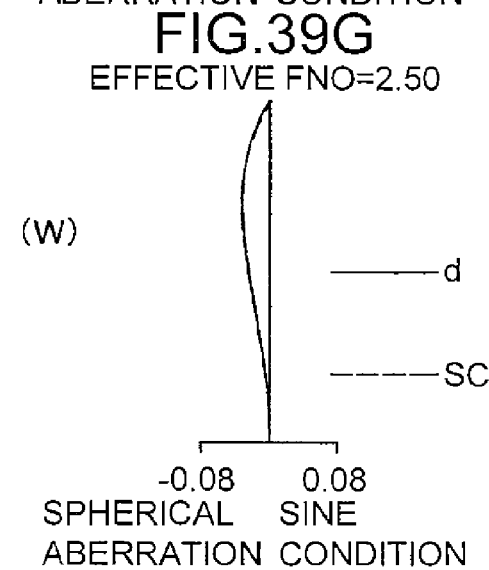
Figure 39H:
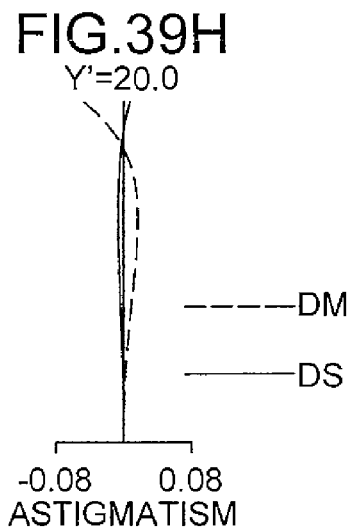
Figure 39I:
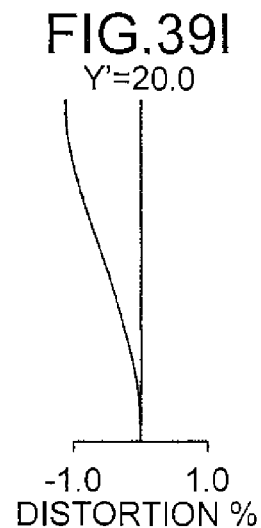

| | | Power Arrangement | | | | | |
|---|---|---|---|---|---|---|---|
| | | Gr1 | Gr2 | Gr3 | Gr4 | Gr5 | Gr6 |
| FIG. 1 | P1 | + | − | + | + | + | |
| FIG. 2 | P2 | + | − | + | + | + | |
| FIG. 3 | P3 | + | − | − | + | + | |
| FIG. 4 | P4 | + | − | + | + | + | |
| FIG. 5 | P5 | + | − | + | + | + | |
| FIG. 6 | P6 | + | − | + | + | + | |
| FIG. 7 | N1 | − | − | + | + | + | + |
| FIG. 8 | N2 | − | + | − | + | + | |
| FIG. 9 | N3 | − | + | − | + | + | |
| FIG. 10 | N4 | − | + | + | + | + | |
| FIG. 11 | N5 | − | + | − | + | + | |
| FIG. 12 | N6 | − | + | + | + | + | |

In the first to sixth embodiments (P1 to P6), the variable-focal-length lens system LN is a projection lens system that includes, from the enlargement side, a first lens group Gr1 which is a distance-compensation lens group and which has a positive optical power, and a second, a third, and a fourth lens group Gr2, Gr3, and Gr4 which are focal-length-varying lens groups and of which at least one has a negative optical power, wherein, as the projection distance varies from a remote distance to a close distance, the first lens group Gr1 moves to the reduction side along the optical axis AX. All these embodiments adopt a five-group zoom construction, wherein the first lens group Gr1 has a positive optical power and remains stationary during magnification varying, the second lens group Gr2 is a focal-length-varying lens group which has the largest amount of movement and which has a negative optical power, the third lens group Gr3 is a focal-length-varying lens group which has a positive or negative optical power, the fourth lens group Gr4 is a focal-length-varying lens group which has a positive optical power, and the fifth lens group Gr5 has a positive optical power and remains stationary during magnification varying.

In the seventh to twelfth embodiments (N1 to N6), the variable-focal-length lens system LN is a projection lens system that includes, from the enlargement side, a first lens group Gr1 which is a distance-compensation lens group and which has a negative optical power, and a second, a third, and a fourth lens group Gr2, Gr3, and Gr4 which are focal-length-varying lens groups and of which at least one has a positive optical power, wherein, as the projection distance varies from a remote distance to a close distance, the first lens group Gr1 moves to the enlargement side along the optical axis AX. The seventh embodiment adopts a six-group zoom construction, and the eighth to twelfth embodiments adopt a five-group zoom construction. In all these embodiments, the first lens group Gr1 has a negative optical power and remains stationary during magnification; in the seventh embodiment, the sixth lens group Gr6 has a positive optical power and remains stationary during magnification varying; and in the eighth to twelfth embodiments, the fifth lens group Gr5 has a positive optical power and remains stationary during magnification varying. In the seventh to ninth and eleventh embodiments, the fourth lens group Gr4 is a focal-length-varying lens group which has the largest amount of movement and which has a positive optical power, and in the tenth and twelfth embodiments, the third lens group Gr3 is a focal-length-varying lens group which has the largest amount of movement and which has a positive optical power.

Figure 49:
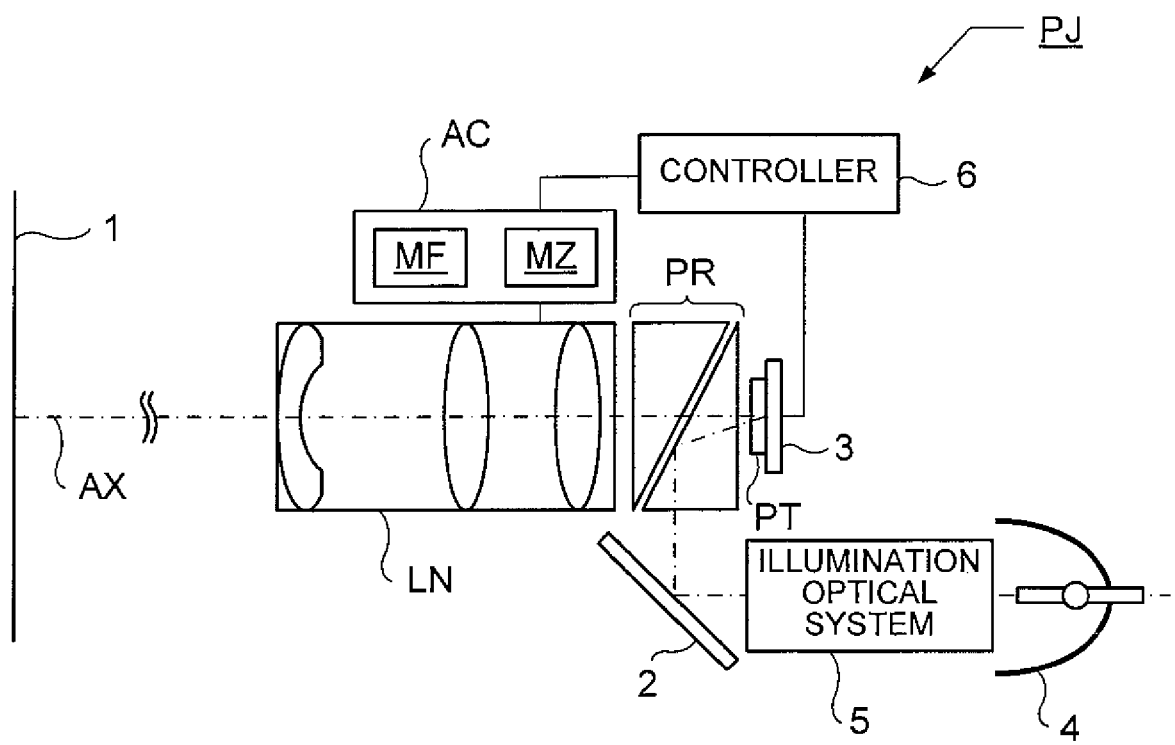
FIG. 49 is a schematic diagram showing an example of the configuration, in an outline, of a projection apparatus incorporating a variable-focal-length lens system.
Figure 50:
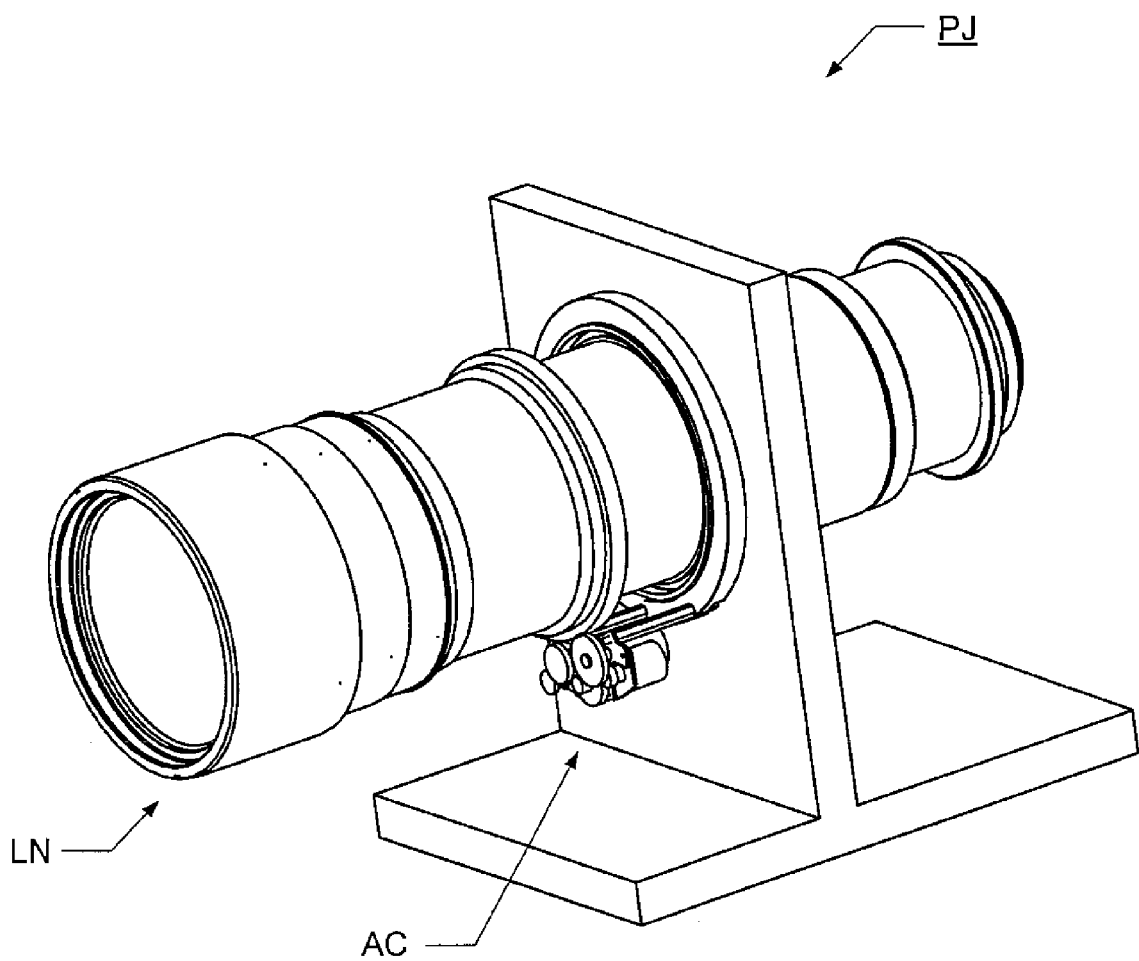
FIG. 50 is an exterior view showing an example of the configuration, in an outline, of a projection apparatus incorporating a variable-focal-length lens system.

Next, a projection apparatus embodying the invention, to which the variable-focal-length lens system LN is applied, will be described. FIG. 49 schematically shows an example of the configuration, in an outline, of a projection apparatus PJ, and FIG. 50 shows the exterior configuration of part of it. The projection apparatus PJ includes a variable-focal-length lens system LN, a reflecting mirror 2, an image display device 3, a light source 4, an illumination optical system 5, a controller 6, a prism PR, an actuator AC, etc. The controller 6 assumes the overall control of the projection apparatus PJ. The image display device 3 is an image modulating device that modulates light to produce an image, and is provided with cover glass PT on its display surface on which it displays the image. Light from the light source 4 is directed via the illumination optical system 5, the reflecting mirror 2, an the prism PR to the image display device 3. The prism PR is, for example, a TIR prism (or a color splitting/integrating prism, or the like), and separates projection light from illumination light. The image displayed on the image display device 3 is projected through the variable-focal-length lens system LN onto a screen surface 1.

Figure 51:
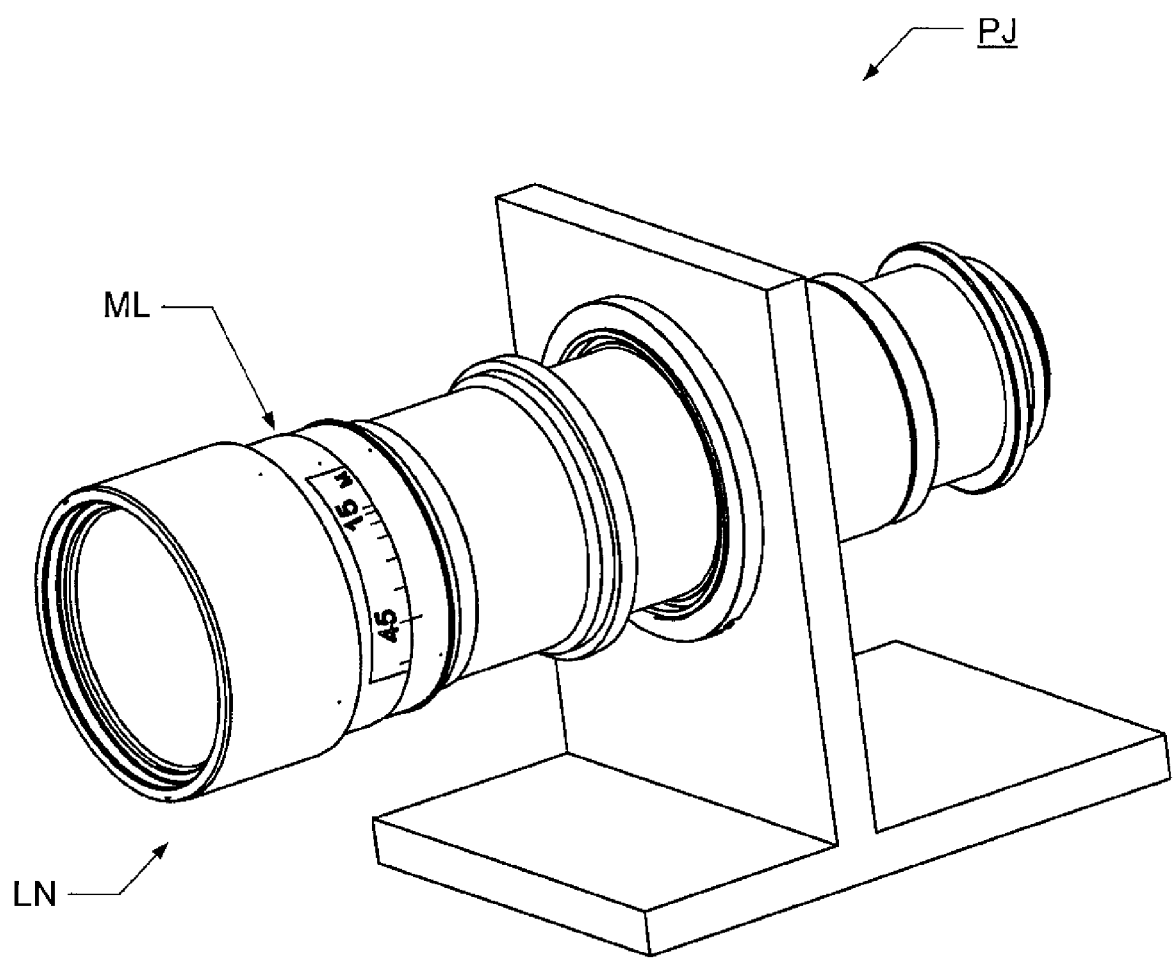
FIG. 51 is an exterior view showing an example of the configuration, in an outline, of another projection apparatus incorporating a variable-focal-length lens system.

Individually to the first lens group Gr1, which is a distance-compensation lens group, and to the second lens group Gr2 etc., which are focal-length-varying lens groups, the actuator AC is connected which move them to the enlargement side or to the reduction side along the optical axis AX. The actuator AC is composed of, among others, a focusing mechanism MF which, for focusing, moves the entire system and also moves the distance-compensation lens group in the optical axis AX direction, and a zooming mechanism MZ which moves two or more focal-length-varying lens groups individually in the optical axis AX direction to vary the group-to-group distances so as to vary the focal length of the entire system. To the actuator AC, the controller 6 is connected which controls the movement of the lens groups that are moved. The controller 6 and the actuator AC may be omitted, in which case the lens groups may be moved manually. In a case where the distance-compensation lens group is moved manually, it is preferable that, as shown in FIG. 51, the lens barrel of the variable-focal-length lens system LN be marked with a scale indicating the relationship between the amount of movement of the variable-focal-length lens system LN (the amount of rotation of an operation ring ML) and the projection distance. It is then possible, provided that, irrespective of the focal length of the variable-focal-length lens system LN, the amount of movement of the distance-compensation lens group for a given projection distance is constant, to correct curvature of field easily simply by rotating the operation ring ML for moving the distance-compensation lens group to the position on the scale corresponding to the projection distance.

EXAMPLES

Hereinafter, the construction and other features of variable-focal-length lens systems for projection embodying the invention will be described more specifically with reference to the construction data of practical examples. Practical Examples 1 to 12 (EX 1 to 12) presented below are numerical examples corresponding to the first to twelfth embodiments, respectively, described above, and the optical construction diagrams (FIGS. 1 to 12) showing the first to twelfth embodiments show the lens constructions of the corresponding practical examples, namely Practical Examples 1 to 12, as well.

The construction data of each practical example includes the following. Listed as surface data are, from the leftmost column rightward, for each surface, surface number i, radius of curvature CR (mm), axial distance T (mm), refractive index Nd for the d-line (with a wavelength of 587.56 nm), and Abbe number Vd for the d-line. Listed as miscellaneous data is zoom ratio followed by, for each of different positions (combinations of different focal-length positions, namely telephoto (Tele), middle (Mid), and wide-angle (Wide), and different focus positions, namely remote projection and close projection), focal length (mm) of the entire system, f-number (FNO), angle of view (°), image height (Y', mm), total lens length (mm), back focal length (BF, mm), variable axial distances di (mm), entrance pupil position, and exit pupil position. Here, the back focal length BF is the distance from the image-side surface of the cover glass (plane-parallel plate) PT to the image surface IM, and the total lens length is the distance from the lens front surface to the image surface IM. The entrance pupil position is the distance from the first surface, and the exit pupil position is the distance from the image surface IM. Furthermore, listed as lens group data are focal lengths (mm) of the individual lens groups. On the other hand, Table 2 shows the values of the conditional formulae in each practical example, and Table 3 shows the related data.

FIGS. 13A-13I to 48A-48I are aberration diagrams corresponding to Practical Examples 1 to 12 (EX 1 to 12) and Comparison Examples 1 to 12 (CX 1 to 12), the diagrams in the rows headed (T), (M), and (W) showing different aberrations (from left, spherical aberration with sine condition, astigmatism, and distortion) at the telephoto end, at the middle position, and at the wide-angle end respectively. The aberration diagrams of Practical Examples 1 to 12 show the aberrations in remote projection (with a projection distance of −45 m) and in close projection (with a projection distance of −15 m), and the aberration diagrams of Comparison Examples 1 to 12 show the aberrations in close projection (with a projection distance of −15 m) as observed when the distance-compensation lens group (first lens group Grp makes no correction in Practical Examples 1 to 12.

In FIGS. 13A-13I to 48A-48I, EFFECTIVE FNO represents the effective f-number, and Y' (mm) represents the maximum image height Ymax on the sensing surface SS of the image sensing device SR (corresponding to the distance from the optical axis AX). In the spherical aberration diagrams, the solid line d represents the spherical aberration (mm) for the d-line, and the broken line SC represents the deviation (mm) from the sine condition. In the astigmatism diagrams, the broken line DM and the solid line DS represent the astigmatism (mm) of the d-line on the meridional surface and on the sagittal surface respectively. In the distortion diagrams, the solid line represents distortion (%) for the d-line.

In a case where the lens system of any practical example is used as a projection lens system in a projection apparatus (for example, a liquid crystal projector), in reality, the screen surface (projection surface) is the image surface and the image display surface (for example, the liquid crystal panel surface) is the objet surface. In optical design, however, the lens system of each embodiment is designed as a reduction system; that is, the screen surface is regarded as the object surface, and optical performance is evaluated on the image display surface (image surface IM). As will be understood from the evaluated optical performance, the variable-focal-length lens system of any practical example can be suitably used not only as a projection lens system for projection apparatus but also as an image-taking lens for image-taking apparatus (for example, video cameras and digital cameras). In such cases, the projection distance corresponds to the object distance.

Practical Example 1

| | Unit: mm | | | |
|---|---|---|---|---|
| | Surface Data | | | |
| Surface No. | CR | T | Nd | Vd |
| Object Surface | ∞ | Variable | | |
| 1 | 348.180 | 6.796 | 1.80610 | 40.73 |
| 2 | 133.294 | 35.757 | | |
| 3 | 152.166 | 25.303 | 1.48749 | 70.45 |
| 4 | −313.986 | 0.200 | | |
| 5 | 149.844 | 8.497 | 1.58913 | 61.24 |
| 6 | 295.633 | Variable | | |
| 7 | 213.514 | 3.545 | 1.49700 | 81.61 |
| 8 | 56.325 | 15.041 | | |
| 9 | −314.856 | 2.997 | 1.49700 | 81.61 |
| 10 | 48.801 | 2.691 | | |
| 11 | 51.451 | 6.514 | 1.80420 | 46.49 |
| 12 | 105.477 | Variable | | |
| 13 | −78.716 | 1.928 | 1.67270 | 32.17 |
| 14 | 147.007 | 23.121 | | |
| 15 | 520.229 | 5.016 | 1.88300 | 40.80 |
| 16 | −134.425 | 0.200 | | |
| 17 | 385.532 | 3.198 | 1.88300 | 40.80 |
| 18 | −471.963 | Variable | | |
| 19 | 92.460 | 2.654 | 1.67270 | 32.17 |
| 20 | 105.093 | Variable | | |
| 21(Aperture Stop) | ∞ | 59.776 | | |
| 22 | −61.370 | 4.278 | 1.80420 | 46.49 |
| 23 | 200.163 | 2.795 | | |
| 24 | 334.730 | 8.908 | 1.49700 | 81.61 |
| 25 | −76.012 | 0.200 | | |
| 26 | 166.588 | 10.823 | 1.49700 | 81.61 |
| 27 | −82.860 | 0.215 | | |
| 28 | 222.187 | 5.336 | 1.88300 | 40.80 |
| 29 | 78.922 | 2.936 | | |
| 30 | 89.154 | 9.819 | 1.49700 | 81.61 |
| 31 | −304.102 | 0.745 | | |
| 32 | 105.484 | 9.164 | 1.49700 | 81.61 |
| 33 | −517.689 | Variable | | |
| 34 | ∞ | 116.500 | 1.51680 | 64.20 |
| 35 | ∞ | 5.000 | | |
| 36 | ∞ | 3.000 | 1.48749 | 70.45 |
| 37 | ∞ | 0.500 | | |
| Image Surface | ∞ | | | |

| | Miscellaneous Data | | | | | |
|---|---|---|---|---|---|---|
| | Zoom Ratio 1.649 | | | | | |
| | Tele (Remote) | Mid (Remote) | Wide (Remote) | Tele (Close) | Mid (Close) | Wide (Close) |
| Focal Length | 85.352 | 66.433 | 51.756 | 84.919 | 66.138 | 51.556 |
| F-number | 2.5 | 2.5 | 2.5 | 2.5 | 2.5 | 2.5 |
| View Angle | 13.183 | 16.750 | 21.125 | 13.239 | 16.812 | 21.194 |
| Image Height | 20 | 20 | 20 | 20 | 20 | 20 |
| Total Lens Length | 502.527 | 502.873 | 502.517 | 502.123 | 502.313 | 501.864 |
| BF | 0.5 | 0.5 | 0.5 | 0.5 | 0.5 | 0.5 |
| d0 | 45000 | 45000 | 45000 | 15000 | 15000 | 15000 |
| d6 | 79.069 | 46.536 | 11.315 | 78.268 | 45.735 | 10.514 |
| d12 | 8.867 | 28.541 | 47.771 | 8.867 | 28.541 | 47.771 |
| d18 | 6.040 | 1.617 | 15.586 | 6.040 | 1.617 | 15.586 |
| d20 | 5.422 | 22.704 | 24.726 | 5.422 | 22.704 | 24.726 |
| d33 | 19.676 | 20.022 | 19.666 | 20.073 | 20.263 | 19.814 |
| Entrance Pupil Pos. | 237.044 | 184.311 | 135.666 | 234.918 | 182.688 | 134.446 |
| Exit Pupil Pos. | −4280.9 | −4281.2 | −4280.9 | −4281.3 | −4281.5 | −4281.0 |

| Lens Group Data | | |
|---|---|---|
| Group | Start Surface | Focal Length |
| 1 | 1 | 255.947 |
| 2 | 7 | −98.033 |
| 3 | 13 | 287.575 |
| 4 | 19 | 1054.303 |
| 5 | 21 | 103.514 |

Practical Example 2

| | Unit: mm | | | |
|---|---|---|---|---|
| | Surface Data | | | |
| Surface No. | CR | T | Nd | Vd |
| Object Surface | ∞ | Variable | | |
| 1 | 597.232 | 9.100 | 1.80610 | 40.73 |
| 2 | 154.368 | 12.459 | | |
| 3 | 163.107 | 24.317 | 1.61800 | 63.38 |
| 4 | −460.893 | 6.896 | | |
| 5 | 180.405 | 8.731 | 1.48749 | 70.45 |
| 6 | 365.567 | Variable | | |
| 7 | 256.891 | 4.909 | 1.49700 | 81.61 |
| 8 | 59.146 | 17.526 | | |
| 9 | −243.617 | 4.176 | 1.43875 | 94.97 |
| 10 | 90.006 | 0.612 | | |
| 11 | 72.967 | 5.925 | 1.78590 | 43.93 |
| 12 | 123.537 | Variable | | |
| 13 | −62.150 | 3.184 | 1.62588 | 35.74 |
| 14 | 349.454 | 5.137 | | |
| 15 | 780.092 | 7.692 | 1.88300 | 40.80 |
| 16 | −85.542 | Variable | | |
| 17 | −87.039 | 2.783 | 1.56732 | 42.85 |
| 18 | 181.618 | 3.682 | | |
| 19 | −1054.563 | 4.040 | 1.83400 | 37.35 |
| 20 | −209.194 | 0.200 | | |
| 21 | 134.750 | 5.854 | 1.83400 | 37.35 |
| 22 | −410.324 | Variable | | |
| 23(Aperture Stop) | ∞ | 65.722 | | |
| 24 | −82.086 | 4.664 | 1.78590 | 43.93 |
| 25 | 218.436 | 3.473 | | |
| 26 | 551.873 | 10.148 | 1.43875 | 94.97 |
| 27 | −85.171 | 0.200 | | |
| 28 | 133.731 | 12.285 | 1.49700 | 81.61 |
| 29 | −129.456 | 1.938 | | |
| 30 | 155.119 | 6.296 | 1.78590 | 43.93 |
| 31 | 75.092 | 2.799 | | |
| 32 | 82.020 | 12.425 | 1.49700 | 81.61 |
| 33 | −360.580 | 13.107 | | |
| 34 | 127.980 | 9.156 | 1.49700 | 81.61 |
| 35 | 1173.103 | Variable | | |
| 36 | ∞ | 116.500 | 1.51680 | 64.20 |
| 37 | ∞ | 5.000 | | |
| 38 | ∞ | 3.000 | 1.48749 | 70.45 |
| 39 | ∞ | 0.500 | | |
| Image Surface | ∞ | | | |

| Miscellaneous Data | | | | | | |
|---|---|---|---|---|---|---|
| Zoom Ratio 1.928 | | | | | | |
| | Tele (Remote) | Mid (Remote) | Wide (Remote) | Tele (Close) | Mid (Close) | Wide (Close) |
| Focal Length | 121.655 | 92.276 | 63.107 | 120.153 | 91.269 | 62.543 |
| F-number | 2.5 | 2.5 | 2.5 | 2.5 | 2.5 | 2.5 |
| View Angle | 9.332 | 12.225 | 17.582 | 9.439 | 12.347 | 17.726 |
| Image Height | 20 | 20 | 20 | 20 | 20 | 20 |
| Total Lens Length | 549.598 | 550.376 | 549.597 | 548.576 | 548.574 | 547.520 |
| BF | 0.5 | 0.5 | 0.5 | 0.5 | 0.5 | 0.5 |
| d0 | 45000 | 45000 | 45000 | 15000 | 15000 | 15000 |
| d6 | 108.811 | 70.703 | 10.509 | 106.486 | 68.378 | 8.184 |
| d12 | 13.481 | 37.269 | 49.595 | 13.481 | 37.269 | 49.595 |
| d16 | 5.952 | 8.475 | 49.399 | 5.952 | 8.475 | 49.399 |
| d22 | 2.320 | 14.117 | 21.061 | 2.320 | 14.117 | 21.061 |
| d35 | 25.001 | 25.379 | 24.600 | 25.903 | 25.902 | 24.847 |
| Entrance Pupil Pos. | 327.474 | 253.186 | 152.905 | 319.751 | 247.188 | 148.894 |
| Exit Pupil Pos. | −4482.3 | −4482.7 | −4481.9 | −4483.2 | −4483.2 | −4482.2 |

| Lens Group Data | | |
|---|---|---|
| Group | Start Surface | Focal Length |
| 1 | 1 | 339.766 |
| 2 | 7 | −111.971 |
| 3 | 13 | 1071.270 |

-continued

| | Unit: mm | |
|---|---|---|
| 4 | 17 | 389.260 |
| 5 | 23 | 116.261 |

Practical Example 3

| Unit: mm | | | | |
|---|---|---|---|---|
| Surface Data | | | | |
| Surface No. | CR | T | Nd | Vd |
| Object Surface | ∞ | Variable | | |
| 1 | 586.124 | 9.097 | 1.80611 | 40.73 |
| 2 | 159.706 | 30.808 | | |
| 3 | 176.143 | 24.748 | 1.49700 | 81.60 |
| 4 | −420.711 | 6.801 | | |
| 5 | 182.734 | 13.079 | 1.56384 | 60.82 |
| 6 | 1105.955 | Variable | | |
| 7 | 256.321 | 3.009 | 1.49700 | 81.60 |
| 8 | 55.920 | 17.391 | | |
| 9 | −318.564 | 4.091 | 1.49700 | 81.60 |
| 10 | 91.114 | 2.656 | | |
| 11 | 72.153 | 6.003 | 1.78590 | 43.93 |
| 12 | 138.082 | Variable | | |
| 13 | −82.586 | 3.000 | 1.49700 | 81.60 |
| 14 | −592.229 | 3.354 | | |
| 15 | −383.018 | 3.989 | 1.80611 | 40.73 |
| 16 | −143.091 | Variable | | |
| 17 | −80.437 | 3.000 | 1.67270 | 32.17 |
| 18 | 234.192 | 22.038 | | |
| 19 | 1228.609 | 6.000 | 1.83400 | 37.34 |
| 20 | −138.589 | 2.500 | | |
| 21 | 210.846 | 5.813 | 1.83400 | 37.34 |
| 22 | −603.364 | Variable | | |
| 23(Aperture Stop) | ∞ | 65.629 | | |
| 24 | −107.928 | 5.000 | 1.78590 | 43.93 |
| 25 | 139.102 | 2.256 | | |
| 26 | 138.783 | 10.600 | 1.49700 | 81.60 |
| 27 | −105.539 | 0.851 | | |
| 28 | 119.023 | 12.666 | 1.49700 | 81.60 |
| 29 | −211.197 | 1.492 | | |
| 30 | 359.404 | 4.500 | 1.78590 | 43.93 |
| 31 | 74.919 | 3.837 | | |
| 32 | 85.099 | 13.000 | 1.49700 | 81.60 |
| 33 | −264.567 | 57.669 | | |
| 34 | 114.213 | 10.000 | 1.49700 | 81.60 |
| 35 | ∞ | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

| Miscellaneous Data | | | | | |
|---|---|---|---|---|---|
| Zoom Ratio 1.924 | | | | | |
| | Tele (Remote) | Mid (Remote) | Wide (Remote) | Tele (Close) | Mid (Close) | Wide (Close) |
| Focal Length | 121.169 | 91.981 | 62.974 | 120.175 | 91.336 | 62.613 |
| F-number | 2.5 | 2.5 | 2.5 | 2.5 | 2.5 | 2.5 |
| View Angle | 9.370 | 12.264 | 17.617 | 9.441 | 12.342 | 17.708 |
| Image Height | 20 | 20 | 20 | 20 | 20 | 20 |
| Total Lens Length | 619.666 | 622.115 | 618.793 | 619.323 | 621.416 | 617.833 |
| BF | 0.5 | 0.5 | 0.5 | 0.5 | 0.5 | 0.5 |
| d0 | 45000 | 45000 | 45000 | 15000 | 15000 | 15000 |
| d6 | 99.206 | 64.875 | 18.085 | 98.014 | 63.683 | 16.894 |
| d12 | 13.896 | 34.328 | 39.164 | 13.896 | 34.328 | 39.164 |
| d16 | 4.359 | 6.607 | 40.191 | 4.359 | 6.607 | 40.191 |
| d22 | 0.324 | 11.975 | 20.345 | 0.324 | 11.975 | 20.345 |
| d35 | 22.003 | 24.453 | 21.130 | 22.852 | 24.945 | 21.362 |
| Entrance Pupil Pos. | 318.996 | 243.903 | 163.661 | 314.786 | 240.832 | 161.609 |
| Exit Pupil Pos. | 93793.9 | 93791.5 | 93794.8 | 93793.1 | 93791.0 | 93794.5 |

-continued

| Unit: mm | | |
|---|---|---|
| Lens Group Data | | |
| Group | Start Surface | Focal Length |
| 1 | 1 | 272.528 |
| 2 | 7 | −113.911 |
| 3 | 13 | −692.137 |
| 4 | 17 | 230.501 |
| 5 | 23 | 144.144 |

Practical Example 4

| Unit: mm | | | | |
|---|---|---|---|---|
| Surface Data | | | | |
| Surface No. | CR | T | Nd | Vd |
| Object Surface | ∞ | Variable | | |
| 1 | 401.263 | 9.097 | 1.80611 | 40.73 |
| 2 | 154.729 | 5.126 | | |
| 3 | 154.947 | 24.748 | 1.61800 | 63.39 |
| 4 | −833.999 | 6.801 | | |
| 5 | 186.668 | 12.000 | 1.48749 | 70.44 |
| 6 | 308.062 | Variable | | |
| 7 | 256.321 | 3.240 | 1.49700 | 81.60 |
| 8 | 59.936 | 17.391 | | |
| 9 | −230.550 | 4.091 | 1.43875 | 94.93 |
| 10 | 92.239 | 2.549 | | |
| 11 | 76.570 | 6.003 | 1.78590 | 43.93 |
| 12 | 129.457 | Variable | | |
| 13 | −70.533 | 3.000 | 1.62588 | 35.74 |
| 14 | 692.645 | 8.145 | | |
| 15 | 6898.211 | 6.396 | 1.88300 | 40.80 |
| 16 | −97.223 | Variable | | |
| 17 | −83.981 | 3.000 | 1.56732 | 42.84 |
| 18 | 303.707 | 7.476 | | |
| 19 | −217.527 | 4.925 | 1.83400 | 37.34 |
| 20 | −136.912 | 2.500 | | |
| 21 | 174.938 | 5.813 | 1.83400 | 37.34 |
| 22 | −297.909 | Variable | | |
| 23(Aperture Stop) | ∞ | 65.629 | | |
| 24 | −105.262 | 3.000 | 1.78590 | 43.93 |
| 25 | 144.951 | 3.534 | | |
| 26 | 306.172 | 9.760 | 1.43875 | 94.93 |
| 27 | −93.064 | 0.100 | | |
| 28 | 102.509 | 12.666 | 1.49700 | 81.60 |
| 29 | −187.173 | 13.923 | | |
| 30 | 135.688 | 4.500 | 1.78590 | 43.93 |
| 31 | 71.729 | 3.817 | | |
| 32 | 83.258 | 10.000 | 1.49700 | 81.60 |
| 33 | −391.124 | 23.979 | | |
| 34 | 316.178 | 10.000 | 1.49700 | 81.60 |
| 35 | −272.344 | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

| Miscellaneous Data | | | | | |
|---|---|---|---|---|---|
| Zoom Ratio 1.929 | | | | | |
| | Tele (Remote) | Mid (Remote) | Wide (Remote) | Tele (Close) | Mid (Close) | Wide (Close) |
| Focal Length | 122.692 | 93.049 | 63.616 | 121.257 | 92.091 | 63.078 |
| F-number | 2.5 | 2.5 | 2.5 | 2.5 | 2.5 | 2.5 |
| View Angle | 9.255 | 12.127 | 17.450 | 9.356 | 12.242 | 17.585 |
| Image Height | 20 | 20 | 20 | 20 | 20 | 20 |

-continued

| Unit: mm | | | | | | |
|---|---|---|---|---|---|---|
| Total Lens Length | 575.030 | 574.628 | 572.852 | 573.582 | 572.822 | 570.782 |
| BF | 0.5 | 0.5 | 0.5 | 0.5 | 0.5 | 0.5 |
| d0 | 45000 | 45000 | 45000 | 15000 | 15000 | 15000 |
| d6 | 112.625 | 73.922 | 12.993 | 110.318 | 71.614 | 10.685 |
| d12 | 12.734 | 37.111 | 49.668 | 12.734 | 37.111 | 49.668 |
| d16 | 5.321 | 8.287 | 49.556 | 5.321 | 8.287 | 49.556 |
| d22 | 2.405 | 13.766 | 20.868 | 2.405 | 13.766 | 20.868 |
| d35 | 23.737 | 23.334 | 21.559 | 24.596 | 23.836 | 21.796 |
| Entrance Pupil Pos. | 366.968 | 279.677 | 165.172 | 358.531 | 273.149 | 160.782 |
| Exit Pupil Pos. | −968900.0 | −968900.0 | −968900.0 | −968900.0 | −968900.0 | −968900.0 |

| Lens Group Data | | |
|---|---|---|
| Group | Start Surface | Focal Length |
| 1 | 1 | 375.425 |
| 2 | 7 | −111.740 |
| 3 | 13 | 1662.972 |
| 4 | 17 | 395.725 |
| 5 | 23 | 124.084 |

Practical Example 5

| Unit: mm | | | | |
|---|---|---|---|---|
| Surface Data | | | | |
| Surface No. | CR | T | Nd | Vd |
| Object Surface | ∞ | Variable | | |
| 1 | 704.229 | 9.097 | 1.80611 | 40.73 |
| 2 | 173.052 | 3.331 | | |
| 3 | 174.326 | 24.748 | 1.61800 | 63.39 |
| 4 | −660.394 | 6.801 | | |
| 5 | 162.677 | 13.897 | 1.49700 | 81.60 |
| 6 | 578.289 | Variable | | |
| 7 | 256.321 | 3.000 | 1.49700 | 81.60 |
| 8 | 63.705 | 17.391 | | |
| 9 | −187.808 | 4.091 | 1.43875 | 94.93 |
| 10 | 65.177 | 12.130 | | |
| 11 | 73.139 | 6.003 | 1.78590 | 43.93 |
| 12 | 113.891 | Variable | | |
| 13 | −140.960 | 4.500 | 1.62588 | 35.74 |
| 14 | 666.353 | 9.661 | | |
| 15 | 1683.008 | 7.000 | 1.88300 | 40.80 |
| 16 | −166.814 | Variable | | |
| 17 | −99.373 | 3.000 | 1.56732 | 42.84 |
| 18 | 254.815 | 5.803 | | |
| 19 | 2174.596 | 4.246 | 1.83400 | 37.34 |
| 20 | −280.534 | 2.500 | | |
| 21 | 333.386 | 5.813 | 1.83400 | 37.34 |
| 22 | −213.037 | Variable | | |
| 23(Aperture Stop) | ∞ | 65.629 | | |
| 24 | −112.728 | 4.500 | 1.78590 | 43.93 |
| 25 | 153.446 | 2.994 | | |
| 26 | 219.744 | 9.867 | 1.43875 | 94.93 |
| 27 | −110.548 | 0.826 | | |
| 28 | 119.567 | 12.666 | 1.49700 | 81.60 |
| 29 | −163.347 | 31.624 | | |
| 30 | 144.719 | 4.500 | 1.78590 | 43.93 |
| 31 | 72.687 | 5.821 | | |
| 32 | 82.494 | 10.000 | 1.49700 | 81.60 |
| 33 | −342.638 | 6.976 | | |
| 34 | 265.343 | 10.000 | 1.49700 | 81.60 |
| 35 | −552.865 | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

-continued

| | | | Unit: mm | | | |
|---|---|---|---|---|---|---|
| | | | Miscellaneous Data Zoom Ratio 2.315 | | | |
| | Tele (Remote) | Mid (Remote) | Wide (Remote) | Tele (Close) | Mid (Close) | Wide (Close) |
| Focal Length | 145.345 | 96.834 | 62.793 | 143.084 | 95.630 | 62.186 |
| F-number | 2.5 | 2.5 | 2.5 | 2.5 | 2.5 | 2.5 |
| View Angle | 7.832 | 11.666 | 17.665 | 7.949 | 11.802 | 17.823 |
| Image Height | 20 | 20 | 20 | 20 | 20 | 20 |
| Total Lens Length | 599.173 | 599.932 | 597.810 | 598.369 | 598.406 | 595.943 |
| BF | 0.5 | 0.5 | 0.5 | 0.5 | 0.5 | 0.5 |
| d0 | 45000 | 45000 | 45000 | 15000 | 15000 | 15000 |
| d6 | 113.112 | 68.714 | 11.375 | 110.993 | 66.595 | 9.256 |
| d12 | 11.090 | 38.152 | 49.045 | 11.090 | 38.152 | 49.045 |
| d16 | 4.340 | 8.989 | 49.125 | 4.340 | 8.989 | 49.125 |
| d22 | 1.587 | 14.274 | 20.585 | 1.587 | 14.274 | 20.585 |
| d35 | 35.630 | 36.389 | 34.267 | 36.946 | 36.983 | 34.519 |
| Entrance Pupil Pos. | 426.946 | 283.108 | 156.234 | 415.931 | 276.093 | 152.008 |
| Exit Pupil Pos. | −102400.0 | −102400.0 | −102400.0 | −102400.0 | −102400.0 | −102400.0 |

| | | |
|---|---|---|
| | Lens Group Data | |
| Group | Start Surface | Focal Length |
| 1 | 1 | 308.409 |
| 2 | 7 | −91.473 |
| 3 | 13 | 1115.267 |
| 4 | 17 | 380.836 |
| 5 | 23 | 131.309 |

Practical Example 6

| | | | | |
|---|---|---|---|---|
| | | Unit: mm | | |
| | | Surface Data | | |
| Surface No. | CR | T | Nd | Vd |
| Object Surface | ∞ | Variable | | |
| 1 | 405.041 | 9.097 | 1.80611 | 40.73 |
| 2 | 156.417 | 3.728 | | |
| 3 | 155.618 | 24.748 | 1.61800 | 63.39 |
| 4 | −857.374 | 6.801 | | |
| 5 | 186.181 | 12.000 | 1.48749 | 70.44 |
| 6 | 309.654 | Variable | | |
| 7 | 256.321 | 3.000 | 1.49700 | 81.60 |
| 8 | 59.703 | 17.391 | | |
| 9 | −234.063 | 4.091 | 1.43875 | 94.93 |
| 10 | 91.678 | 2.551 | | |
| 11 | 76.247 | 6.003 | 1.78590 | 43.93 |
| 12 | 128.800 | Variable | | |
| 13 | −70.916 | 3.000 | 1.62588 | 35.74 |
| 14 | 748.040 | 7.638 | | |
| 15 | 7853.503 | 6.743 | 1.88300 | 40.80 |
| 16 | −97.250 | Variable | | |
| 17 | −80.110 | 3.000 | 1.56732 | 42.84 |
| 18 | 374.880 | 7.129 | | |
| 19 | −171.097 | 5.037 | 1.83400 | 37.34 |
| 20 | −120.060 | 2.500 | | |
| 21 | 180.013 | 5.813 | 1.83400 | 37.34 |
| 22 | −279.425 | Variable | | |
| 23(Aperture Stop) | ∞ | 65.629 | | |

-continued

| Unit: mm | | | | |
|---|---|---|---|---|
| 24 | −103.526 | 3.000 | 1.78590 | 43.93 |
| 25 | 145.622 | 3.452 | | |
| 26 | 294.044 | 9.820 | 1.43875 | 94.93 |
| 27 | −92.393 | 0.100 | | |
| 28 | 103.897 | 12.666 | 1.49700 | 81.60 |
| 29 | −188.849 | 15.062 | | |
| 30 | 137.442 | 4.500 | 1.78590 | 43.93 |
| 31 | 73.471 | 3.541 | | |
| 32 | 85.544 | 10.000 | 1.49700 | 81.60 |
| 33 | −414.097 | 20.158 | | |
| 34 | 278.849 | 10.000 | 1.49700 | 81.60 |
| 35 | −284.343 | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

Miscellaneous Data
Zoom Ratio 1.933

| | Tele (Remote) | Mid (Remote) | Wide (Remote) | Tele (Close) | Mid (Close) | Wide (Close) |
|---|---|---|---|---|---|---|
| Focal Length | 123.368 | 93.413 | 63.823 | 121.569 | 92.214 | 63.151 |
| F-number | 2.5 | 2.5 | 2.5 | 2.5 | 2.5 | 2.5 |
| View Angle | 9.205 | 12.081 | 17.397 | 9.333 | 12.226 | 17.566 |
| Image Height | 20 | 20 | 20 | 20 | 20 | 20 |
| Total Lens Length | 573.349 | 572.952 | 571.245 | 571.394 | 570.608 | 568.621 |
| BF | 0.5 | 0.5 | 0.5 | 0.5 | 0.5 | 0.5 |
| d0 | 45000 | 45000 | 45000 | 15000 | 15000 | 15000 |
| d6 | 113.675 | 74.932 | 13.962 | 110.799 | 72.056 | 11.086 |
| d12 | 12.667 | 37.111 | 49.679 | 12.667 | 37.111 | 49.679 |
| d16 | 5.274 | 8.286 | 49.569 | 5.274 | 8.286 | 49.569 |
| d22 | 2.446 | 13.734 | 20.852 | 2.446 | 13.734 | 20.852 |
| d35 | 26.089 | 25.692 | 23.985 | 27.010 | 26.224 | 24.237 |
| Entrance Pupil Pos. | 371.091 | 282.542 | 166.525 | 360.447 | 274.309 | 160.988 |
| Exit Pupil Pos. | −205400.0 | −205400.0 | −205400.0 | −205400.0 | −205400.0 | −205400.0 |

Lens Group Data

| Group | Start Surface | Focal Length |
|---|---|---|
| 1 | 1 | 377.154 |
| 2 | 7 | −111.454 |
| 3 | 13 | 1524.784 |
| 4 | 17 | 403.230 |
| 5 | 23 | 123.360 |

Practical Example 7

| Unit: mm | | | | |
|---|---|---|---|---|
| Surface Data | | | | |
| Surface No. | CR | T | Nd | Vd |
| Object Surface | ∞ | Variable | | |
| 1 | 160.948 | 10.500 | 1.71300 | 53.93 |
| 2 | 596.640 | 0.300 | | |
| 3 | 138.371 | 5.200 | 1.49700 | 81.60 |
| 4 | 68.784 | 19.413 | | |
| 5 | 625.945 | 4.300 | 1.49700 | 81.60 |
| 6 | 87.138 | 13.773 | | |
| 7 | −390.095 | 3.800 | 1.67270 | 32.17 |
| 8 | 142.422 | Variable | | |
| 9 | −252.725 | 4.800 | 1.59270 | 35.44 |
| 10 | 180.608 | Variable | | |
| 11 | 530.682 | 10.000 | 1.74330 | 49.22 |
| 12 | −139.353 | Variable | | |
| 13 | −85.625 | 3.800 | 1.64850 | 53.03 |
| 14 | 210.378 | 4.542 | | |

-continued

| | | Unit: mm | | |
|---|---|---|---|---|
| 15 | 2078.135 | 8.500 | 1.59282 | 68.62 |
| 16 | −118.471 | 0.300 | | |
| 17 | 170.624 | 14.000 | 1.49700 | 81.60 |
| 18 | −106.929 | Variable | | |
| 19 | −423.431 | 3.000 | 1.49700 | 81.60 |
| 20 | 78.951 | 4.764 | | |
| 21 | 84.406 | 6.969 | 1.70200 | 40.19 |
| 22 | 4965.370 | Variable | | |
| 23(Aperture Stop) | ∞ | 81.593 | | |
| 24 | −71.918 | 3.500 | 1.88300 | 40.76 |
| 25 | 219.762 | 2.804 | | |
| 26 | 274.191 | 8.882 | 1.49700 | 81.60 |
| 27 | −89.248 | 0.300 | | |
| 28 | 180.066 | 10.420 | 1.49700 | 81.60 |
| 29 | −98.440 | 0.300 | | |
| 30 | 176.448 | 3.200 | 1.88300 | 40.76 |
| 31 | 75.818 | 2.897 | | |
| 32 | 82.717 | 9.779 | 1.49700 | 81.60 |
| 33 | −501.238 | 0.700 | | |
| 34 | 131.532 | 7.722 | 1.49700 | 81.60 |
| 35 | −385.780 | Variable | | |
| 36 | ∞ | 116.500 | 1.51680 | 64.19 |
| 37 | ∞ | 5.500 | | |
| 38 | ∞ | 3.000 | 1.48749 | 70.44 |
| 39 | ∞ | 0.500 | | |
| Image Surface | ∞ | | | |

Miscellaneous Data
Zoom Ratio 1.361

| | Tele (Remote) | Mid (Remote) | Wide (Remote) | Tele (Close) | Mid (Close) | Wide (Close) |
|---|---|---|---|---|---|---|
| Focal Length | 57.368 | 49.012 | 42.165 | 57.195 | 48.845 | 42.020 |
| F-number | 2.5 | 2.5 | 2.5 | 2.5 | 2.5 | 2.5 |
| View Angle | 19.218 | 22.197 | 25.373 | 19.269 | 22.260 | 25.443 |
| Image Height | 20 | 20 | 20 | 20 | 20 | 20 |
| Total Lens Length | 583.235 | 582.474 | 582.281 | 583.967 | 583.294 | 583.161 |
| BF | 0.5 | 0.5 | 0.5 | 0.5 | 0.5 | 0.5 |
| d0 | 45000 | 45000 | 45000 | 15000 | 15000 | 15000 |
| d8 | 27.156 | 24.946 | 24.142 | 28.202 | 25.992 | 25.187 |
| d10 | 31.184 | 31.209 | 31.234 | 31.184 | 31.209 | 31.234 |
| d12 | 27.985 | 74.707 | 116.806 | 27.985 | 74.707 | 116.806 |
| d18 | 95.711 | 46.389 | 0.948 | 95.711 | 46.389 | 0.948 |
| d22 | 6.980 | 11.764 | 15.885 | 6.980 | 11.764 | 15.885 |
| d35 | 18.662 | 17.901 | 17.708 | 18.348 | 17.676 | 17.542 |
| Entrance Pupil Pos. | 115.150 | 112.225 | 111.776 | 115.214 | 112.307 | 111.862 |
| Exit Pupil Pos. | −6408.5 | −6407.7 | −6407.5 | −6408.2 | −6407.5 | −6407.4 |

Lens Group Data

| Group | Start Surface | Focal Length |
|---|---|---|
| 1 | 1 | −88.068 |
| 2 | 9 | −176.987 |
| 3 | 11 | 149.438 |
| 4 | 13 | 265.676 |
| 5 | 19 | 996.664 |
| 6 | 23 | 128.336 |

Practical Example 8

| | | Unit: mm | | |
|---|---|---|---|---|
| | | Surface Data | | |
| Surface No. | CR | T | Nd | Vd |
| Object Surface | ∞ | Variable | | |
| 1 | 150.676 | 13.160 | 1.51680 | 64.20 |
| 2 | −9365.927 | 0.500 | | |
| 3 | 133.617 | 4.675 | 1.49700 | 81.61 |

-continued

| Unit: mm | | | | |
|---|---|---|---|---|
| 4 | 61.897 | 22.049 | | |
| 5 | −258.220 | 3.723 | 1.75700 | 47.73 |
| 6 | 104.445 | 10.866 | | |
| 7 | −311.434 | 4.977 | 1.49700 | 81.61 |
| 8 | 169.469 | Variable | | |
| 9 | −352.080 | 5.806 | 1.67270 | 32.17 |
| 10 | 143.422 | 2.454 | | |
| 11 | 155.035 | 14.512 | 1.74400 | 44.90 |
| 12 | −117.494 | Variable | | |
| 13 | −88.784 | 3.143 | 1.51742 | 52.16 |
| 14 | 227.781 | 3.642 | | |
| 15 | 665.230 | 6.319 | 1.49700 | 81.61 |
| 16 | −130.160 | Variable | | |
| 17 | 222.799 | 8.682 | 1.49700 | 81.61 |
| 18 | −116.901 | Variable | | |
| 19(Aperture Stop) | ∞ | 3.724 | | |
| 20 | −207.255 | 2.657 | 1.49700 | 81.61 |
| 21 | 78.275 | 2.104 | | |
| 22 | 79.598 | 6.741 | 1.80610 | 40.73 |
| 23 | −10349.824 | 73.267 | | |
| 24 | −60.522 | 2.292 | 1.88300 | 40.80 |
| 25 | 188.255 | 2.701 | | |
| 26 | 277.921 | 7.612 | 1.49700 | 81.61 |
| 27 | −86.568 | 0.200 | | |
| 28 | 175.504 | 11.753 | 1.49700 | 81.61 |
| 29 | −75.308 | 0.200 | | |
| 30 | 323.871 | 4.519 | 1.80420 | 46.49 |
| 31 | 75.015 | 3.007 | | |
| 32 | 84.921 | 10.679 | 1.49700 | 81.61 |
| 33 | −260.719 | 0.700 | | |
| 34 | 111.717 | 8.276 | 1.49700 | 81.61 |
| 35 | −423.445 | Variable | | |
| 36 | ∞ | 116.500 | 1.51680 | 64.20 |
| 37 | ∞ | 5.000 | | |
| 38 | ∞ | 3.000 | 1.48749 | 70.45 |
| 39 | ∞ | 0.500 | | |
| Image Surface | ∞ | | | |

Miscellaneous Data
Zoom Ratio 1.363

| | Tele (Remote) | Mid (Remote) | Wide (Remote) | Tele (Close) | Mid (Close) | Wide (Close) |
|---|---|---|---|---|---|---|
| Focal Length | 57.404 | 49.292 | 42.116 | 57.395 | 49.278 | 42.105 |
| F-number | 2.5 | 2.5 | 2.5 | 2.5 | 2.5 | 2.5 |
| View Angle | 19.207 | 22.083 | 25.399 | 19.207 | 22.084 | 25.399 |
| Image Height | 20 | 20 | 20 | 20 | 20 | 20 |
| Total Lens Length | 587.735 | 587.364 | 587.324 | 587.925 | 587.566 | 587.534 |
| BF | 0.5 | 0.5 | 0.5 | 0.5 | 0.5 | 0.5 |
| d0 | 45000 | 45000 | 45000 | 15000 | 15000 | 15000 |
| d8 | 42.660 | 43.117 | 44.136 | 42.891 | 43.347 | 44.367 |
| d12 | 68.887 | 109.802 | 149.591 | 68.887 | 109.802 | 149.591 |
| d16 | 1.571 | 1.200 | 1.989 | 1.571 | 1.200 | 1.989 |
| d18 | 85.598 | 44.598 | 3.000 | 85.598 | 44.598 | 3.000 |
| d35 | 19.078 | 18.707 | 18.667 | 19.038 | 18.678 | 18.646 |
| Entrance Pupil Pos. | 108.319 | 106.290 | 106.059 | 108.319 | 106.291 | 106.060 |
| Exit Pupil Pos. | −8630.7 | −8630.4 | −8630.3 | −8630.7 | −8630.3 | −8630.3 |

Lens Group Data

| Group | Start Surface | Focal Length |
|---|---|---|
| 1 | 1 | −65.333 |
| 2 | 9 | 206.404 |
| 3 | 13 | −307.438 |
| 4 | 17 | 155.590 |
| 5 | 19 | 132.723 |

Practical Example 9

| | | Unit: mm | | |
|---|---|---|---|---|
| | | Surface Data | | |
| Surface No. | CR | T | Nd | Vd |
| Object Surface | ∞ | Variable | | |
| 1 | 706.051 | 11.200 | 1.51680 | 64.19 |
| 2 | −904.832 | 0.100 | | |
| 3 | 197.289 | 5.400 | 1.49700 | 81.60 |
| 4 | 57.786 | 15.000 | | |
| 5 | 601.406 | 4.500 | 1.49700 | 81.60 |
| 6 | 81.135 | 13.381 | | |
| 7 | −188.618 | 5.000 | 1.49700 | 81.60 |
| 8 | 182.996 | Variable | | |
| 9 | 20989.467 | 4.000 | 1.64769 | 33.84 |
| 10 | 125.006 | 2.560 | | |
| 11 | 130.050 | 15.000 | 1.63854 | 55.44 |
| 12 | −111.579 | Variable | | |
| 13 | −94.505 | 3.800 | 1.63854 | 55.44 |
| 14 | 167.256 | 3.496 | | |
| 15 | 224.553 | 10.641 | 1.49700 | 81.60 |
| 16 | −129.366 | Variable | | |
| 17 | 252.953 | 12.000 | 1.49700 | 81.60 |
| 18 | −108.487 | Variable | | |
| 19(Aperture Stop) | ∞ | 4.500 | | |
| 20 | −246.821 | 5.000 | 1.49700 | 81.60 |
| 21 | 94.905 | 3.173 | | |
| 22 | 91.857 | 11.593 | 1.80611 | 40.73 |
| 23 | −1368.739 | 64.133 | | |
| 24 | −67.995 | 3.700 | 1.88300 | 40.80 |
| 25 | 165.718 | 2.109 | | |
| 26 | 153.074 | 10.135 | 1.49700 | 81.60 |
| 27 | −105.856 | 0.300 | | |
| 28 | 169.156 | 12.000 | 1.49700 | 81.60 |
| 29 | −99.856 | 0.300 | | |
| 30 | 286.174 | 3.500 | 1.80420 | 46.50 |
| 31 | 71.348 | 4.452 | | |
| 32 | 85.509 | 12.000 | 1.49700 | 81.60 |
| 33 | −244.577 | 1.000 | | |
| 34 | 134.833 | 8.951 | 1.49700 | 81.60 |
| 35 | −291.926 | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

| | Miscellaneous Data | | | | | |
|---|---|---|---|---|---|---|
| | Zoom Ratio 1.362 | | | | | |
| | Tele (Remote) | Mid (Remote) | Wide (Remote) | Tele (Close) | Mid (Close) | Wide (Close) |
| Focal Length | 57.378 | 48.974 | 42.115 | 57.372 | 48.965 | 42.109 |
| F-number | 2.5 | 2.5 | 2.5 | 2.5 | 2.5 | 2.5 |
| View Angle | 19.216 | 22.213 | 25.401 | 19.215 | 22.214 | 25.400 |
| Image Height | 20 | 20 | 20 | 20 | 20 | 20 |
| Total Lens Length | 588.768 | 588.011 | 587.648 | 588.915 | 588.168 | 588.112 |
| BF | 0.5 | 0.5 | 0.5 | 0.5 | 0.5 | 0.5 |
| d0 | 45000 | 45000 | 45000 | 15000 | 15000 | 15000 |
| d8 | 41.675 | 44.709 | 47.530 | 41.854 | 44.887 | 47.708 |
| d12 | 53.438 | 98.782 | 139.842 | 53.438 | 98.782 | 139.842 |
| d16 | 1.811 | 1.198 | 2.378 | 1.811 | 1.198 | 2.378 |
| d18 | 94.453 | 46.689 | 1.627 | 94.453 | 46.689 | 1.627 |
| d35 | 19.466 | 18.709 | 18.646 | 19.435 | 18.688 | 18.631 |
| Entrance Pupil Pos. | 88.320 | 86.607 | 86.723 | 88.320 | 86.607 | 86.723 |
| Exit Pupil Pos. | −2000.8 | −2000.0 | −2000.0 | −2000.8 | −2000.0 | −2000.0 |

| Lens Group Data | | |
|---|---|---|
| Group | Start Surface | Focal Length |
| 1 | 1 | −59.521 |
| 2 | 9 | 177.579 |
| 3 | 13 | −247.995 |

-continued

| | Unit: mm | |
|---|---|---|
| 4 | 17 | 154.468 |
| 5 | 19 | 141.257 |

Practical Example 10

| Unit: mm | | | | |
|---|---|---|---|---|
| Surface Data | | | | |
| Surface No. | CR | T | Nd | Vd |
| Object Surface | ∞ | Variable | | |
| 1 | 191.085 | 10.500 | 1.69100 | 54.69 |
| 2 | 2115.024 | 0.300 | | |
| 3 | 165.921 | 5.200 | 1.49700 | 81.60 |
| 4 | 75.783 | 14.271 | | |
| 5 | 368.960 | 4.300 | 1.49700 | 81.60 |
| 6 | 77.859 | 16.064 | | |
| 7 | −197.703 | 3.800 | 1.67270 | 32.17 |
| 8 | 659.318 | Variable | | |
| 9 | −180.154 | 4.800 | 1.59270 | 35.44 |
| 10 | 136.161 | 33.553 | | |
| 11 | 511.352 | 10.000 | 1.74330 | 49.22 |
| 12 | −134.803 | Variable | | |
| 13 | −83.380 | 3.800 | 1.64850 | 53.03 |
| 14 | 218.058 | 4.626 | | |
| 15 | 4477.803 | 8.500 | 1.59282 | 68.62 |
| 16 | −114.444 | 0.300 | | |
| 17 | 172.742 | 14.000 | 1.49700 | 81.60 |
| 18 | −105.505 | Variable | | |
| 19 | −499.023 | 3.000 | 1.49700 | 81.60 |
| 20 | 76.826 | 4.808 | | |
| 21 | 81.545 | 8.042 | 1.70200 | 40.19 |
| 22 | 1626.794 | Variable | | |
| 23(Aperture Stop) | ∞ | 79.443 | | |
| 24 | −67.603 | 3.500 | 1.88300 | 40.76 |
| 25 | 271.928 | 3.078 | | |
| 26 | 365.371 | 9.022 | 1.49700 | 81.60 |
| 27 | −82.183 | 0.300 | | |
| 28 | 182.702 | 10.624 | 1.49700 | 81.60 |
| 29 | −98.167 | 0.300 | | |
| 30 | 177.255 | 3.200 | 1.88300 | 40.76 |
| 31 | 75.829 | 3.101 | | |
| 32 | 83.450 | 9.748 | 1.49700 | 81.60 |
| 33 | −579.130 | 0.700 | | |
| 34 | 130.467 | 7.855 | 1.49700 | 81.60 |
| 35 | −370.385 | Variable | | |
| 36 | ∞ | 116.500 | 1.51680 | 64.19 |
| 37 | ∞ | 5.500 | | |
| 38 | ∞ | 3.000 | 1.48749 | 70.44 |
| 39 | ∞ | 0.500 | | |
| Image Surface | ∞ | | | |

| Miscellaneous Data | | | | | |
|---|---|---|---|---|---|
| Zoom Ratio 1.361 | | | | | |
| | Tele (Remote) | Mid (Remote) | Wide (Remote) | Tele (Close) | Mid (Close) | Wide (Close) |
| Focal Length | 57.358 | 48.995 | 42.142 | 56.990 | 48.656 | 41.847 |
| F-number | 2.5 | 2.5 | 2.5 | 2.5 | 2.5 | 2.5 |
| View Angle | 19.221 | 22.203 | 25.385 | 19.333 | 22.338 | 25.534 |
| Image Height | 20 | 20 | 20 | 20 | 20 | 20 |
| Total Lens Length | 580.287 | 579.417 | 579.277 | 581.789 | 581.036 | 580.978 |
| BF | 0.5 | 0.5 | 0.5 | 0.5 | 0.5 | 0.5 |
| d0 | 45000 | 45000 | 45000 | 15000 | 15000 | 15000 |
| d8 | 20.008 | 17.806 | 16.981 | 21.936 | 19.733 | 18.909 |
| d12 | 33.968 | 80.704 | 122.806 | 33.968 | 80.704 | 122.806 |
| d18 | 95.621 | 46.386 | 1.022 | 95.621 | 46.386 | 1.022 |
| d22 | 5.868 | 10.569 | 14.655 | 5.868 | 10.569 | 14.655 |
| d35 | 18.590 | 17.719 | 17.579 | 18.163 | 17.411 | 17.352 |
| Entrance Pupil Pos. | 115.553 | 108.494 | 108.042 | 111.789 | 108.770 | 108.324 |
| Exit Pupil Pos. | −7237.3 | −7236.4 | −7236.3 | −7236.8 | −7236.1 | −7236.0 |

-continued

| Unit: mm | | |
|---|---|---|
| Lens Group Data | | |
| Group | Start Surface | Focal Length |
| 1 | 1 | −106.349 |
| 2 | 9 | 750.602 |
| 3 | 13 | 264.612 |
| 4 | 19 | 987.679 |
| 5 | 23 | 126.738 |

Practical Example 11

| Unit: mm | | | | |
|---|---|---|---|---|
| Surface Data | | | | |
| Surface No. | CR | T | Nd | Vd |
| Object Surface | ∞ | Variable | | |
| 1 | 317.814 | 11.200 | 1.51680 | 64.19 |
| 2 | 15551.605 | 6.617 | | |
| 3 | 193.793 | 5.400 | 1.49700 | 81.60 |
| 4 | 64.650 | 17.135 | | |
| 5 | 652.169 | 4.500 | 1.49700 | 81.60 |
| 6 | 67.050 | 30.905 | | |
| 7 | −293.508 | 5.000 | 1.49700 | 81.60 |
| 8 | 197.781 | Variable | | |
| 9 | −1422.296 | 4.000 | 1.64769 | 33.84 |
| 10 | 147.107 | 2.599 | | |
| 11 | 148.239 | 14.988 | 1.63854 | 55.44 |
| 12 | −112.871 | Variable | | |
| 13 | −132.162 | 3.800 | 1.63854 | 55.44 |
| 14 | 179.946 | 8.151 | | |
| 15 | 266.516 | 12.000 | 1.49700 | 81.60 |
| 16 | −205.666 | Variable | | |
| 17 | 291.013 | 8.848 | 1.49700 | 81.60 |
| 18 | −133.083 | Variable | | |
| 19(Aperture Stop) | ∞ | 4.500 | | |
| 20 | −148.387 | 5.000 | 1.49700 | 81.60 |
| 21 | 121.964 | 7.226 | | |
| 22 | 103.853 | 13.362 | 1.80611 | 40.73 |
| 23 | −442.381 | 60.662 | | |
| 24 | −59.834 | 3.700 | 1.88300 | 40.80 |
| 25 | 252.894 | 2.196 | | |
| 26 | 225.122 | 11.645 | 1.49700 | 81.60 |
| 27 | −83.509 | 0.300 | | |
| 28 | 182.217 | 12.000 | 1.49700 | 81.60 |
| 29 | −94.293 | 0.300 | | |
| 30 | 269.442 | 3.500 | 1.80420 | 46.50 |
| 31 | 67.356 | 2.902 | | |
| 32 | 74.603 | 12.000 | 1.49700 | 81.60 |
| 33 | −178.972 | 1.000 | | |
| 34 | 124.785 | 7.376 | 1.49700 | 81.60 |
| 35 | −4268.611 | Variable | | |
| 36 | ∞ | 116.500 | 1.51680 | 64.19 |
| 37 | ∞ | 5.000 | | |
| 38 | ∞ | 3.000 | 1.48749 | 70.44 |
| 39 | ∞ | 0.500 | | |
| Image Surface | ∞ | | | |

| Miscellaneous Data | | | | | |
|---|---|---|---|---|---|
| Zoom Ratio 1.270 | | | | | |
| | Tele (Remote) | Mid (Remote) | Wide (Remote) | Tele (Close) | Mid (Close) | Wide (Close) |
| Focal Length | 48.278 | 42.760 | 38.006 | 48.267 | 42.749 | 37.997 |
| F-number | 2.5 | 2.5 | 2.5 | 2.5 | 2.5 | 2.5 |
| View Angle | 22.501 | 25.065 | 27.752 | 22.503 | 25.066 | 27.751 |
| Image Height | 20 | 20 | 20 | 20 | 20 | 20 |
| Total Lens Length | 600.091 | 599.681 | 599.477 | 600.252 | 599.841 | 599.636 |
| BF | 0.5 | 0.5 | 0.5 | 0.5 | 0.5 | 0.5 |

-continued

| Unit: mm | | | | | | |
|---|---|---|---|---|---|---|
| d0 | 45000 | 45000 | 45000 | 15000 | 15000 | 15000 |
| d8 | 48.456 | 51.542 | 53.975 | 48.609 | 51.695 | 54.128 |
| d12 | 28.552 | 73.785 | 115.096 | 28.552 | 73.785 | 115.096 |
| d16 | 2.113 | 1.053 | 2.406 | 2.113 | 1.053 | 2.406 |
| d18 | 94.077 | 46.819 | 1.722 | 94.077 | 46.819 | 1.722 |
| d35 | 19.080 | 18.671 | 18.466 | 19.089 | 18.678 | 18.473 |
| Entrance Pupil Pos. | 102.124 | 101.440 | 101.933 | 102.125 | 101.442 | 101.934 |
| Exit Pupil Pos. | −22201.5 | −22201.1 | −22200.9 | −22201.6 | −22201.1 | −22200.9 |

| Lens Group Data | | |
|---|---|---|
| Group | Start Surface | Focal Length |
| 1 | 1 | −62.991 |
| 2 | 9 | 189.959 |
| 3 | 13 | −272.291 |
| 4 | 17 | 185.026 |
| 5 | 19 | 125.167 |

Practical Example 12

| Unit: mm | | | | |
|---|---|---|---|---|
| Surface Data | | | | |
| Surface No. | CR | T | Nd | Vd |
| Object Surface | ∞ | Variable | | |
| 1 | 187.363 | 10.500 | 1.69100 | 54.69 |
| 2 | 1279.766 | 0.300 | | |
| 3 | 126.854 | 5.200 | 1.49700 | 81.60 |
| 4 | 70.611 | 17.099 | | |
| 5 | 1107.913 | 4.300 | 1.49700 | 81.60 |
| 6 | 83.366 | 14.230 | | |
| 7 | −298.630 | 3.800 | 1.67270 | 32.17 |
| 8 | 198.143 | Variable | | |
| 9 | −258.316 | 4.800 | 1.59270 | 35.44 |
| 10 | 149.477 | 32.875 | | |
| 11 | 489.465 | 10.000 | 1.74330 | 49.22 |
| 12 | −140.748 | Variable | | |
| 13 | −82.749 | 3.800 | 1.64850 | 53.03 |
| 14 | 217.607 | 4.495 | | |
| 15 | 2449.065 | 8.500 | 1.59282 | 68.62 |
| 16 | −114.830 | 0.300 | | |
| 17 | 174.930 | 14.000 | 1.49700 | 81.60 |
| 18 | −105.016 | Variable | | |
| 19 | −490.329 | 3.000 | 1.49700 | 81.60 |
| 20 | 77.468 | 3.879 | | |
| 21 | 81.645 | 10.269 | 1.70200 | 40.19 |
| 22 | 1660.162 | Variable | | |
| 23(Aperture Stop) | ∞ | 77.190 | | |
| 24 | −69.095 | 3.500 | 1.88300 | 40.76 |
| 25 | 247.450 | 3.101 | | |
| 26 | 319.118 | 8.962 | 1.49700 | 81.60 |
| 27 | −85.363 | 0.300 | | |
| 28 | 180.166 | 10.499 | 1.49700 | 81.60 |
| 29 | −99.060 | 0.300 | | |
| 30 | 165.607 | 3.200 | 1.88300 | 40.76 |
| 31 | 73.996 | 3.126 | | |
| 32 | 81.117 | 9.590 | 1.49700 | 81.60 |
| 33 | −868.939 | 0.700 | | |
| 34 | 128.202 | 8.021 | 1.49700 | 81.60 |
| 35 | −348.482 | Variable | | |
| 36 | ∞ | 116.500 | 1.51680 | 64.19 |
| 37 | ∞ | 5.500 | | |
| 38 | ∞ | 3.000 | 1.48749 | 70.44 |
| 39 | ∞ | 0.500 | | |
| Image Surface | ∞ | | | |

-continued

| Unit: mm | | | | | | |
|---|---|---|---|---|---|---|
| Miscellaneous Data Zoom Ratio 1.362 | | | | | | |
| | Tele (Remote) | Mid (Remote) | Wide (Remote) | Tele (Close) | Mid (Close) | Wide (Close) |
| Focal Length | 57.444 | 49.053 | 42.190 | 57.070 | 48.700 | 41.883 |
| F-number | 2.5 | 2.5 | 2.5 | 2.5 | 2.5 | 2.5 |
| View Angle | 19.194 | 22.179 | 25.359 | 19.307 | 22.319 | 25.514 |
| Image Height | 20 | 20 | 20 | 20 | 20 | 20 |
| Total Lens Length | 586.041 | 585.128 | 584.890 | 587.516 | 586.796 | 586.690 |
| BF | 0.5 | 0.5 | 0.5 | 0.5 | 0.5 | 0.5 |
| d0 | 45000 | 45000 | 45000 | 15000 | 15000 | 15000 |
| d8 | 20.127 | 17.952 | 17.115 | 22.296 | 20.121 | 19.284 |
| d12 | 38.524 | 85.263 | 127.359 | 38.524 | 85.263 | 127.359 |
| d18 | 95.627 | 46.392 | 1.017 | 95.627 | 46.392 | 1.017 |
| d22 | 7.692 | 12.363 | 16.479 | 7.692 | 12.363 | 16.479 |
| d35 | 18.735 | 17.822 | 17.584 | 18.041 | 17.321 | 17.215 |
| Entrance Pupil Pos. | 114.632 | 111.584 | 111.078 | 114.789 | 111.781 | 111.282 |
| Exit Pupil Pos. | −3246.3 | −3245.4 | −3245.1 | −3245.6 | −3244.9 | −3244.8 |

| Lens Group Data | | |
|---|---|---|
| Group | Start Surface | Focal Length |
| 1 | 1 | −93.353 |
| 2 | 9 | 476.273 |
| 3 | 13 | 264.560 |
| 4 | 17 | 1010.675 |
| 5 | 19 | 127.008 |

TABLE 2

| Values of Conditional Formulae | (1A), (1B) | (2A), (2B) AT/1T, |AT|/1T | | (3) | (4) |
|---|---|---|---|---|---|
| | $f_w/f_a$ | (T) | (W) | $f_t/f_w$ | LB/Ymax |
| EX 1 | 0.20 | −0.50 | −0.18 | 1.65 | 5.20 |
| EX 2 | 0.19 | −0.39 | −0.11 | 1.93 | 5.45 |
| EX 3 | 0.23 | −0.71 | −0.19 | 1.92 | 5.27 |
| EX 4 | 0.17 | −0.37 | −0.10 | 1.93 | 5.29 |
| EX 5 | 0.20 | −0.62 | −0.12 | 2.31 | 5.93 |
| EX 6 | 0.17 | −0.32 | −0.09 | 1.93 | 5.42 |
| EX 7 | −0.48 | −0.30 | −0.16 | 1.36 | 5.09 |
| EX 8 | −0.64 | −0.17 | −0.09 | 1.36 | 5.15 |
| EX 9 | −0.71 | −0.18 | −0.08 | 1.36 | 5.15 |
| EX 10 | −0.40 | −0.22 | −0.12 | 1.36 | 5.08 |
| EX 11 | −0.60 | −0.06 | −0.04 | 1.27 | 5.14 |
| EX 12 | −0.45 | −0.32 | −0.17 | 1.36 | 5.08 |

TABLE 3

| Related Data | 1T | | AT | | |
|---|---|---|---|---|---|
| | $f_a$ | (T−W) | (T) | (M) | (W) |
| EX 1 | 255.947 | 0.801 | −0.397 | −0.241 | −0.148 |
| EX 2 | 339.766 | 2.325 | −0.902 | −0.523 | −0.248 |
| EX 3 | 272.528 | 1.192 | −0.848 | −0.493 | −0.232 |
| EX 4 | 375.425 | 2.307 | −0.859 | −0.501 | −0.237 |
| EX 5 | 308.409 | 2.119 | −1.316 | −0.593 | −0.252 |
| EX 6 | 377.154 | 2.876 | −0.920 | −0.532 | −0.252 |
| EX 7 | −88.068 | −1.045 | 0.314 | 0.225 | 0.166 |
| EX 8 | −65.333 | −0.230 | 0.040 | 0.028 | 0.020 |
| EX 9 | −59.521 | −0.179 | 0.031 | 0.021 | 0.015 |
| EX 10 | −106.349 | −1.927 | 0.426 | 0.309 | 0.227 |
| EX 11 | −62.991 | −0.153 | −0.009 | −0.007 | −0.007 |
| EX 12 | −93.353 | −2.169 | 0.694 | 0.501 | 0.369 |

What is claimed is:

1. A variable-focal-length lens system for projection, the lens system achieving focusing by movement of the entire system, the lens system comprising:
   two or more focal-length-varying lens groups which individually move in an optical axis direction to vary a group-to-group distance so as to vary a focal length of the entire system; and
   a distance-compensation lens group which is separate from the focal-length-varying lens groups and which, during focusing, move in the optical axis direction such that, as a projection distance varies from a remote distance to a close distance, curvature of field varies to an under side.

2. The variable-focal-length lens system according to claim 1,
   wherein an amount of movement of the distance-compensation lens group is not affected by the focal length of the entire system but remains constant so long as the projection distance remains constant.

3. The variable-focal-length lens system according to claim 2, wherein
   the lens system includes, from an enlargement side, the distance-compensation lens group which has a positive optical power and the focal-length-varying lens groups of which at least one has a negative optical power,
   as the projection distance varies from a remote distance to a close distance, the distance-compensation lens group moves to a reduction side, and
   the following conditional formulae (1A) and (2A) are fulfilled:

$0.15 < fw/fa < 0.25$ (1A)

$-0.75 < AT/1T < -0.05$ (2A)

where
   fw represents the focal length of the entire system at a wide-angle end;
   fa represents a focal length of the distance-compensation lens group;

AT represents an amount of movement of the entire system for a variation in projection distance from a remote distance to a close distance (with an amount of movement to the reduction side defined to be in a positive direction); and 1T represents the amount of movement of the distance-compensation lens group for a variation in projection distance from a remote distance to a close distance (with an amount of movement to the reduction side defined to be in the positive direction).

4. The variable-focal-length lens system according to claim 3,
wherein the lens system includes five or more lens groups comprising, from an enlargement side, the distance-compensation lens group which has a positive optical power, one of the focal-length-varying lens groups which has a largest movement amount and which has a negative optical power, two or more of the focal-length-varying lens groups which have a positive or negative optical power, and a lens group which is located at a reduction-side end, which remains stationary during magnification varying, and which has a positive optical power.

5. The variable-focal-length lens system according to claim 2, wherein
the lens system includes, from an enlargement side, the distance-compensation lens group which has a negative optical power and the focal-length-varying lens groups of which at least one has a positive optical power,
as the projection distance varies from a remote distance to a close distance, the distance-compensation lens group moves to the enlargement side, and
the following conditional formulae (1B) and (2B) are fulfilled:

$$-0.8 < fw/fa < -0.3 \quad (1B)$$

$$-0.35 < |AT|/1T < -0.03 \quad (2B)$$

where
fw represents the focal length of the entire system at a wide-angle end;
fa represents a focal length of the distance-compensation lens group;
AT represents an amount of movement of the entire system for a variation in projection distance from a remote distance to a close distance (with an amount of movement to a reduction side defined to be in a positive direction); and
1T represents the amount of movement of the distance-compensation lens group for a variation in projection distance from a remote distance to a close distance (with an amount of movement to the reduction side defined to be in the positive direction).

6. The variable-focal-length lens system according to claim 5,
wherein the lens system includes five or more lens groups comprising, from an enlargement side, the distance-compensation lens group which has a negative optical power, three or more of the focal-length-varying lens groups which have a positive or negative optical power, and a lens group which is located at a reduction-side end, which remains stationary during magnification varying, and which has a positive optical power, one of the three or more of the focal-length-varying lens groups being a focal-length-varying lens group which has a largest amount of movement and which has a positive optical power.

7. The variable-focal-length lens system according to claim 2,
wherein the lens system includes five or more lens groups comprising, from an enlargement side, the distance-compensation lens group which has a positive optical power, one of the focal-length-varying lens groups which has a largest movement amount and which has a negative optical power, two or more of the focal-length-varying lens groups which have a positive or negative optical power, and a lens group which is located at a reduction-side end, which remains stationary during magnification varying, and which has a positive optical power.

8. The variable-focal-length lens system according to claim 2,
wherein the lens system includes five or more lens groups comprising, from an enlargement side, the distance-compensation lens group which has a negative optical power, three or more of the focal-length-varying lens groups which have a positive or negative optical power, and a lens group which is located at a reduction-side end, which remains stationary during magnification varying, and which has a positive optical power, one of the three or more of the focal-length-varying lens groups being a focal-length-varying lens group which has a largest amount of movement and which has a positive optical power.

9. The variable-focal-length lens system according to claim 2, wherein
the lens system is approximately telecentric to a reduction side, and
the following conditional formulae (3) and (4) are fulfilled:

$$1.27 < ft/fw < 2.5 \quad (3)$$

$$5 < LB/Y\max < 7 \quad (4)$$

where
ft represents the focal length of the entire system at a telephoto end;
fw represents the focal length of the entire system at a wide-angle end;
LB represents a minimum air-equivalent back focal length; and
Ymax represents a maximum image height.

10. The variable-focal-length lens system according to claim 1, wherein
the lens system includes, from an enlargement side, the distance-compensation lens group which has a positive optical power and the focal-length-varying lens groups of which at least one has a negative optical power,
as the projection distance varies from a remote distance to a close distance, the distance-compensation lens group moves to a reduction side, and
the following conditional formulae (1A) and (2A) are fulfilled:

$$0.15 < fw/fa < 0.25 \quad (1A)$$

$$-0.75 < AT/1T < -0.05 \quad (2A)$$

where
fw represents the focal length of the entire system at a wide-angle end;
fa represents a focal length of the distance-compensation lens group;
AT represents an amount of movement of the entire system for a variation in projection distance from a remote distance to a close distance (with an amount of movement to the reduction side defined to be in a positive direction); and 1T represents an amount of movement of the distance-compensation lens group for a variation in projection distance from a remote distance to a close distance (with an amount of movement to the reduction side defined to be in the positive direction).

11. The variable-focal-length lens system according to claim 10,
wherein the lens system includes five or more lens groups comprising, from an enlargement side, the distance-compensation lens group which has a positive optical power, one of the focal-length-varying lens groups which has a largest movement amount and which has a negative optical power, two or more of the focal-length-varying lens groups which have a positive or negative optical power, and a lens group which is located at a reduction-side end, which remains stationary during magnification varying, and which has a positive optical power.

12. The variable-focal-length lens system according to claim 1, wherein
the lens system includes, from an enlargement side, the distance-compensation lens group which has a negative optical power and the focal-length-varying lens groups of which at least one has a positive optical power,
as the projection distance varies from a remote distance to a close distance, the distance-compensation lens group moves to the enlargement side, and
the following conditional formulae (1B) and (2B) are fulfilled:

$$-0.8 < fw/fa < -0.3 \quad (1B)$$

$$-0.35 < |AT|/1T < -0.03 \quad (2B)$$

where
fw represents the focal length of the entire system at a wide-angle end;
fa represents a focal length of the distance-compensation lens group;
AT represents an amount of movement of the entire system for a variation in projection distance from a remote distance to a close distance (with an amount of movement to a reduction side defined to be in a positive direction); and
1T represents an amount of movement of the distance-compensation lens group for a variation in projection distance from a remote distance to a close distance (with an amount of movement to the reduction side defined to be in the positive direction).

13. The variable-focal-length lens system according to claim 12,
wherein the lens system includes five or more lens groups comprising, from an enlargement side, the distance-compensation lens group which has a negative optical power, three or more of the focal-length-varying lens groups which have a positive or negative optical power, and a lens group which is located at a reduction-side end, which remains stationary during magnification varying, and which has a positive optical power, one of the three or more of the focal-length-varying lens groups being a focal-length-varying lens group which has a largest amount of movement and which has a positive optical power.

14. The variable-focal-length lens system according to claim 1,
wherein the lens system includes five or more lens groups comprising, from an enlargement side, the distance-compensation lens group which has a positive optical power, one of the focal-length-varying lens groups which has a largest movement amount and which has a negative optical power, two or more of the focal-length-varying lens groups which have a positive or negative optical power, and a lens group which is located at a reduction-side end, which remains stationary during magnification varying, and which has a positive optical power.

15. The variable-focal-length lens system according to claim 1,
wherein the lens system includes five or more lens groups comprising, from an enlargement side, the distance-compensation lens group which has a negative optical power, three or more of the focal-length-varying lens groups which have a positive or negative optical power, and a lens group which is located at a reduction-side end, which remains stationary during magnification varying, and which has a positive optical power, one of the three or more of the focal-length-varying lens groups being a focal-length-varying lens group which has a largest amount of movement and which has a positive optical power.

16. The variable-focal-length lens system according to claim 1, wherein
the lens system is approximately telecentric to a reduction side, and
the following conditional formulae (3) and (4) are fulfilled:

$$1.27 < ft/fw < 2.5 \quad (3)$$

$$5 < LB/Y\max < 7 \quad (4)$$

where
ft represents the focal length of the entire system at a telephoto end;
fw represents the focal length of the entire system at a wide-angle end;
LB represents a minimum air-equivalent back focal length; and
Ymax represents a maximum image height.

17. A projection apparatus comprising:
a variable-focal-length lens system for projection which achieves focusing by movement of the entire system, the variable-focal-length lens system comprising:
two or more focal-length-varying lens groups which individually move in an optical axis direction to vary a group-to-group distance so as to vary a focal length of the entire system; and
a distance-compensation lens group which is separate from the focal-length-varying lens groups and which, during focusing, move in the optical axis direction such that, as a projection distance varies from a remote distance to a close distance, curvature of field varies to an under side; and
a focusing mechanism which, during focusing, moves the entire system and also moves the distance-compensation lens group in the optical axis direction.

18. The projection apparatus according to claim 17,
wherein an amount of movement of the distance-compensation lens group is not affected by the focal length of the entire system but remains constant so long as the projection distance remains constant.

19. A projection apparatus comprising:
a variable-focal-length lens system including, from an enlargement side:

a distance-compensation lens group which remains stationary during magnification varying and which, during focusing, moves in an optical axis direction such that, as a projection distance varies from a remote distance to a close distance, curvature of field varies to an under side; and at least two focal-length-varying lens groups which individually move in the optical axis direction to vary a group-to-group distance so as to vary a focal length of the entire system;

a lens barrel which holds the variable-focal-length lens system including the distance-compensation lens group and the focal-length-varying lens groups; and a focusing mechanism which, during focusing, moves the entire variable-focal-length lens system in the optical axis direction and also moves the distance-compensation lens group in the optical axis direction.

20. The projection apparatus according to claim 19, wherein an amount of movement of the distance-compensation lens group is not affected by the focal length of the entire system but remains constant so long as the projection distance remains constant.

21. The projection apparatus according to claim 20, wherein the lens barrel has, as the focusing mechanism, an operation ring which, by being rotated about an optical axis, moves the distance-compensation lens group, and the lens barrel has a distance scale that indicates a relationship between an amount of rotation of the operation ring and the projection distance.

* * * * *